(12) United States Patent
Janczewski

(10) Patent No.: US 7,853,937 B2
(45) Date of Patent: Dec. 14, 2010

(54) OBJECT-ORIENTED, PARALLEL LANGUAGE, METHOD OF PROGRAMMING AND MULTI-PROCESSOR COMPUTER

(76) Inventor: Slawomir Adam Janczewski, Lakta Gorna 293, Zegocina (PL) 32-731

( * ) Notice: Subject to any disclaimer, the term of this patent is extended or adjusted under 35 U.S.C. 154(b) by 1361 days.

(21) Appl. No.: 11/286,169

(22) Filed: Nov. 25, 2005

(65) Prior Publication Data
US 2007/0169042 A1 Jul. 19, 2007

(30) Foreign Application Priority Data
Nov. 7, 2005 (EP) .................................. 05460030

(51) Int. Cl.
*G06F 9/45* (2006.01)
(52) U.S. Cl. ...................... 717/149; 712/203
(58) Field of Classification Search ........................ None
See application file for complete search history.

(56) References Cited

U.S. PATENT DOCUMENTS

| | | | |
|---|---|---|---|
| 4,430,707 A * | 2/1984 | Kim | 718/100 |
| 5,301,336 A | 4/1994 | Kodosky et al. | |
| 5,442,763 A * | 8/1995 | Bartfai et al. | 711/145 |
| 5,457,797 A * | 10/1995 | Butterworth et al. | 719/320 |
| 5,499,349 A | 3/1996 | Nikhil et al. | |
| 5,999,729 A | 12/1999 | Tabloski, Jr. et al. | |
| 5,999,897 A | 12/1999 | O'Farrell et al. | |
| 5,999,987 A * | 12/1999 | O'Farrell et al. | 719/330 |
| 6,009,269 A * | 12/1999 | Burrows et al. | 717/130 |
| 6,199,093 B1 | 3/2001 | Yokoya | |
| 6,792,599 B2 * | 9/2004 | Poulsen et al. | 717/136 |
| 6,990,653 B1 * | 1/2006 | Burd et al. | 717/108 |
| 7,069,556 B2 * | 6/2006 | Shah et al. | 718/102 |
| 7,167,969 B2 * | 1/2007 | Griffin et al. | 711/203 |
| 7,233,331 B2 * | 6/2007 | Kato | 345/426 |
| 7,571,082 B2 * | 8/2009 | Gilpin et al. | 703/6 |
| 2002/0040470 A1 * | 4/2002 | Guthrie et al. | 717/126 |
| 2002/0087652 A1 * | 7/2002 | Davis et al. | 709/213 |
| 2002/0156932 A1 * | 10/2002 | Schneiderman | 709/317 |
| 2003/0097395 A1 * | 5/2003 | Petersen | 709/102 |
| 2004/0117793 A1 * | 6/2004 | Shaylor | 718/100 |

(Continued)

FOREIGN PATENT DOCUMENTS

EP 0 667 575 A2 8/1995

(Continued)

OTHER PUBLICATIONS

Per Brinch Hansen, "The Programming Language Concurrent Pascal", IEEE Transactions on Software Enginering, 1,2, Jun. 1975, http://brinch-hansen.net, pp. 1-22.

(Continued)

*Primary Examiner*—Tuan Q Dam
*Assistant Examiner*—Zheng Wei

(57) ABSTRACT

This invention relates to architecture and synchronization of multi-processor computing hardware. It establishes a new method of programming, process synchronization, and of computer construction, named stress-flow by the inventor, allowing benefits of both opposing legacy concepts of programming (namely of both data-flow and control flow) within one cohesive, powerful, object-oriented scheme. This invention also relates to construction of object-oriented, parallel computer languages, script and visual, together with compiler construction and method to write programs to be executed in fully parallel (or multi-processor) architectures, virtually parallel, and single-processor multitasking computer systems.

36 Claims, 33 Drawing Sheets

U.S. PATENT DOCUMENTS

2004/0268330 A1* 12/2004 Grover et al. ............... 717/146
2006/0156305 A1* 7/2006 Delapedraja ................ 718/102
2008/0184228 A1* 7/2008 Tsao ........................... 718/1

FOREIGN PATENT DOCUMENTS

| EP | 0 682 312 A | 11/1995 |
| EP | 0 780 763 A | 6/1997 |
| EP | 1 152 331 A | 11/2001 |

OTHER PUBLICATIONS

Intermetrics, Inc, "Ada Reference Manual ISO/IEC 8652:1995(E) with Technical Corrigendum 1", Jun. 15, 2001, http://www.adaic.com, Section 9: Tasks and Sychronization, pp. 159-186.

SGS-Thomson Microelectronics Limited, "Occam® 2.1 Reference Manual", May 12, 1995, Prentice Hall International and http://wotug.org, pp. 1-24.

Rajiv Trehan et al, "Concurrent Object Oriented 'C' (cooC)", Feb. 2, 1993, ACM SIGPLAN Notices, vol. 28, No. 2, http://portal.acm.org, pp. 45-52.

Dietrich Boles, "Parallel Object-Oriented Programming with QPC++", 1993, Structured Programming journal, http://citeseer.ist.psu.edu, pp. 1-7.

Bertrand Meyer, "Object-Oriented Software Construction", Second Edition, 1997, Prentice-Hall, http://www.eiffel.com, Chapter 30: "Concurrency, Distribution, . . . ", pp. 967-1007.

National Instruments, "Application Note 114: Using LabVIEW to Create Multithreaded Vis . . . ", Jul. 2000, National Instruments, http://www.ni.com, pp. 5-12.

National Instruments, "Application Note 199: LabVIEW and Hyper-Threading", Mar. 2004, National Instruments, http://www.ni.com, pp. 2-4.

Softwire Technology, "Getting Started with SoftWIRE", Sep. 1, 2005, http://www.measurementcomputing.com/manuals.html, pp. 9-13.

Jurij Silc et al, "Asynchrony in parallel computing: From dataflow to multithreading", Sep. 1997, Institut Joseph Stefan, Ljubljana, http://citeseer.ist.psu.edu/, pp. 1-32.

Rishiyur S. Nikhil et al, "Can dataflow subsume von Neuman computing?", Nov. 15, 1988, "Computation Structures Group Memo 292", http://csg.lcs.mit.edu/, pp. 7-10.

Lee G et al: "Dataflow Java: implicitly parallel Java", Computer Architecture Conference 2000, ACAC 2000, IEEE Comput. Soc. USA, Jan. 31, 2000, ISBN 0-7695-0512-0, (whole).

Wesley M. Johnston et al, "Advances in dataflow programming languages", ACM Computing Surveys, vol. 36, No. 1, 2004, pp. 1-34.

Willebeek-Lemair M H et al: "Strategies for Dynamic Load Balancing on Highly Parallel Comp.", IEEE Service Center, Los Alamitos, CA, USA, vol. 4, No. 9, Sep. 1, 1993, p. 979-993.

Christian Heinlein: "Concept and Implementation of C+++, an Extenssion of C++" [online] Aug. 2004, Ulmer Informatik-Berichte, Germany, (whole document).

Karl E. Peterson: "Coercion Aversion", Visual Basic Programmer's Journal, [online] Nov. 1995, (whole document), http://vb.mvps.org.

* cited by examiner

```
const int n=100;
some_type A[n],B[n],C[n];
int total_count;
//-------------------------------------------------
detach void done_item()
{   ++total_count;
    if ( total_count==n )
        all_done();
    return;
};
//-------------------------------------------------
detach void add_item(int i)
{   return;
    C[i] = A[i]+B[i]; //Time consuming operation
    done_item();
};
//-------------------------------------------------
detach void add_arrays()
{   total_count=0;
    for ( int i=0; i<n; i++ )
        add_item(i);
};
```

FIG. 2

```
const int n=100;
some_type A[n],B[n],C[n];
//-------------------------------------------------
detach
{   int total_count;
    void done_item()
    {   ++total_count;
        if ( total_count==n )
            all_done();
        return;
    };
    void zero_count()
    {   total_count=0;
    };
};
//-------------------------------------------------
detach void add_item(int i)
{   return;
    C[i] = A[i]+B[i]; //Time consuming operation
    done_item();
};
//-------------------------------------------------
detach void add_arrays()
{   zero_count();
    for ( int i=0; i<n; i++ )
        add_item(i);
};
```

FIG. 3

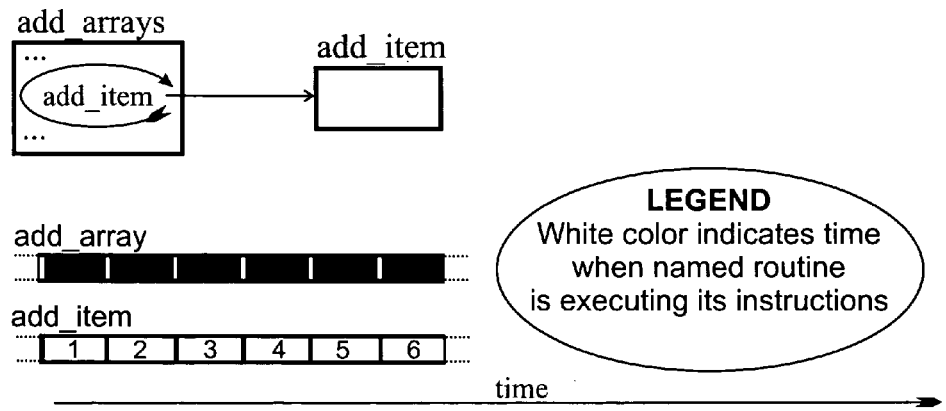
PRIOR ART   FIG. 3A
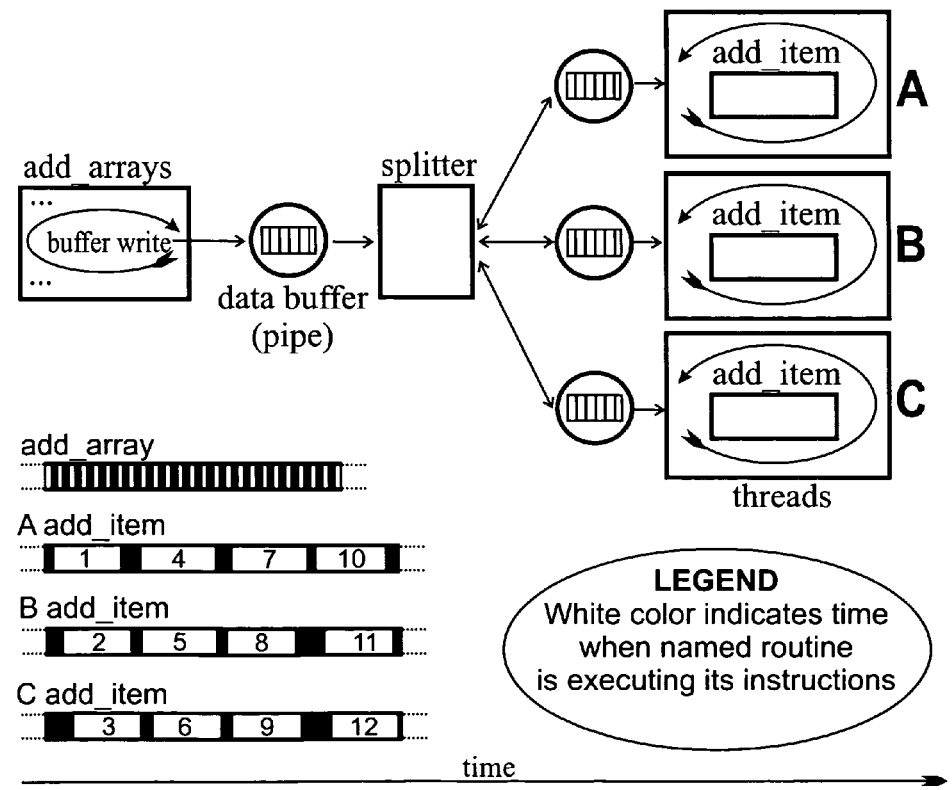
PRIOR ART   FIG. 3B

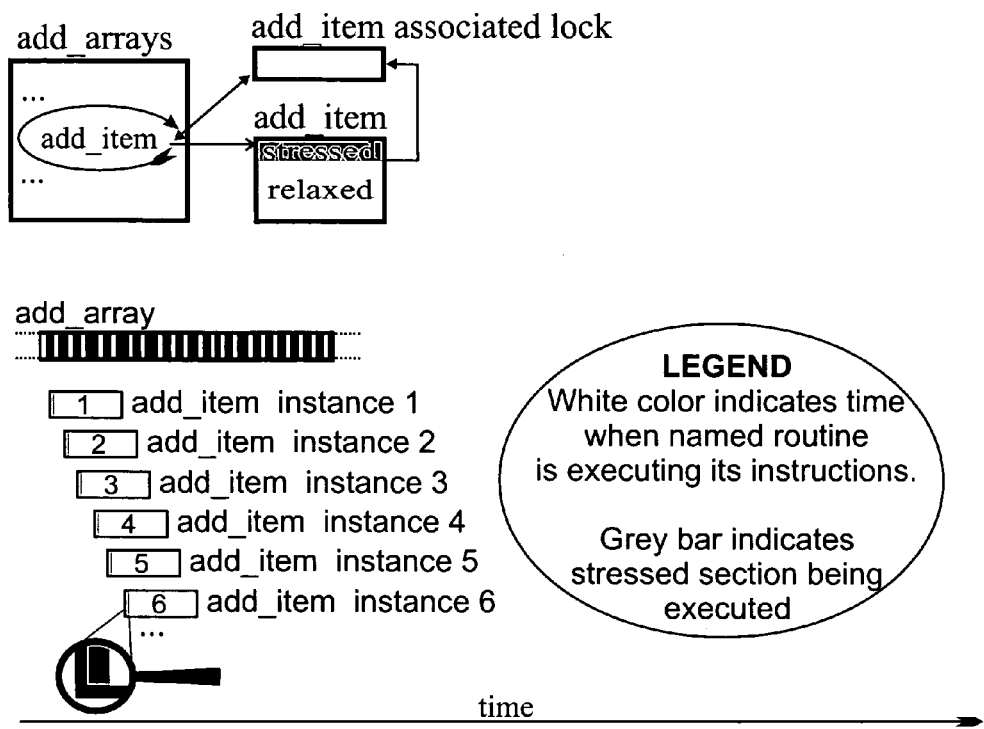
FIG. 3C
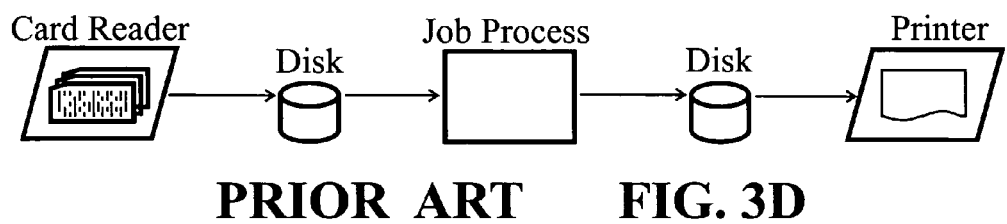
PRIOR ART  FIG. 3D

```
const int n=100;
some_type A[n],B[n],C[n];
//--------------------------------------------------
detach socket void all_done();
//--------------------------------------------------
detach
{   int total_count;
    void done_item()
    {   ++total_count;
        if ( total_count==n )
            all_done();
        return;
    };
    void zero_count()
    {   total_count=0;
    };
};
//--------------------------------------------------
detach void add_item(int i)
{   return;
    C[i] = A[i]+B[i]; //Time consuming operation
    done_item();
};
//--------------------------------------------------
detach void add_arrays()
{   zero_count();
    for ( int i=0; i<n; i++ )
        add_item(i);
    void all_done()
    {
    };
};
```

FIG. 4

```
const int n=100;
//----------------------------------------------------
struct Array
{   type Data[n];
    socket void all_done();
    //-----
    detach
    {   int total_count;
        void done_item()
        {   ++total_count;
            if ( total_count==n )
                all_done();
            return;
        };
        void zero_count()
        {   total_count=0;
        };
    };
    //-----
    detach void add_item(int i, type& A, type& B)
    {   return;
        C[i] = A[i]+B[i]; //Time consuming operation
        done_item();
    };
    //-----
    detach void add_arrays(Array& A, Array& B)
    {   zero_count();
        for ( int i=0; i<n; i++ )
            add_item(i,A.Data,B.Data);
        void all_done()
        {
        };
    };
};
```

FIG. 5

```
synchronized
{   LeftFork.take();
    RightFork.take();
    eat  ();
};
```

FIG. 6

```
const int N=5;
//--------------------------------------------------
detach struct Fork
{   take()      { //=== Whatever needs to be done here; };
};
//--------------------------------------------------
class Phil
{
private:
    static int Ph_Cnt;

static Fork Forks[];
    eat  ()     { //=== Eating code here;           };
    think()     { //=== Thinking code here;         };

public:
    detach Phil()
    {   Fork* LeftFork  = Forks+Ph_Cnt;
        Fork* RightFork = Forks+((Ph_Cnt+1)%N);
        ++Ph_Cnt;
        return;

for(;;)
        {   think();
            LeftFork->take(), RightFork->take(), eat();
        };
    };
};
//--------------------------------------------------
Fork        Phil::Forks[N];
Phil        Phils[N];
```

FIG. 7

```
detach
{   static Fork Forks[];
    eat  ()     { //=== Eating code here;           };
};
```

FIG. 7A

```
const int n=100;
void  Get_Data ( some_type* Dest );
void  Calc_MA  ( some_type* Dest, some_type* Src );
void  Run_Sim  ( some_type* MA );
//-----------------------------------------------
struct SimData
{  some_type  RawData[n];
   some_type  MAData[n];

detach void StepA(int iDepth)
   {   Calc_MA (MAData,RawData,i);
       Run_Sim (MAData);
       return;
   };
   detach void Go()
   {   Get_Data(Raw_Data);
       for (int i=1; i<=100; i++ )
          StepA(iDepth);
       return;
   };
};
```

FIG. 8

```
struct SimData
{   detach void StepA(int iDepth, some_type* RawData)
    {   some_type  MAData[n];
        Calc_MA (MAData,RawData,i);
        return;
        Run_Sim (MAData);
    };
    detach void Go()
    {   return;
        some_type  RawData[n];
        Get_Data(Raw_Data);
        for (int i=1; i<101; i++ )
           StepA(iDepth,RawData);
    };
};
```

FIG. 8A

```
struct SimData
{   detach void StepA(int iDepth, some_type* RawData)
    {   return;
        some_type*  MAData= new some_type[n];
        Calc_MA (*MAData,RawData,i);
        Run_Sim (MAData);
    };
    detach void Go()
    {   return;
        some_type*  RawData= new some_type[n];
        Get_Data(Raw_Data);
        for (int i=1; i<101; i++ )
           StepA(iDepth,RawData);
    };
};
```

FIG. 8B

```
struct mouse_driver
{   connector mouse_moved(int x, int y);
    detach move(int x,int y)
    {   return;
        mouse_moved(x,y);
    };
} mouse;
//-----------------------------------------------
struct window
{   detach mouse_move(int x,int y)
    {   //code for processing mouse messages
    };
    window ()
    {   mouse.mouse_moved=>mouse_move;   // connect
    };
};
```

FIG. 9

```
struct value_cache
{   some_type       value;
    connector       changed();
    detach void     change(parm_type parm)
    {   value = type;
        changed();
        return;
    };
};
```

FIG. 10

```
detach
{  matrix B;
   bool    have_one;
   void send_O1(matrix O)
     {  if ( !have_one )
         {  have_one=true;   B = O; return;         }
        else
         {  have_one=false; return; result(O*B); };
     };
   void send_O2(matrix O)
     {  if ( !have_one )
         {  have_one=true;   B = O; return;         }
        else
         {  have_one=false; return; result(B*O); };
     };
};
detach void do_Op1(matrix A)   {  return; send_O1(Op1(A));    };
detach void do_Op2(matrix A)   {  return; send_O2(Op2(A));    };
detach void enter(matrix A)    {  return; do_Op1(A); do_Op2(A); };
```

FIG. 11

```
struct calculate
{  detach
    {  matrix B;
       bool    have_one;
       void send_O1(matrix O)
         {  if ( !have_one )
             {  have_one=true;   B = O; return;         }
            else
             {  have_one=false; return; result(O*B); };
         };
       void send_O2(matrix O)
         {  if ( !have_one )
             {  have_one=true;   B = O; return;         }
            else
             {  have_one=false; return; result(B*O); };
         };
    };
   detach void do_Op1(matrix A)   {  return; send_O1(Op1(A));    };
   detach void do_Op2(matrix A)   {  return; send_O2(Op2(A));    };
   detach calculate(matrix A)
     {  have_one=false;
        return; do_Op1(A); do_Op2(A); };
   };
};
```

FIG. 11A

```
calculate   r1(A1), r2(A2), r3(A3)...
// or
new calculate(A1);
new calculate(A2);
new calculate(A3);
```

FIG. 11B

```
struct calculate
{   detach
    {   void send_O1(matrix O1)
             send_O2(matrix O2)
        {   return;
            result(O1*O2);
        };
    };

detach void do_Op1(matrix A)     {  return; send_O1(Op1(A));     };
    detach void do_Op2(matrix A)     {  return; send_O2(Op2(A));     };
    detach calculate(matrix A)
    {   return;
        do_Op1(A); do_Op2(A); };
    };
};
```

FIG. 11C

```
struct calculate
{   collect
    {   void send_O1(matrix O1)
             send_O2(matrix O2)
        {   return;
            result(O1*O2);
        };
    };

detach void do_Op1(matrix A)     {  return; send_O1(Op1(A));     };
    detach void do_Op2(matrix A)     {  return; send_O2(Op2(A));     };
    detach calculate(matrix A)
    {   return;
        do_Op1(A); do_Op2(A); };
    };
};
```

FIG. 11D

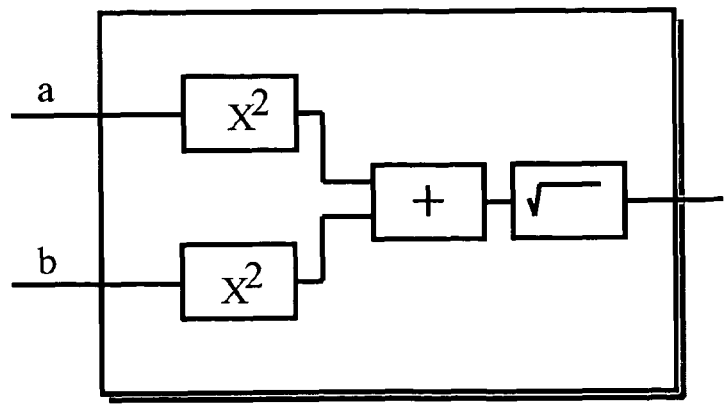

FIG. 12

```
struct calc_inst
{   detach  void  dsqrt   (type s)         {  result(sqrt(s));   };
    collect void  add_a   (type aa)
                  add_b   (type bb)        {  dsqrt(aa+bb);      };
    detach  void  sq1     (type a)         {  add_a(a*a);        };
    detach  void  sq2     (type b)         {  add_b(b*b);        };
    detach  void  go      (type a,type b)  {  sq1(a); sq2(b);    };
} aa;
//---
aa.go(10,12);    // example of invocation
```

FIG. 13

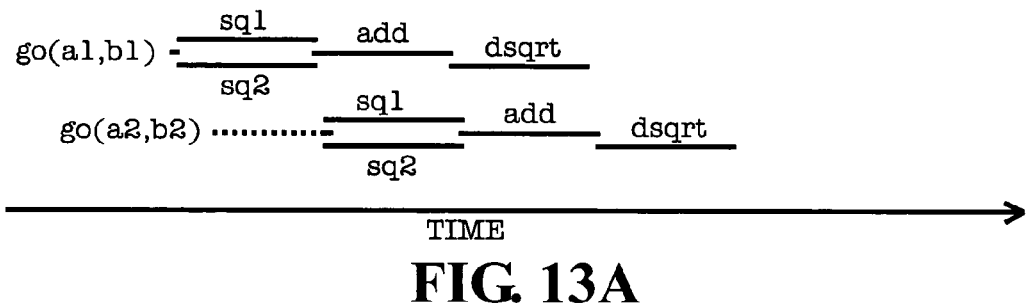

FIG. 13A

```
struct calc_inst
{   static  type  out[];
    static  int   last;
    int           curr;

detach  void  dsqrt   (type s)         {  out[curr]=sqrt(s); };
    collect void  add_a   (type aa)
                  add_b   (type bb)        {  dsqrt(aa+bb);      };
    detach  void  sq1     (type a)         {  add_a(a*a);        };
    detach  void  sq2     (type b)         {  add_b(b*b);        };
    detach  calc_inst     (type a,type b)  {  curr=last++;
                                              return;
                                              sq1(a); sq2(b);
                                           };
};
//---
new calc_inst(10,12);    // example of invocation
```

FIG. 14

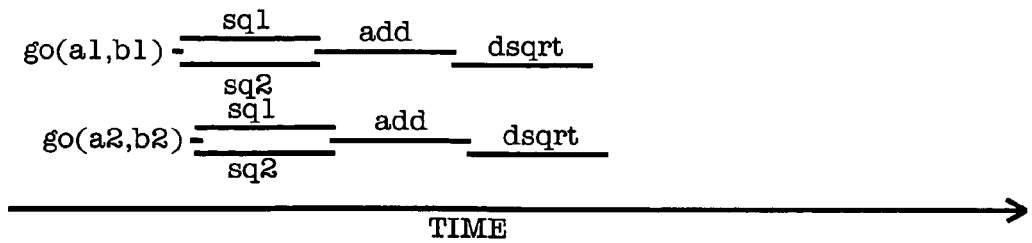

FIG. 14A

```
struct calc_inst
{  ...
    detach  void sq1      (type a)         {  reserve add_a;
                                              return;
                                              ordered add_a(a*a);
                                           };
    ...
} aa;
```

FIG. 15

```
struct calc_inst
{  ...
    detach  void sq1      (type a)         {  return;
                                              ordered add_a(a*a);
                                           };
    ...
} aa;
```

FIG. 15A

```
struct calc_inst
{  ...
    detach  void sq1      (type a):        {  return;
                                              !!add_a(a*a);
                                           };
    ...
} aa;
```

FIG. 15B

```
struct calc_inst
{  ...
    detach  void sq1      (type a):        {  reserve add_a;
                                              return;
                                              !!add_a(a*a);
                                           };
    ...
} aa;
```

FIG. 15C

```
struct calc_inst
{   detach  void dsqrt  (type s)           { return;  !!result(sqrt(s)); };
    collect void add_a  (type aa)
                        add_b  (type bb)   { return;  !!dsqrt(aa+bb);    };
    detach  void sq1    (type a)           { return;  !!add_a(a*a);      };
    detach  void sq2    (type b)           { return;  !!add_b(b*b);      };
    detach  void go     (type a,type b)    { return;  !!sq1(a); !!sq2(b);};
} aa;
//---
aa.go(10,12);   // example of invocation
```

FIG. 16

```
struct calc_inst
{  detach  void dsqrt  (type s)         { return; !?result(sqrt(s)); };
   collect void add_a  (type aa)
                add_b  (type bb)        { return; !?dsqrt(aa+bb);    };
   detach  void sq1    (type a)         { return; !?add_a(a*a);      };
   detach  void sq2    (type b)         { return; !?add_b(b*b);      };
   detach  void go     (type a,type b)  { return; !?sq1(a); !?sq2(b);};
} aa;
//---
aa.go(10,12);   // example of invocation
```

FIG. 17

```
struct calc_inst
{  detach  void dsqrt  (type s)         { return; !?result(sqrt(s)); };
   collect void add_a  (type aa)
                add_b  (type bb)        { return; !?dsqrt(aa+bb);    };
   detach  void sq1    (type a)         { return; !?add_a(a*a);      };
   detach  void sq2    (type b)         { return; !?add_b(b*b);      };
   type    a_cp,b_cp;
   group
   {  void     in_a    (type a)         { return; a_cp=a; !?sq1(a);  };
      default  in_a    ()               { return; !?sq1(a_cp);       };
      void     in_b    (type b)         { return; b_cp=a; !?sq2(b);  };
      default  in_b    ()               { return; !?sq2(b_cp);       };
   };
} aa;
//---
aa.in_a(10),aa.in_b(12);  aa.in_a(20); // examples of invocation
```

FIG. 18

```
struct calc_inst
{   detach  void dsqrt   (type s)      { return; !?result(sqrt(s)); };
    collect void add_a   (type aa)
                add_b    (type bb)     { return; !?dsqrt(aa+bb);    };
    detach  void sq1     (type a)      { return; !?add_a(a*a);      };
    detach  void sq2     (type b)      { return; !?add_b(b*b);      };
    group
    {   void  in_a       (type a)      { return; !?sq1(a);          };
        void  in_b       (type b)      { return; !?sq2(b);          };
    };
} aa;
//---
aa.in_a(10),aa.in_b(12);  aa.in_a(20); // examples of invocation
```

FIG. 19

```
detach nodef void dsqrt (type s)
{   if ( !dsqrt )
        <do something for default path>
    result(sqrt(s));
    return;
};
```

FIG. 19A

```
    group in
    {   void  in_a       (type a)      { return; !?sq1(a);          };
        void  in_b       (type b)      { return; !?sq2(b);          };
    };
...
aa.in(); //example of invocation
```

FIG. 19B

```
    group
    {   void  !in_a      (type a)      { return; !?sq1(a);          };
        void  in_b       (type b)      { return; !?sq2(b);          };
    };
...
aa.in_a(20); //example of invocation
```

FIG. 19C

| Margin | Depth1 | Depth2 | MA1 | MA2 | Delta | Simulation |
|--------|--------|--------|-----|-----|-------|------------|
| 1 | 1 | 1 | Y | Y | Y | Y |
| 2 | 1 | 1 | N | N | N | Y |
| 1 | 2 | 1 | Y | N | Y | Y |
| 2 | 2 | 1 | N | N | N | Y |
| 1 | 3 | 1 | Y | N | Y | Y |
| 2 | 3 | 1 | N | N | N | Y |
| 1 | 1 | 2 | Y | Y | Y | Y |
| 2 | 1 | 2 | N | N | N | Y |
| 1 | 2 | 2 | Y | N | Y | Y |
| 2 | 2 | 2 | N | N | N | Y |
| 1 | 3 | 2 | Y | N | Y | Y |
| 2 | 3 | 2 | N | N | N | Y |
| 1 | 1 | 3 | Y | Y | Y | Y |
| 2 | 1 | 3 | N | N | N | Y |
| 1 | 2 | 3 | Y | N | Y | Y |
| 2 | 2 | 3 | N | N | N | Y |
| 1 | 3 | 3 | Y | N | Y | Y |
| 2 | 3 | 3 | N | N | N | Y |

```
const   int    K=...;                // Size of tick data
float   Tick[K];                     // Tick data to process
//----------------------------------------------------
struct Counter
{   int         Cur,Max;
    connector   Changed(int i);
    connector   Roll    ();
    void        Counter(int iMax)  { Cur=Max=iMax;              };
    detach void Step    ()         { if (++Cur>Max)
                                            { Cur=1; !!Roll();};
                                     !!Changed(Cur);
                                   };
};
//----------------------------------------------------
struct MA
{   connector   Changed (float* pMA);
    detach void Go      (int iD)   { return;
                                     float* p=new float[K];
                                     float Sum=Tick[0]*iD;
                                     for ( int i=1; i<K; i++)
                                        { if ( i-iD<0 )
                                              Sum-=Tick[0];
                                          else
                                              Sum-=Tick[i-iD];
                                          Sum+=Tick[i];
                                          p[i]=Sum/iD;
                                        };
                                     !!Changed(p);
                                   };
};
//----------------------------------------------------
struct Delta
{   connector    Changed (float* pMA);
    collect void Go1     (float* pMA1)
                 Go2     (float* pMA2){ return;
                                        float* p=new float[K];
                                        for ( int i=0; i<K; i++)
                                           p[i]=pMA2[i]-pMA1[i];
                                        !!Changed(p);
                                      };
};
//----------------------------------------------------
struct Simulation
{   static int    ResCount;
    static float  Results[MaxRes];
                  Simulation ( )        { ResCount=0; };
    collect void  Margin   (int    iMargin)
                  MA1      (float* pMA1)
                  Delta    (float* pDelta)
                  MA2      (float* pMA2){ int iRes=ResCount++;
                                          return;
                                          ... // Run simulation
                                          Results[iRes]=...
                                        };
};
```

FIG. 22

```
Counter         rMargin(N);
Counter         rDepth1(M);
Counter         rDepth2(P);
MA              rMA1;
MA              rMA2;
Delta           rDelta;
Simulation      rSim;

rMargin.Roll    => rDepth1.Step;
rDepth1.Roll    => rDepth2.Step;

rDepth1.Changed => rMA1.Go;
rDepth2.Changed => rMA2.Go;

rMA1.Changed    => rDelta.Go1;
rMA2.Changed    => rDelta.Go2;

rMargin.Changed => rSim.Margin;
rMA1.Changed    => rSim.MA1;
rMA2.Changed    => rSim.MA2;
rDelta.Changed  => rSim.Delta;
```

FIG. 22A

```
for ( int k=0; k<N*M*P; k++ )
    rMargin.Step();
```

FIG. 22B

```
struct Counter2
{   int         Cur,Max;
    connector   Changed(int i);
    connector   Roll    ();
    connector   Next    ();
    void        Counter(int iMax)
                        { Cur=Max=iMax;              };
    detach
    {   void Step   ()  {   if (++Cur>Max)
                                {   Cur=1; !!Roll();};
                            !!Changed(Cur);
                        };
        void Reset  ()  {   Cur=1;
                            Changed(Cur); Next();
                        };
    };
};
//--------------------------------------------------
struct Flip
{   connector   Link();
    detach nodef Go()   {   if ( !Go )
                                Link();
                        };
};
```

```
Counter2        rMargin(N);
Counter2        rDepth1(M);
Counter2        rDepth2(P);
Flip            rFlip;
MA              rMA1;
MA              rMA2;
Delta           rDelta;
Simulation      rSim;

rMargin.Next    => rDepth1.Reset;
rDepth1.Next    => rDepth2.Reset;
rDepth2.Next    => rMargin.Step;

rMargin.Roll    => rDepth1.Step;
rDepth1.Roll    => rDepth2.Step;
rDepth2.Roll    => rFlip.Go;

rDepth1.Changed => rMA1.Go;
rDepth2.Changed => rMA2.Go;

rFlip.Link      => rMargin.Step;

rMA1.Changed    => rDelta.Go1;
rMA2.Changed    => rDelta.Go2;

rMargin.Changed => rSim.Margin;
rMA1.Changed    => rSim.MA1;
rMA2.Changed    => rSim.MA2;
rDelta.Changed  => rSim.Delta;
```

FIG. 24A

```
detach struct Primes
{
   void CalculateOne ( int iPrime, bool* resultArray )
      { return;
        int primeToTest = i*2+3;
        bool isPrime=true;
        for ( int j=2; j<=sqrt(primeToTest); ++j )
           if ( primeToTest%j==0 )
           {   isPrime=false;
               break;
           };
        resultArray[i]=isPrime;
      };
   //-------------------------------------------------
        CalculatePrimes ( int numTerms )
     { bool* resultArray = new bool[numTerms/2];
        for ( int i=0; i<numTerms/2; ++i )
           CalculateOne(i);
     };
};
```

FIG. 25

```
detach struct Array
{   int    reserved;
    int    used;
    bool*  data;

Array  ( int N )           {  reserved = N; used = 0;
                                      data = new bool[N];
                                   };
        ~Array()                   {  delete data;
                                   };
    bool  Get    ( int i )         {  return data[i];
                                   };
    bool  Fill   ( int i, bool v ) {  data[i]=v;
                                      return ++used==reserved;
                                   };
};
```

FIG. 26

```
struct Primes
{   connector Out(Array&);

detach void CalculateOne ( int iPrime, Array& Results )
        {   return;
            int primeToTest = i*2+3;
            bool isPrime=true;

for ( int j=2; j<=sqrt(primeToTest); ++j )
                if ( primeToTest%j==0 )
                {   isPrime=false;
                    break;
                };

if ( Results.Fill(i,isPrime) )
                Out(Results);
        };

detach void Primes         ( int N )
        {   return;
            Array Results(N);
                for ( int i=0; i<N/2; ++i )
                    CalculateOne(i,Results);
        };
};
```

FIG. 26A

```
collect void DoneA(Array& A)
             DoneB(Array& B)
{ // Code to compare A and B
};

struct PrimesR
{
   detach void CalculateOne ( int iPrime, Array& Results,
                              detach (*Out)(Array&)
                            )
       { // ...
         // Prime checking code like on Fig 26A
         if ( Results.Fill(i,isPrime) )
             Out(Results);
       };

detach void PrimesR       ( int N,
                               detach (*Out)(Array&)
                             )
       { return;
         Array Results(N);
             for ( int i=0; i<N/2; ++i )
                 CalculateOne(i,Results,Out);
       };
};

void StartRoutine()
{  PrimesR Pr1(1000,DoneA);
   PrimesR Pr1(1000,DoneB);
};
```

FIG. 27

```
collect void Done(Array& A)[2]
{ // Code to compare A[0] and A[1]
};

void StartRoutine()
{  PrimesR Pr1(1000,Done[0]);
   PrimesR Pr1(1000,Done[1]);
};
```

FIG. 27A

```
firstof void DoneA(Array& A)
             DoneB(Array& B)
{ if ( DoneA )
      //---
};

void StartRoutine()
{  PrimesR Pr1(1000,!!Done[0]);
   PrimesR Pr1(1000,!!Done[1]);
};
```

FIG. 27B

```
firstof void Done(Array& A)[2]
              UserKilled()
{   if ( UserKilled )
       //---
    if ( Done[0] )
       //---
};
```
FIG. 27C
```
connector firstof void Done(Array& A)[2]
                        UserKilled();
```
FIG. 27D
```
socket void Done(Array& A)[2];
void StartRoutine(Array& Result)
{   bool success=false;
    do
    {   PrimesR Pr1(1000,Done[0]);
        PrimesR Pr1(1000,Done[1]);
        socket void Done(Array& A)[2]
        {   if ( A[0]==A[1] )
            {   success=true;
                Result=A;
            };
        };
    } while ( !success );
};
```
FIG. 27E
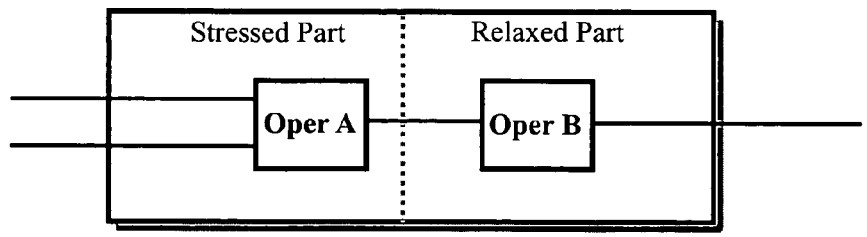
FIG. 28A
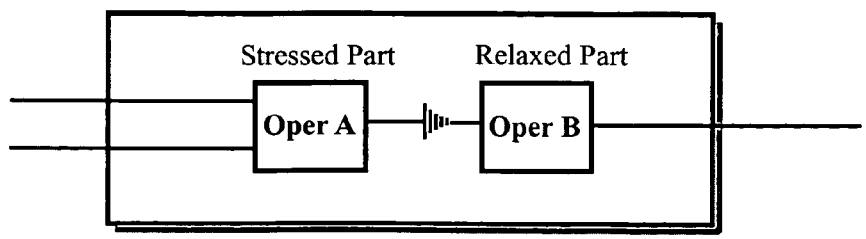
FIG. 28B

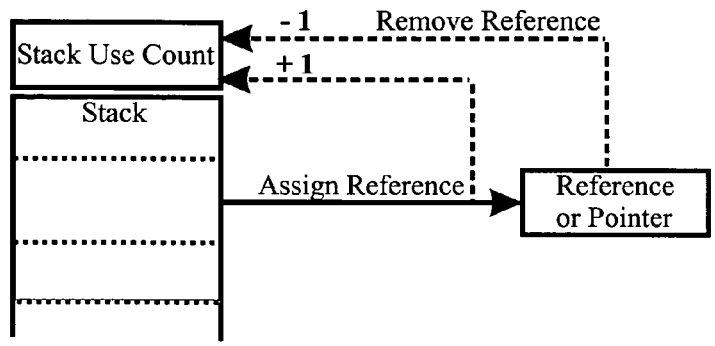

FIG. 29

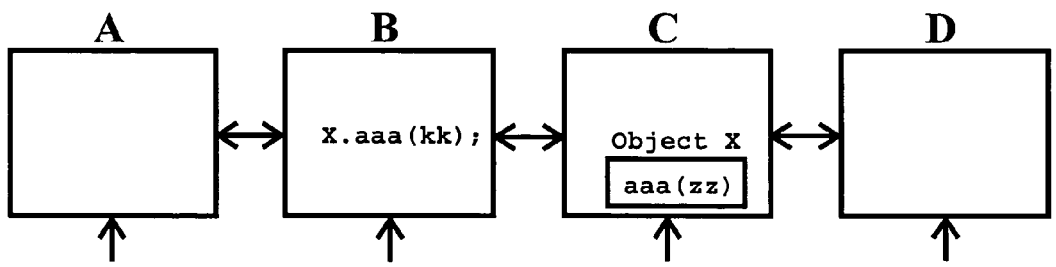

FIG. 29A

```
// Atom lock structure generated and hidden by the compiler here
// int aaa;          // Storage for atom actual parameters
// some_type bbb;    // Storage for atom actual parameters
detach void SomeAtom(int aaa, some_type bbb)
{
   ... some_instruction(bbb); // This use can accesses bbb stored
                              // with the lock
   return;
   ... some_instruction(aaa); // Use copy of aaa on the local stack
};
```

FIG. 29B

```
detach void Func(int@ aaa)
{  notify_A(aaa);
   relax;
   notify_B(aaa);
};

Func(++);
Func(--);
Func(=1);
Func(+=3);
```

FIG. 29C

OBJECT-ORIENTED, PARALLEL LANGUAGE, METHOD OF PROGRAMMING AND MULTI-PROCESSOR COMPUTER

CROSS-REFERENCE TO RELATED APPLICATIONS

Identical application has been filed with European Patent Office and assigned number EP05460030 with priority date Nov. 7, 2005.

STATEMENT REGARDING SPONSORED RESEARCH OR DEVELOPMENT

Not Applicable. No government sponsorship of any kind took part in development of the invention.

REFERENCE TO APPENDIXES ON DISK

None Submitted.

BACKGROUND OF THE INVENTION

Present invention relates to object-oriented, parallel computer languages, script and visual, together with compiler construction, to write programs to be executed in fully parallel (or multi-processor) architectures, virtually parallel, and single-processor multitasking computer systems. The invention also relates to architecture and synchronization of multi-processor hardware.

Fundamentally, two drastically opposing methods were known to construct computer architectures and programs: control-flow and data-flow. In control-flow method, the programs have the shape of series of instructions to be executed in strict sequence, in data-flow the execution occurs when a set of data needed to be processed is available.

Control-flow is the method used widely by the mainstream computing while data-flow method has been unable to make its way to mainstream computing and its application is currently limited to rare custom built hardware and sometimes as top conceptual model for some multi-user and real time software.

Data-flow method is naturally concurrent but even with this appeal was unable to overcome severe other problems with the method, chief among them the fact that data-flow as low-level software design method does not translate well into use with common computer algorithms. Numerous data-flow architectures were researched and they were excellent in providing high-speed computing in a number of specific applications. However, even the very limited applications of data-flow computing produced numerous problems with the concept.

Parallelism in data-flow relies on splitting the problem to be solved (input token in data-flow terminology) into many sub-tokens traveling parallel paths. The results of computations performed on sub-tokens traveling parallel paths would then have to gradually merge back together to produce the final result. A key problem with data-flow architecture concerned allowing unrestricted feeding of tokens (input data) into data-flow system and letting them take the shortest rather than predefined path (so called "dynamic data-flow"). Such unrestricted data-flow processing would result in mismatching result tokens arriving at destination. To solve this problem, numerous methods of tagging and instance numbering of dynamic data-flow tokens were proposed.

Key problem with concurrency in control-flow environment centers around simultaneously executing processes sharing the same data and with separate control sequences cooperating with one another. Rudimentary non-structural synchronization tools (critical sections, semaphores, signals) for dealing with these issues have been known for a very long time. Many mass produced processors are equipped with special instructions that allow exclusive/safe access to memory shared by two or more processors. These instructions (called interlocked memory access instructions) allow easy implementation of the rudimentary synchronization tools and are used by all operating systems that support multi-processor use.

Programs using the rudimentary tools are however fairly hard to construct and prone to hard to be seen and corrected conceptual problems leading to deadlocks. A deadlock is a situation where two or more separate processes all hung (are forever suspended) waiting for resources reserved by other suspended processes.

For these reasons, many methods of structural, object-oriented methods of concurrent process synchronization have been proposed and implemented. For example:

"Monitors" implemented in Concurrent Pascal define sections of program as the only elements to be accessed by more than one process.

"Rendezvous sections" implemented in Ada provide instructions that allow two separate processes meet at points specified in both of them.

"Named channels" of Occam and similar messaging methods (Concurrent Object-Oriented C) provide special constructs through which to send and receive data between processes running in parallel.

"Shared variables" QPC++ allow exchanging inter-process information by special data bound to semaphores.

"Separate" designation for routines and data of SCOOP/Eiffel allow specifying routines to be executed as separate process and data to be used exclusively by one process. The method seems very appealing but fails to address many of the problems. Further mechanism of "require" block within a separate procedure allow specifying conditions to be met for a separate procedure to execute as multi-tasking extension of the "design by contract" concept.

None of the above methods have been widely accepted in mainstream computing and concurrent programming art is still an exception rather than a rule. In spite of tremendous need for parallel programming support, the most popular languages either offer only the rudimentary, non-object oriented parallel programming support, or none at all. In particular, in spite of numerous attempts, the C++ standard committees had failed to agree on a universal support for parallel programming in C++. All proposed methods were unable to get enough support to be accepted as the basis for a standard of parallel programming in C++.

In such a situation, programmers were often being forced to find their own ways to implement some parallel programming in C++ and other widely used languages. Many innovations were made in order to do some parallel programming using C++. For example, U.S. Pat. No. 5,999,987 and corresponding European Patent EP0667575 propose a way where limited parallel programming is implemented without language extensions by using special "placeholder" constructs to allow initiation of asynchronous/parallel/distributed tasks and continuation of processing. Placeholder construct later allows retrieval of results of the asynchronous call and re-synchronizing the calling process to it.

All these prior art methods either elegantly solve only one small subset of concurrent programming needs or propose a concept that is very costly to implement in practice. Monitors, Rendezvous Sections, Named Channels, and Separate Objects all appear to be incomplete solutions, serving only a few needs. SCOOP/Eiffel Require blocks, on the other hand, while conceptually appealing, are costly/impractical to implement because they specify an expression which must be met for a concurrent procedure to begin executing. This requires some method to be able to reevaluate the expression each time the source conditions might have changed to merit starting the execution of object containing the "require" block.

Purely control-flow programs result in cumbersome behavior and many unacceptable features. They cannot naturally share resources, cannot easily cooperate with each other. Due to these problems and pervasive lack of universal multi-thread and multi-process parallel programming method, various workarounds were designed to eliminate some of the bad characteristics of the control-flow programming model. These included message-based operating system interface and some visual programming.

The method of parallel computations that is still most commonly used in practice is pipelining. Pipelining is a decades old method that originated in the days of mainframe computers and is about connecting a number of otherwise independent executable programs or tasks through a special type of data buffer (referred to as pipe) written on one end and read from the other. The entire communication of a task with other tasks is through the pipes. A pipelining task runs a loop in which it reads the input data from its input pipe (or pipes), processes it, and outputs the results to output pipe (or pipes). In spite of this method being so old, it is still widely used and worked on. For example, U.S. Pat. No. 6,199,093 (Yokoya) shows a processor allocating method for a multi-processor computer dedicated to the pipelining model of computing. In that invention, the compiler produces a fixed number of tasks and generates the table showing the amount of data sent between every combination of two tasks. That table is then used at program load time to assign each task to a processing node. As no other means of communication is supported but data sent by one task and received by another, this means that only the pure pipelining model is supported. Problem is, it does not have to always stay like that, there are other communication means, such as memory sharing, messaging, fast networking implementing memory sharing, etc.

The main advantage of pipelining is the simple layout of a processing task that relies on pipes as only means of communication. This allows testing each task independently by sending test data to input pipes and reading the output pipes. As no other interactions happen but those through the pipes, this is a complete, accurate test of entire functioning of a task. This however does come at a price of having to decompose parallel processing into tasks that by definition do not know anything but what they receive through the pipes. This is not always sufficient for some processing problems. The other problem with pipelining is necessity to allocate pipes for every needed connection, each of them being able to store a number of items of data for pipelining to work. This forces the processing nodes to either be quite large, thus needing few pipes, or results in a large number of tasks connected with large number of pipes that now have to somehow be managed when they reach their capacity or when they stall other tasks when they are not large enough.

An additional advantage of pipelining stems from the fact that it can serve as a high-level design model. The idea is to have some method to create black boxes for running some processing on data (each of them with some input and output pipes) and then have them connected together with a Graphical User Interface (GUI) into a parallel processing model. For example, U.S. Pat. No. 5,999,729 (Tabloski, Jr. et al) is about having C++ programmers produce some "predefined components", each with some input/output ports working with data buffers (pipes) and then have non-programmers connect them together within a graphical interface program. Some of those components allow splitting data into several paths, each path then running some processing tasks on data. The outputs are then combined together in components dedicated to putting data together into a single output. This model will work very well when a single item of data is all that is needed at every processing node to produce the output result. That gives pure pipelining which in Tabloski case means using a "splitter component" to feed data to several paths of "serial component" replicated with "replicator component". When that rule does not work, and the tasks connected to the splitter have to know each other's data or have to communicate anything else with each other to process data, all that the development system can be used for is connecting the splitter component to "parallel component" that is connected to custom written "parallel module". That custom parallel module works as several tasks that communicate with each other in platform-specific and application-specific way in order to be able to produce results. The fact that pipelining model required writing custom hard-coded modules for all non-trivial processing clearly shows serious limitations of that model of parallel processing. The present invention is about completely abandoning pipelining as the underlying method of parallel communication and of parallel processing. Pipelining will however be discussed some more in the detailed description of present invention to point out advantages that the present invention offers over pipelining.

A more demanding application will show problems inherent with pipelining even better. Consider the problem of having to perform 3D shading on large 3D model in parallel as described in U.S. Pat. No. 7,233,331(Kato). Shading calculations are about simulating light rays bouncing off between a large number of polygons, each with different texture, color, light scattering qualities, etc. Calculating something like that in parallel requires following light pathways that split and merge and which can bounce off the same polygons at the same time. There is nothing that could be connected with pipelines in such a model as specific light ray calculation means specific path followed once. Connecting polygons with pipelines to cover possible connections would make no sense whatsoever due to the almost infinite number of combinations that would result in. What is done by Kato instead, is modeling every needed light pathway out of dynamically created objects (parallel tasks to run), with a specific object being calculated when it receives all inputs that it needs by means of having his "data-slots" filled by means of message passing. At the core, this isn't that different from pipelining. Rather than have a pipe storing multiple items of data, each of them connecting two static objects, custom graph is created for each needed light path where each connection is fixed to be used exactly once, making the data-slots to be pipes that only pass one element. What are the problems with that method? Having to create separate dynamically allocated objects for every calculation makes such method of parallelism violate the basic rule of Object-Oriented Programming. Ideally, every polygon should simply implement some function performing the calculations of light bouncing off that polygon. The issue is not about following some dogma of Object Oriented Programming, but about clarity of code and especially about performance. Having to replicate parts of the 3D mesh as graph corresponding to light bouncing off polygons and to dynamically allocate memory for each step of the light pathway has got to be a massive bottleneck of the method, and is clearly indicated as such by Kato.

The key goal of present invention was to come up with a different parallel processing model, one that could utilize Object-Oriented Programming at its core, thus allowing, for example, a member function of polygon object of 3D mesh be able to calculate in parallel light bouncing off itself, be able handle multiple requests at the same time, and split and merge such requests, all as part of definition of the polygon object. Key to understanding the present invention is realizing that both pipelining and message passing dataflow have certain important thing in common. Both these methods force creation of tasks, nodes, or objects that will perform parallel operations long before they are performed. This is forced by need to know some sort of address or other identification of these objects to be able to connect them with pipes or with message passing. Eliminating that need, being able to create parallel data paths right when they are needed, opens the road to unprecedented ease of parallel programming.

In order to simplify software development, a lot of common work was being shifted to supervisory programs—the operating systems. A key part of an operating system is its "kernel"—the central program that manages the key hardware resources and lets other programs use them through common interface. At first the operating systems simply provided means for several programs to share the resources, including the processor. This meant being able to run many programs at once by constantly switching processor ownership: executing a portion of one program and then switching to the next one. Later, a messaging system has been added to handle certain functions—especially user interface in "windowed" environment. Functions were somewhat reversed. Rather than individual programs calling the operating system to provide user interface, the operating system would call the user programs with messages to process. This scheme has solved some problems inherent to control-flow programming by a method that bears resemblance to some data-flow concepts. At least the user interface was now event/new data driven rather than looping when waiting for new data. These messaging features, allowed pretty good appearance of multi-tasking and data-flow. Multiple programs elements like windows could be serviced virtually simultaneously, individual programs would not waste the processor while looping for input, etc.

Messaging methods provided very good emulation of parallel processing for the most popular computer uses. It also allowed running many independent programs simultaneously that would share all the available hardware. However, it was by no means the true low-level parallelism sought after. Individual programs would most often still be single threads processing messages received thorough single entry point. If actual, true parallelism/multi-tasking was desired for better performance, additional "threads" would have to be created by hand and the rudimentary synchronization tools would again be used to allow safe sharing of data.

To simplify software development process, numerous visual programming tools have been proposed and developed. The "flow-charting" methods simply representing regular script-type instructions through graphics did not really offer any practical advantages over script programming. More advanced methods of visual programming tools based on some of the dataflow concepts have found much wider application particularly in instrumentation markets. Prior to appearance of such tools, the users of computer based instrumentation have been forced to convert essentially parallel, data-flow type concepts (such as connecting sources of voltages to displays, switches to control lights) into extremely unnatural in this case control-flow code.

Two kinds of such partially dataflow-based instrumentation programming tools have been developed. Some of them (like SoftWIRE) allow the user to compose their applications out of "controls"—rudimentary functional building blocks where each block's action is triggered explicitly. Asserting a control's "control-in" input triggers a control's action. Once a control has finished its processing, it triggers its "control-out" output which can be connected to the next control's "control-in" to continue such explicitly designed data-flow.

National Instruments' LabView "virtual instruments" is another such a tool and is a subject of several patents. Working model here is somewhat closer to the commonly understood data-flow concept as processing happens when complete set of new data is available on inputs of a node.

By emulating data-flow interface, these concepts and systems do offer the user some degree of multi-tasking or actually good appearance of it. Success of these systems shows tremendous need for parallel, non control-flow programming tools.

Internally, the emulation of data-flow in these systems is pretty straightforward. As the data gets updated in various parts of the user-designed program graph, this triggers new graph nodes to be updated, often in very remote locations. The update requests get queued and executed sequentially, but for most of these systems' applications this passes as good enough parallelism. This method is very similar to the messaging system used by operating systems for user interface.

Originally, the entire such data-flow emulator (which could be considered the centralized operating system in this case) would run as a single thread which by nature eliminated all the synchronization/data sharing headaches of true parallelism. As the systems became more popular and performance demands harsher, the emulator was split into several threads handling tasks/update requests grouped by their nature (example user interface, instrument I/O, standard code). Later, to further meet growing performance needs, user-controlled multi-threading and synchronous multi-processing support was added. This has opened the old can of worms of the users, once again, having to create a few threads by hand and code the crude rudimentary synchronization tools (critical sections/semaphores) to avoid racing conditions and corrupting of data shared by several threads.

Necessity of the user having to assign work to be performed by separate threads and need to use the rudimentary synchronization tools substantially negate the true data-flow concept and all its advantages. However, the limitation of such near data-flow visual programming was not so much the visual programming concept itself (which is fairly universal), but the way it was implemented internally through control-flow, non-parallel code. A single visually-designed program could not naturally run on more than one processor and multi-processor use would result in need of explicit rudimentary control tools. Once again, lack of low-level, universal, multi-tasking at the core, quintessentially multi-processor programming method was the chief culprit here.

Prior-art visual programming tools created mainly for instrumentation market (LabView, Softwire) must be addressed here in more detail because they tend to make a very unfortunate claim that by merely being able to create parallel-wire like diagrams, full possible parallelism or data-flow processing can be described and achieved. If this claim were to be true even remotely, it would make the present invention completely unnecessary. However, this claim is either completely false or grossly imprecise which can be seen by studying actual details of implementation of these systems. First of all, the centralized supervisory software that queues and executes fired nodes that is used by these systems prevents this technique from being a universal programming method to construct say, operating systems, data bases, or device drivers. Second, contrary to often-repeated "hassle-free parallelism" claims made by these systems, the parallelism achieved there is not by any means an actual parallelism that is seen in, for example, data-flow computer where nodes are actual separate pieces of electronic hardware. Most of the time, the parallelism offered there is an illusion achieved by complex centralized supervisory software sequentially executing nodes fired at distant parts of the program graph. This is good enough for the specific application in instrumentation market but is by no means the actual parallelism sought by universal prior-art programming tools. Some two-processor parallelism was achieved there at great effort, by expansions of the centralized supervisory software, but even then the parallelism offered is not able to happen in most cases without the user modifying his graphically designed software. Third—existence of any centralized queue or supervisory software prevents full auto-scalable parallel execution on many processors from being possible.

The above points can clearly be seen in application notes describing methods to accomplish (some) multi-tasking in, for example, prior art LabVIEW™ system. National Instruments Application Note 114: "Using LabVIEW™ to Create Multithreaded VIs for Maximum Performance and Reliability" describes steps that are necessary to accomplish limited parallel performance with this prior-art system. To begin with, the application note concerns itself with creating two or more "virtual instruments" to be made to run in parallel. This already goes against the stated goals of actual parallel programming, where the entire code would naturally be parallel with many pieces executing in parallel, where breaking it into several logical parts would not improve performance. On page 5, the application describes various central "execution systems" that make execution of various elements seem like parallel, and the ways to properly direct execution of a specific instrument to a proper execution system. On pages 10 through 12, it describes steps that need to be taken to prevent "race conditions" from corrupting data. The methods offered include global variables that are only changed in one place, "Functional Global Variables," and semaphores. This brings the already discussed specter of hard to use, non-object oriented "rudimentary synchronization" tools back into the fold—which further shows that this prior-art system is by no means a parallel programming tool sought after. In fact, by most definitions such prior-art systems should not be considered parallel programming tools at all any more that say standard C or C++ language could be considered as such. Just as manually coded limited parallelism is possible in C and C++ at extra effort and by using the rudimentary synchronization tools, very similar limited parallelism can be achieved in these prior-art instrumentation market tools.

Another National Instruments Application Note 199: "LabVIEW™ and Hyper-Threading" shows "Primes Parallelism Example" on page 2. Stating that dataflow order forces mandatory waits for every input in a loop, a claim is made that the only way to make "dataflow" code be able to execute on more than one processor is to split it to two "odd" and "even" loops and shown on modified diagram on page 3. This claim is either patently false or at least very imprecise, since it uses a fairly standard "data-flow" term to mean something that has very little to do with data-flow as defined by computer-science literature. Even if we assume that it was meant that LabVIEW™ implements a "static data-flow" machine where a single node cannot be fired again until it processes the previous firing, the claim still does not make much sense. In any data-flow machine as understood by computer science literature coining the term, various nodes of data-flow machine work simultaneously. A system that does not do that should not be called a dataflow system. This means that if we have a data-flow graph consisting of consecutive parts A and B, as soon as A finishes work on input dataset 0, it should pass it to B and be able to start processing input dataset 1. A system that does not do that probably should not be considered a data-flow system capable of parallelism. Forcing the user to split the problem into odd and even loops to take advantage of two processors, clearly shows that LabVIEW™ prior-art system does not even begin to deal with the issues addressed by the present invention, shows conceptual limitations of the centralized supervisory node-queuing execution system used there, and proves the tremendous need for the methods of the present invention. One of the goals of the present invention was to provide universal low level tools to allow, among other things, replicating static and dynamic data-flow algorithms executing in parallel on non data-flow hardware.

In spite of tremendous need for it, parallel programming remains a black art which is only used where absolutely necessary. True multi-processor parallel programming is only used for very specific, chosen time-consuming applications running on very costly and relatively rare hardware.

Most computers used in mainstream computing still have one processor executing user programs. Multi-processor server/workstation type computers are available, but their application mostly relies generally on several separate processes sharing two processors instead of one. Rare applications that take advantage of two or more processors at once do so only for very specific time-consuming tasks and code for this is almost always written using the non-structural rudimentary control tools or fundamentally non-object oriented messaging systems.

The problem with small use of parallel architectures is not with electronics. There is absolutely no obstacle from electronics art standpoint to, for example, build a computer where there would be a small processor accompanying each small chunk of RAM memory. The problem is we simply still do not have a universal-purpose methodology for describing desired parallelism in general and programming such architectures with plurality of processors in particular.

To make computing faster, a tremendous effort is made to make series of instructions of software conceptually written for single processor somehow run in parallel. Modern processors try to pre-fetch data and code, guess forward, cache data, all in order to partially paralyze software written as non-parallel. This results in extremely complex circuitry using a lot of energy and dissipating a lot of heat, which is the direct result of most data having to go through "narrow throat" of a single processor and single high-speed bus connecting the processor with memory.

Multi-processor architecture, if it could easily be programmed in natural, self-scaling fashion, would solve all these problems. It would be cheaper, consume far less energy, and there would be no physical limits on performance as processors could be added the same way the users today expand amount of RAM in their computers. Simply observing nature proves beyond any doubt that we are only beginning to understand parallel information processing. Our huge, kilowatts of energy wasting supercomputers still cannot replicate image recognition, processing, and storing capabilities of a tiny honey bee, for example.

BRIEF SUMMARY OF THE INVENTION

The object of the present invention is to create software method, computer language, and compiler allowing natural, structural, decentralized, fully parallel software to be created for all levels software design. Just as Object-Oriented software languages sought to structurally merge data structure design together with designing operations on the data, the present invention seeks to merge design of data structure, data operation, and concurrency (defined both as parallel processing and all necessary synchronization) all into one clear, structural design process.

The goal is accomplished by somewhat merging concepts of both control flow and data flow together into one structural language. Due to its characteristics, and for brevity's sake, the present invention software language was named and will be referred to as "Stress-Flow."

Rather than specifically start several different task threads communicating with one another as was the common method of prior art, the present invention defines all elementary operations on its objects as small autonomous entities execution-wise, which run relatively small amount of code and then disappear. These autonomous entities, referred to as "Stress-Flow Atoms" are built in a way that allows clearly visible safe interactions with other stress-flow atoms. A program written completely in the spirit of present invention would consist of a very large number of stress-flow atoms. Most basic operations on code objects (members of objects/classes) would be stress-flow atoms.

A practical implementation of the present invention always needs a large pool of processors (real or virtual) dynamically assigned to the stress-flow atoms as they need them. One way or another, each stress-flow atom is a separately executed mini-thread. No supervisory thread(s) of any sort exist—just a large number of micro threads constantly coming to life and interacting with neighbor mini-threads. A practical outcome of this characteristic is that algorithms and programs written with computer language using present invention are auto-scalable, i.e. they can run without modifications or special programmer effort on a machine with one, two, or very many processors. If a specific implementation had only one or two processors, it still would "pretend" that it has fifty or a hundred of them for a typical application tested in development of the present invention. Even in such simulated environment the system runs as plurality of independent threads without need of any supervisory thread.

The present invention relies on specific layout of each independent stress-flow atom as means to overlap them with others in a large variety of ways. The present invention provides a new, fully universal parallel software method and a new computer language. The new software method can be used with existing compilers the same way object-oriented code could have been written using non-object oriented compilers. But a specially constructed or modified compiler simply makes it far more convenient and far more efficient.

As a secondary goal, the present invention was intended as a powerful extension to pre-existing languages (script and visual) (in particular C++), allowing easy coexistence of present invention code with regular/previously written computer code. At the same time, the present invention lends itself to visual composing of complex software far better than any prior-art object-oriented language and solves all problems of existing prior-art near data-flow visual programming systems.

BRIEF DESCRIPTION OF THE DRAWINGS

Embodiments of the invention will now be described in detail in association with the accompanying drawings, in which:

FIG. 2 is an example of adding elements of two arrays concurrently FIG. 4 is an example of "socket" construct use FIG. 5 is an example of object-oriented stress-flow code FIG. 6 is simple/inferior syntax for coding synchronized atom operation FIG. 7 "Dining Philosophers" example coded using stress-flow FIG. 7A is a modification of declarations in "Dining Philosophers" example FIG. 8 is an example to be made parallel and optimized FIG. 8A is code from FIG. 8 after partial optimization FIG. 8B is code from FIG. 8 after full optimization FIG. 9 shows an example of using connector construct FIG. 10 shows an example of connector construct used to synchronize one producer and many consumers of data FIG. 11 shows bad code replicating data-flow and its key problems FIG. 11A shows proper code replicating data-flow and solving its problems FIG. 11B shows methods of invoking code from FIG. 11A

FIG. 11C shows collector construct used to elegantly implement FIG. 11 code FIG. 11D shows collector construct from FIG. 11C using its own keyword FIG. 12 shows an analog circuit to be emulated digitally FIG. 13 shows implementation of circuit in FIG. 12 using present invention FIG. 13A shows best case execution timeline of code from FIG. 13

FIG. 14 shows another implementation of circuit in. FIG. 12 using present invention FIG. 14A shows best case execution timeline of code from FIG. 14

FIG. 15 shows manually generated ordered stress flow atom

FIG. 15A shows compiler generated ordered stress flow atom

FIG. 15B shows a new operator used in place of additional keyword

FIG. 15C shows manually generated ordered atom using the new operator

FIG. 16 shows code from FIG. 13 using ordered stress flow atoms

FIG. 17 shows code from FIG. 13 using last-only stress flow atoms

FIG. 18 shows inferior way to implement grouped inputs

FIG. 19 shows improved/proper form of code from FIG. 18

FIG. 19A shows modification of code from FIG. 19 that disables default path function FIG. 19B shows default-path group definition and invocation FIG. 19C shows example of "required" group path

FIG. 22 shows object declarations of code implementing diagram from FIG. 20

FIG. 22A shows data definitions of code implementing diagram from FIG. 20

FIG. 22B shows loop initiating code implementing diagram from FIG. 20

FIG. 24A show modified data definition for diagram FIG. 23

FIG. 25 shows parallel prime number calculation example

FIG. 26 shows array definition for parallel applications

FIG. 26A shows parallel prime number calculation using array from FIG. 26

FIG. 27 shows redundancy example of prime number calculation performed on two paths FIG. 27A shows syntax modification to code from FIG. 27

FIG. 27B shows code for prime number calculations with different type of redundancy FIG. 27C shows syntax modification to code from FIG. 27B FIG. 27D shows mechanisms from previous FIGs used with collector construct FIG. 27E shows mechanisms from previous FIGs used with socket construct FIG. 28A shows barrier inside visual subroutine as means to represent transition from stressed to relaxed state FIG. 28B shows special symbol on control line inside visual subroutine as means to represent transition from stressed to relaxed state FIG. 29 shows managed stack that persists as long as any references to its data persist FIG. 29A shows node assignment process in mesh architecture FIG. 29B shows how actual parameters in stress flow atom are accessed FIG. 29C shows example of passing parameters by "coercion"

DETAILED DESCRIPTION OF THE INVENTION

Figure 1:
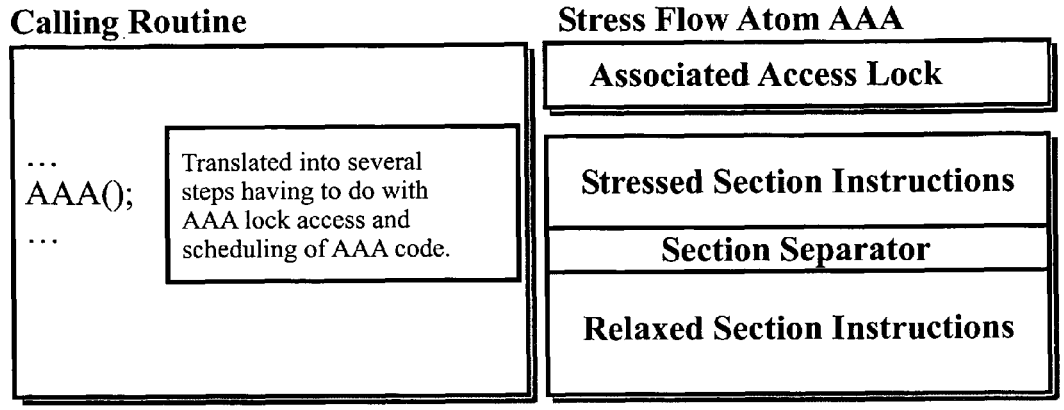
FIG. 1 is layout of a "Stress-Flow Atom"—rudimentary building block of program that uses the present invention.

The underlying building block of concurrent programming using the present invention are subroutines of special layout—further referred to as "stress-flow atoms." Each stress-flow atom comes with a built in access/synchronization mechanism and is divided into two specific parts. These are "Stressed" and "Relaxed" sections as shown on FIG. 1. One of these parts can in special cases be empty.

Very roughly—the stressed section is the part that is executed while the calling routine is constrained from doing a similar thing again. This is also where the stress-flow atom has been guaranteed exclusive access to critical context information from the calling environment. For example, the calling routine may pass an index to an array, and the called stress-flow atom may have to copy the indexed element for use later and to guarantee that the right element is used while the source array may change in the meantime. The relaxed section is entered when the stress-flow atom knows all that it needs to do its work, and so both the calling routine and our atom can go their separate ways.

The concurrency definition method of present invention is easy to understand because it attempts to mimic the real life. For example—Imagine a boss calling on a worker to perform a task. When the task is simple, there is nothing to do in the "stressed" section. The worker simply acknowledges taking the task, begins to do it alone, while the boss can go on and do something else. However, if the task definition requires cooperation with/information from the boss or third parties, the stressed section does have some steps defined in it. The worker might need to collect details of the task from the boss. He may also need to call a third party for the task to be properly defined. All this needs to be done while the boss waits to provide further details/decision and so all this work belongs in the stressed section. In some other situations all work may involve simply coordinating with others, meaning that there is nothing to do in the relaxed section.

Just as it is clear in real life—for the worker to be of any benefit, he has to tie up the boss (or other job requestor) as little as possible. Improving parallel performance in a stress-flow program requires organizing things in a way there is as little as possible to do in the stressed sections.

An actual implementation of stress-flow atom in a script language such as C/C++ might use a special keyword to indicate the end of stressed section or it can use the "return" or similar existing keyword for that purpose—with everything following the return instruction(s) automatically becoming the relaxed section. Currently, code written past "return" type keywords is considered invalid "unreachable code." Apart from the practical advantage of not needing a new keyword, the method has many additional benefits. The end of the stressed section is the last possible moment where it would make sense to return any information to the calling process—therefore, if we are to allow the useful feature of returning a value back, this is the way to do it.

Internally, the implementation of the present invention binds a stress-flow atom to a special simple critical section or lock mechanism that controls access to instances of the same stress-flow atom (or their group—this will be explained in detail later.)

Methods of Compiler Implementation

Figure 1A:
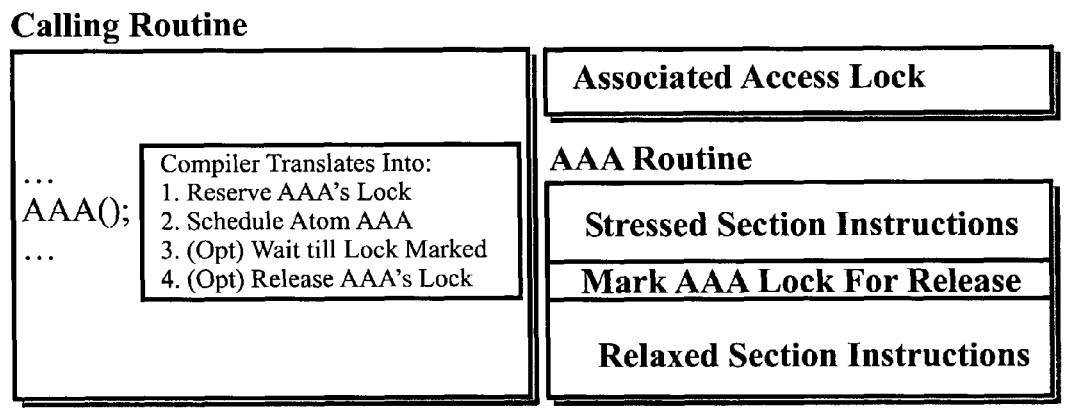
FIG. 1A is first option of implementing compilation of a stress-flow atom and of a call to it

Two methods can be used by a compiler to implement the present invention. The first method is shown on FIG. 1A. The stress-flow atom code is translated into a sequence of instructions, with "mark for release" command being called on the atom's lock at the boundary of the stressed and relaxed sections. The originating call to the atom is translated into four step process—reserving the atom's lock, scheduling to run the atom as separate process, optionally waiting for lock being marked, and releasing the lock.

Figure 1B:
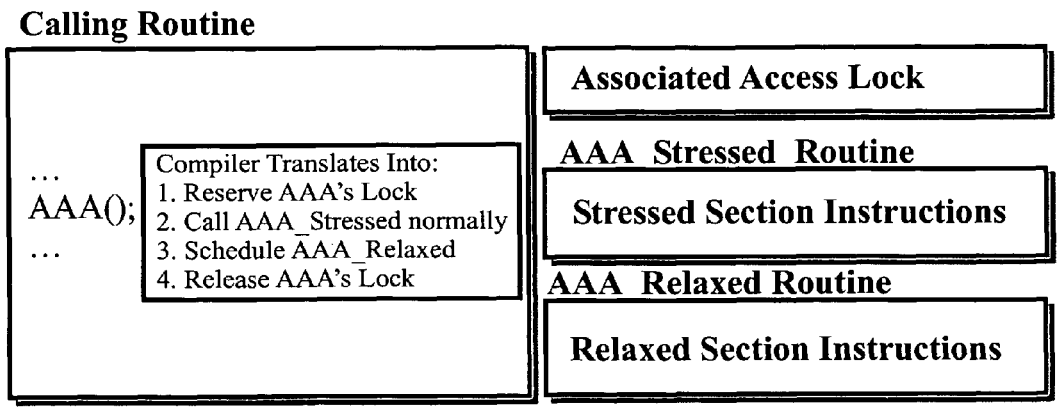
FIG. 1B is second option of implementing compilation of a stress-flow atom and of a call to it

The second method is shown on FIG. 1B. The stress-flow atom is translated into two separately callable chunks—the "stressed" part of the atom and "relaxed" part of the atom. The originating call to the atom in this method is translated into reserving the atom's lock, calling or in-lining the stressed part of the atom, releasing the lock, and scheduling the relaxed part of the atom to run separately. The second method may appear simpler and more efficient, but is far harder to implement. The problem lies in the fact that the whole functionality of the present invention requires the relaxed section being able to access both parameters passed to the stressed section and local variables declared in it. To accomplish that in the second method, the stacks must be switched or copied around and this is what makes the first method easier to implement at least in the situation where special new compiler is not written from the scratch. This problem is even more pronounced in actual multi-processor implementation of the present invention where there actually are a large number of processors, instead of just one or two. In such a situation, the newly called stress-flow atom should be run on a separate processor. The second method always amounts to running the stressed section in the same processor/thread as the calling routine. If most of resources accessed by the stressed section are closer to the target processor (which is the outcome of good object-oriented code), running the stressed section on the calling processor would make absolutely no sense performance-wise. Furthermore, when all code is written according to spirit of the present invention and the calling routine needed no values returned from the stress atom, the calling routine would not even have to wait for the scheduled stress atom to begin executing if the first method of implementation was used. A calling routine would only be stalled if it wanted to call an already scheduled stress-flow atom again. This would provide a performance boost especially in multi-processor/distributed systems using this invention and communicating through a slower medium such as network cables. However, allowing this particular optimization would require the compiler to be able to detect and warn about data accesses incompatible with this optimization method.

For all these reasons, as the methods are logically interchangeable, choice of the method 1 or 2 is only the matter of performance optimization for specific target hardware. To the user, it absolutely makes no difference which compilation method was used as they both produce the same functional outcome. Both methods can be used and in fact were used to implement and test the present invention on currently available microprocessors. It is however possible to develop special hardware which would implement all necessary synchronization steps of this invention by means of special instructions.

The stress-flow atom lock is a special critical section that allows just one execution thread to reserve it. If a stress flow atom is already reserved, an attempt to reserve it suspends the caller and places its identifier in a queue so that it can be restored when the moment the previous user releases the lock. Scheduling process of a stress atom simply means marking the atom for execution as soon as possible.

Basic Programming Example

FIG. 2 shows an example of adding elements of two arrays concurrently in C/C++ language extended by present invention as the simplest example how the present invention achieves concurrency. The example is purposely trivial, but it actually is a template for performing very useful and complex matrix operations in parallel using the present invention. For example, to convert this template into a very useful code for multiplying two matrices, A, B, and C would be defined as matrices and the C[i]=A[i]+B[i] instruction replaced with loop calculating a single element of the result matrix. Keyword "detach" differentiates a stress-flow atom from a regular procedure. The choice of naming is dictated by the fact that there are several ways to use the stress-flow atom stressed/relaxed structure concept, with other keyword(s) needed, which will be explained later. The initiating routine "add_arrays" calls stress-flow atom "add_item" in a loop. Since "add_item" has nothing in the stressed section, it immediately releases its lock and starts to do its time consuming job while the calling routine continues with its loop. Up to "n" add_item atoms are soon running in parallel if only there are enough processors (real or virtual) waiting for work. If there were only k processors available at the moment, "add_arrays" will stall while trying to initiate execution of k+1 call to "add_item." Since previously scheduled "add_item" number k is still waiting for a processor, it was unable to mark and release add_item's lock. As soon as add_item k gets the processor, it releases add_item's lock which resumes operation of add_arrays.

In order for the example to be of any use, there must be a way to know when the whole job is finished. This is accomplished by means of add_item calling "done_item" stress-flow atom. Unlike add_item, the done_item has all of its work inside the stressed section. This is necessary, because its job is to properly count all finished add_items and this requires not allowing more than one process to run that code at a given moment. Since "done_item" has no relaxed section at all, a good implementation of compilation of the example would only insert proper done_item lock "reserve" and "release" instructions, without trying to make calls to done_item run as separate processes—no defined relaxed section denotes nothing that needs to be run in parallel. In fact, a properly optimized compilation of "done_item" on multi-processor architecture would simply issue proper "interlocked" increment-and-compare shared memory access commands.

Figure 3E:
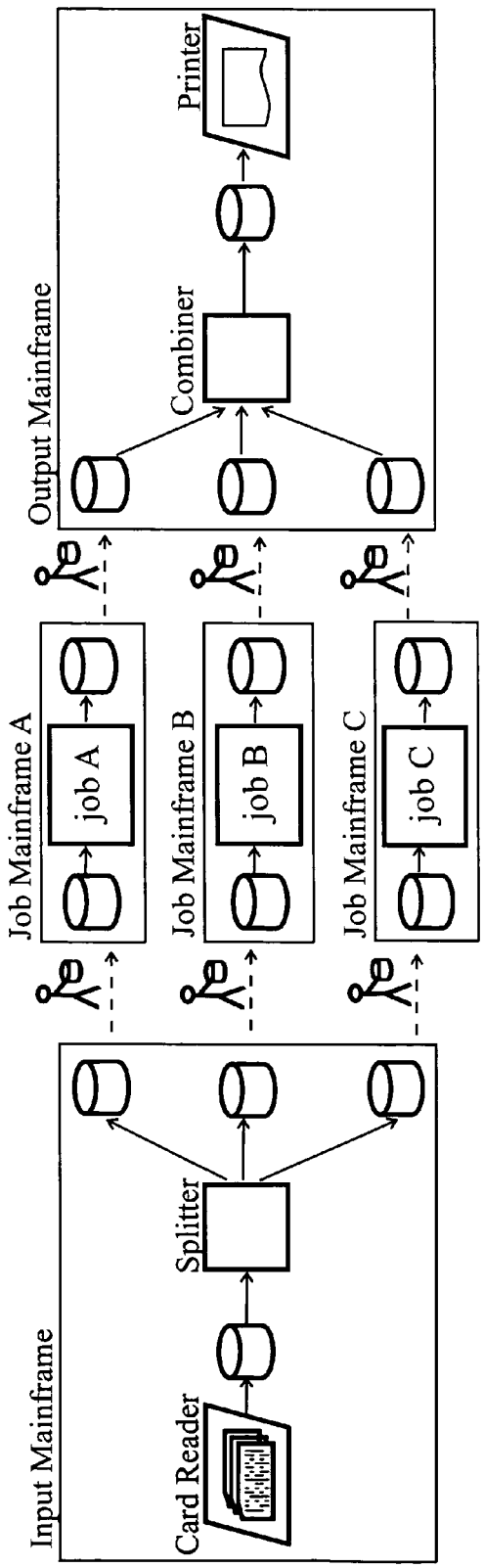
FIG. 3 is a better written example of adding elements of two arrays concurrently

In order to stress this function of exclusion better, the needed variables (only to be accessed in stressed operations associated with specific lock) should be defined together as part of the same "detach" structure. Modified, more proper original example is shown in FIG. 3. Variable "total_count" is declared together with all the operations on it: "done_item" and "zero_count". This structural method is not only making code clearer to the reader. It also allows the compiler to either completely disallow access to "total_count" outside stressed sections of "done_item" and "zero_count"; or encapsulate it with the reserve/release instructions for the lock shared by all three items listed within discussed detach block. Existing in any object-oriented language mechanisms ("public" or "private" designators) can be used to indicate which outcome is desired.

The example described above is good to begin demonstrating the present invention as it uses extreme cases of stress-flow atom layouts—one having nothing in the stressed section, the other having nothing in the relaxed section. The full strength of the invention is however the fact that both stressed and relaxed sections can initiate calls to other stress-flow atoms. The placement is clear means to declare what needs to be done while tying up others and what cannot, what may happen in parallel on the some data and what is forbidden. In particular, all exclusion of others from shared resources is done through placing code in the stressed section, all actual concurrency is accomplished by placing code in the relaxed section.

Looking at example at FIG. 3 instantly brings two questions: is this really parallel programming and if it is, can it really be that simple? Parallel programming is supposed to be a black magic, an art available only to few and requiring a lot of work to create separate tasks, decomposing data into blocks worked on by different tasks, then recombining the results, etc, as well as dealing with pipes, semaphores, critical sections, message channels, etc. How can a few lines of code replace all that?

To be able to explain these issues and show how present method achieves parallelism, some history of computing has to be discussed. Unfortunately, a lot of methods we use are not driven by logical choices of what would be the best method today, but what was the only available method many years ago.

Prior Art. FIG. 3A shows how execution of the example of FIG. 3 looks like without parallelism. The add_arrays function would call add_item from a loop. The time diagram shows that most of the processor's time is spent inside the add_item code, add_array being limited to issuing the call command with each iteration of its loop. How to make calculation like that to execute on say 3 processors instead of one? The oldest method of doing that, known as pipelining, is quite complex. First, a special kind of data buffer (known as a pipe) had to be created. A pipe would have to be able to store many items of data. It would be written on one end by one task (the producer) and read from the other end by another task (the consumer). The underlying purpose of the pipe was to allow the producer to output data whenever it wanted to and the consumer to take it whenever it wanted to. A pipe automatically suspends the producer if it tries to write to pipe filled to capacity and it automatically suspends the consumer if it tries to read from empty pipe. To perform calculation from example on FIG. 3 in parallel, the layout of the processing would look like what is shown on Prior Art FIG. 3B. Procedure add_arrays (now separate task) would work as before and write out of a loop the data to process by add_item. But, it would not call add_item directly, but write the data to process to a pipe. That pipe would now be connected to some task called splitter that would read data from one pipe and write to three of them. Three tasks A, B, and C would be started, each of them reading new data from their input pipe and running add_item when they got it. A splitter could be implemented as a more elaborate version of a pipe, one with one input and several outputs to avoid running the splitter as a separate task, but the functionality of the model would still be the same. The splitter could split data in perfect order 1 to A, 2 to B, 3 to C, 4 to A, etc, or it could use some application specific way, but everything else would still be the same.

FIG. 3C shows what the present invention does instead. It calls add_item as it would in non-parallel programming. The difference is that add_item is now a differently declared function, a stress-flow atom consisting of two parts: stressed and relaxed. Each call to add_item results in starting a new task, an instance of add_item. The process of generating a new instance of add_item running as a separate task is as follows. First a free task resource needs to be obtained to run the new instance and the lock associated with add_item has to be reserved. Once that happens, add_item starts and executes its stressed section instructions while add_arrays is stalled. Once the separation point between stressed and relaxed section is reached, the lock is released and add_arrays continues while the new instance also continues as completely separate task while running its relaxed section instructions.

As stressflow atoms generally run some list of instructions and terminate, as opposed to running endless loops, task resources (processor and stack) can be reused by another stressflow atom as soon as the previous stressflow atom using them reaches its last instruction. If there is nothing declared in the stressed section and enough free tasks are available, new tasks will be started as fast as the pipeline model was filling the pipe. If no free task is available, add_arrays will get suspended until a task becomes available. That is one difference from pipelining model. In pipelining model, the first producer in line generally fills its pipe to capacity, which is not that good of a thing. It does not really make sense to produce data to process much faster than it can be processed.

When the stressed section has some instructions in it, the add_arrays will be momentarily delayed while these instructions execute. This allows a stressflow atom being called to access some data directly from the caller while guaranteeing that the caller (a separately running task) does not change them thus creating a so called "race condition", and also guaranteeing that some caller does not create another instance of the same stressflow atom, with that new task also trying to access or change the same data thus also creating a race condition. The pipelining model did not have to deal with that issue because it had to store all that the task needed downstream in the pipe. It automatically eliminated the possibility of the race conditions, but was it really such a good thing? If two processors did not share memory, pipelining was the fastest way possible, but when they do share memory, pipelining can be a waste. Let's imagine that the items 'some_type' of array A used in example of FIG. 3 are very large structures, all of them already in memory. Copying them into pipe makes no sense if they can be accessed by all tasks, as long as the accesses are guaranteed to be safe. Stressed section is guaranteed to be accessed by one instance of add_item at a time by means of the lock associated with stressflow atom add_item.

The stressed section serves far more purposes that can be explained in this simplest example. The other uses will be explained in later parts of this description. Please note how much simpler parallel processing has become with the present invention. No pipes, no splitters, no combiners, no manually starting tasks. What could be the reasons that such cumbersome methods were used? Some of them were very real limitations of old processors and some of them are simply historically induced habits. Present invention operates by means of dynamically allocated tasks. Old processors could not allow something like that because they could not manage the program stack as well as modern processors can. With the old processors, the program stack had to be allocated statically to the maximum length ever used and the program would either have to be terminated or (what's much worse) would act erratically and destroy RAM data if the stack limit was exceeded. This is why tasks running on old processing hardware had to be created manually, each of them with carefully selected maximum program stack size. Today's processors, thanks to paged memory systems, can detect stack reaching its limit and expand it in place, making this problem null and void.

This leaves the other issue, old habits dying hard. Pipelining is the method of parallel processing that remembers the times of first mainframe computer with more than one processor, and it could be argued that it existed even long before that. Prior Art FIG. 3D shows a typical mainframe computer of the 1960s. A card reader process would read cards as fast as possible into disk. A job process would read the cards from the disk, process it, and output results into the same or different disk, which would then be accessed and printed by the printer. Note that due to the way card reader and printer worked, the disc files shown on that diagram already would act as and be implemented as pipes whenever it was possible. Card reader could not wait until some job process would read its cards. It would try to read all the cards as fast as it could.

Now let's imagine someone having far bigger jobs that could be handled by a single mainframe. The solution was to buy and use more mainframes as shown on Prior Art FIG. 3E. Card reader would read the needed data, a splitter job process would divide them into say three chunks and place them on disks or tapes that would at first be carried by hand to the three separate job mainframes. After the job mainframes finished their processing, the three part result would be carried into a single, same mainframe, run through a combiner process to be printed or otherwise produced as combined end result. Once that practice became wide-spread, it created a marketing dream for any hardware supplier willing to offer computers with more than one processor, which in the case of mainframes happened in early 1970s. A mainframe with more processors and more RAM could instantly make the process of Prior Art FIG. 3E orders of magnitude faster. Having several processors connected to the same disk drives and/or RAM would speed up the processing several times and do it (what's very important) without need to rewrite any software. See Prior Art FIG. 3F.

The key idea was to be able to direct two processes to use disk file acting as a two-ended pipe device, or better yet direct them to use a part of RAM acting as such a pipe. The specific term "pipe" is the name of such a construct introduced by Unix in 1970s and it was precisely about allowing such a device to be allocated in RAM or on disk and used exactly the described way. This is how we arrive to the well known model of parallelism through pipelining shown on Prior Art FIG. 3F and still used today through various ways including Graphical User Interface development systems as described by, among other prior art, U.S. Pat. No. 5,999,729. Note that the biggest problem of pipelining is that the core model only allows splitting data of same type into similar identical paths processing data in parallel and not having to know or to access each other's data. This is not physical limitation but shortfall of that model of processing which cannot really be dealt with in a universal fashion. In such a situation the famous black art of parallel programming is required with all sorts of tricks being used to communicate between identical tasks through hard to use rudimentary concurrency control tools. This is what is being done with custom "parallel modules" in U.S. Pat. No. 5,999,729. Any parallel processing that cannot be done by breaking it down to several totally independent paths, each of them knowing nothing about what the other paths are doing, requires application specific and hardware specific custom module in order to be able to exchange data between several tasks. That's what always happens when foundations of some method are strictly set but someone tries to break rules of those foundations, without changing them, thus coming up with magical "black-art" tricks to make it work. Generally, such black art methods end up being more costly than starting with better foundations, but this is rarely seen at the beginning of the effort. The additional problem is that if all that parallel programming black art is not done properly and interaction of these tools with pipes is not defined carefully, this leads to deadlocks which are hard to diagnose and fix. But something like that is done all the time because it is hard to throw away old, trusted and tested methods and try some new ones.

The first step toward real parallelism is being able to break away from the "serial" way of thinking. And the pipelining model has that serial mentality engraved to the core. At the days when pipelining started, a typical expensive mainframe computer would have say 256 KB of RAM, or the amount orders of magnitude less than today's simplest electronic toy has. This meant that during those days under no circumstances was it possible to hold in memory even a simplest database or even indexes to a simplest database. Let's now imagine that we have 5,000 records to update the database with. To be able to do it, the programmer would first have to sort the new records by the same key the target database used. One way to do it was to read the new records one by one and insertion-sort them inside RAM. Once the maximum number of records that RAM could hold was reached, let's say a 1000, that 1000 sorted records had to be written to an output file. The end result of this process was new records being split into 5 new files, each with 1000 sorted records. To now have one sorted file with 5,000 records required combining those 5 files. The way to do it was by reading all those 5 files together as 5 inputs and combining them in proper order into one output file. That output file could now be read (serially again) together with records of the target database, to be combined together with it, producing one output file, the newly updated database. Note that the reason this was done that way was only because of RAM limitations. Today, almost nothing should be done with such "serial" methods because there is always enough RAM to keep indexes to even largest databases in RAM throughout entire processing. Sorted index in RAM allows instantaneous insertion of records by means of binary insertion. For these reasons, splitting, serial processing, combining are the terms from the era of the mainframe, and unfortunately, the pipelining processing model is completely infected with that way of thinking.

At the very core, having to divide anything by hand only to satisfy some old model of processing is not a good thing, as it arbitrarily forces certain number of processing nodes. The ideal method of parallel programming should allow defining a program which, without any changes, would properly run on 2 processors, but could also run on 50 or 1000 of them, but much, much faster. That's what inherent parallelism is about.

Figure 3F:
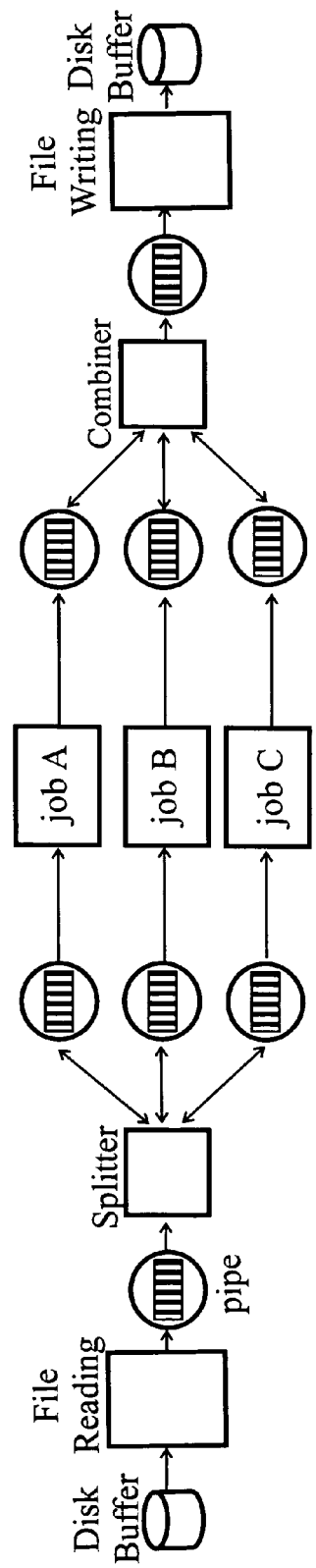

But, for the sake of experiment, let us suppose we want to do exactly what is done on Prior Art. FIG. 3F while using the present invention. As we may have 10 or 100, or 1000 processors, it makes no sense to split data of the same exact type into 3 or even 10 processing paths as it arbitrarily sets the number of processors to use. Suppose we have a function 'job(a)' taking an element to work on as parameter and doing what job A, job B, and job C processes were doing with a single data element and returning the result. We would have to implement two simple stressflow atoms and main function reading the input.

```
detach    atom_out(element a)
{     cout << a;
};
detach    atom_job(element a)
{     return;
      atom_out(job(a));
};
void    main    ()
{     element a;
      for(;;)
      {    cin << a;
           atom_job(a);
      };
};
```

The example is quite similar to example of FIG. 3, except for that example has user programmed means to terminate computation at certain point, which with pipelining tools is often done by means of some centralized supervisory task as opposed to being defined locally as part of functions performing calculations.

Note that 'atom_out' and 'atom_job' are both defined as stressflow atoms, but having slightly different structure. Every invocation of 'atom_job' instantly starts new task up to the number of processors available for taking the work. When the system runs out of processors, function main is suspended until a processor becomes free. Stressflow atom 'atom_job' has nothing in the stressed section, and does its work out of the relaxed section. If function 'job' takes a long time, soon most available processors are running instances of 'atom_job' and execute instructions within the 'job' function. The result returned by function 'job' is passed as parameter to 'atom_out'. Stressflow atom 'atom_out' performs writing to output inside its stressed section. Doing this inside relaxed section would corrupt the output by having bytes from different results interleave each other.

The entire operation of the pipelining example was thus replicated with a tiny number of code lines in superior, performance-wise way, without pipes, arbitrary partitioning of data, without splitters, combiners, or anything like that. Data being sent into many instances of the same stressflow atom is all that is needed to do parallel processing simultaneously. Bringing the results safely into a single object, in this case single output, is all that is needed to recombine the results.

In ideal parallel programming, splitting data-paths is only needed when one single item of data has to be split into two or more different parts that are then worked in parallel on by completely different procedures. To do that, the two stress-flow atoms would be called with different pieces of input data instead of one, as it was done in function 'main' in the example above.

Abandoning the need to explicitly start tasks combined with a way to safely access shared resources by multiple tasks is the essence of present invention. But, that is only the beginning of the journey that leads to a number of surprising new tools and unprecedented ease of parallel programming. Together, they allow unprecedented ease of programming any parallel problem.

Construct for Interfacing with Legacy Code

The previously shown example of concurrently adding two arrays used an "all_done" function-call to report that the entire array has been added. In a project written entirely in spirit of stress-flow, the "all_done" function could simply be a call to another stress atom that would now use the result for something, call more atoms, which could eventually call our "add_arrays" again. However, recognizing the need to supply tools to easy coexist with code written previously, the present invention included a "socket" construct to make it possible.

A socket construct is a special case of stress-flow atom that is not defined as a separate function but rather inside another function or another stress-flow atom. Other than that, it has all elements of regular stress-flow atom (an associated lock, stressed and relaxed sections, etc). Therefore, a socket is intended to be declared together with other regular atoms inside a "detach" or other stress-flow block. If a socket has a return value, this value gets returned to the caller through stressed/relaxed section separating return instruction.

Modified example of concurrent addition of arrays using socket construct is shown on FIG. 4. Socket "all_done" is declared ahead of its use in atom "done_item," and is declared inside "add_arrays" function. Once add_arrays finishes its loop of scheduling n of "add_item" atoms, it gets suspended waiting for "all_done" to be triggered. This happens when all finalized add_items report which triggers call to "all_done."

Routine "add_arrays" now resumes and returns to its caller, with all the results correctly calculated and stored. Thanks to "socket" construct, add_arrays could now be called from regular (non stress-flow) code just as if an ordinary non-parallel routine. Simple fact that add_arrays was declared as stress-atom itself with stressed section only guarantees that no new call to add_arrays will start before the previous one returns.

Object-Oriented Example

The examples above used globally defined data and routines and therefore were not an object-oriented samples of code. Apart from lesser clarity, that program would not be able to add two separate sets of tables at the same time. A proper object-oriented version of the same programming example is shown on FIG. 5. Data and operations on it are defined as part of one structure/class/object. The present invention adds parallelism elegantly to it. All previously described atoms are now member functions, including our entry-point "add_arays."

A fundamental principle of stress-flow invention is generating internal locks together with each detach function or detach block, in this case of member functions the locks will be inserted as invisible member variables. This simple principle is all that was necessary to create object-oriented parallel programming using stress-flow invention. Our example results in several automatically compiler-generated locks—now all these locks become part of every instance of object Array. Separate instances of Array can process themselves in parallel because they have all necessary synchronization mechanisms automatically replicated.

All object-oriented rules of variable/function location and scope apply to automatic generation of the stress-atom locks. Member stress-flow atoms have member locks. Static stress-flow atoms have static locks. This is as natural from object—oriented standpoint as possible. Please note that important part here is the definition scope of the lock—and not necessarily the location. If a computer was built completely according to the concepts of present invention, the locks could even be implemented and allocated in special hardware. What this would mean as far as translation of object oriented code would be that locks corresponding to class member functions would be replicated for each instance while those corresponding to global or static functions would not.

Competing for Resources

One of the keys problems of parallel programming is several processes competing for limited resources and using them in such a way that does not lead to deadlock.

"Dining Philosophers" is a well-known textbook example used to demonstrate the problems of competition for resources and of possible deadlock. The philosophers' (usually 5 of them) spend their time thinking and eating. They sit around a circular table with forks placed between them. There are only as many forks as philosophers, they need to share them and, as they eat spaghetti, a philosopher can only eat when both left and right forks are available. This means that none of the particular philosopher's neighbors can be using forks for him to begin to eat. If the philosophers were undisciplined enough to grab forks when one was available and then wait for the other one, this would quickly lead to deadlock, which in this case would mean each philosopher holding one fork and forever waiting for the other one to become available.

Ability to code this abstract example in a clear and brief manner has been for a long time a test of parallel programming techniques. Dealing with such issue in straightforward, natural fashion has been a declared goal of the present invention. The best prior art method of SCOOP/Eiffel proposed solving this issue by issuing some "eat" call with proper left and right forks as parameters. To indicate that forks were shared resources competed for, the arguments were proceeded with keyword "separate." A compiler would generate proper code to obtain access to both forks as part of the call to "eat." This is a fairly good method, but it still does have some big problems. First is the fact that the programmer still has to remember to mark everything "separate" as such. This undermines ideal object-oriented principle in which object "fork" should declare itself the right way to be used and disallow all other ways. Second problem is even more troubling. If object B is separate from A and C is separate from B, how do we make A not be separate from C if we so desire?

Stress-flow method of solving this issue needs a fork object to have a properly defined "take" atom; while using two forks at once requires calls to both atoms to be declared as one instruction. Stress-flow language could do it by defining some "synchronized" keyword beginning a block listing all compounded instructions there as shown on FIG. 6. This method simply declares a list of things to do together without much flexibility—one level, ordered list of instructions. Fortunately, there is a more concise and easier to understand way. We do it by making calls to both forks part of the same instruction. Many languages already allow an expression where even two calls not returning values or even say two variable assignment instructions can be combined into a single expression. This is done by means of the comma operator. For example, "i=5,k=8,exit(1);" is a completely legal single C/C++ instruction.

Listing of the "Dining Philosophers" program coded using stress-flow language is shown on FIG. 7. This is a complete code that includes all necessary declarations, all synchronization, all process initialization. Brevity shows the advantages over all prior art, which required several times more code to accomplish the same goal. Two objects are defined "Fork" and "Philosopher." Objects that have all their elements inside a single detach statement can have the detach keyword placed as modifier of the entire object. This feature was used declaring object "Fork"—which has only one element—a stress-flow atom "take." Object "Philosopher" declares a static array of forks, function "eat", function "think", and the Philosopher constructor. The array of forks is declared static because it is shared among all the philosophers. The Philosopher constructor function is a stress-flow atom with instructions in both stressed and relaxed parts. The stressed part needs to store information identifying the philosopher location so that proper forks are used. Static int variable Ph_Cnt keeps count of philosophers allocated so far. Fork pointers to be used by the current philosopher object are calculated from it. If these instructions were erroneously placed inside the relaxed sections and got executed in parallel, wrong fork pointers would often be stored. The "return" instruction marks the end of the stressed section and this is where "Philosopher" begins his cycle of thinking and eating. Since this "for" loop is placed in relaxed section, all philosophers "live their lives" simultaneously. As it needs no cooperation with others, the thinking step involves just calling the proper "think" routine. Eating part involves obtaining both forks and then doing actual eating and this is exactly what our compounded eating instruction says:

LeftFork->take( ), RightFork->take( ), eat( );

Logical meaning of it is exactly what it says: take the left fork, while still holding it take the right fork, and while still holding both—eat. When stress-flow calls are compounded together like that they work as one. If we wanted to change some data after all the locks are reserved but before any of the stress atoms run, we could do it in the same instruction as well:

k=1,LeftFork->take( ), RightFork->take( ), eat( );

This method can be used, among other things, to safely pass parameters to called stress atoms by member or global variables, rather than by parameters.

Here is how this code is compiled. Every time a single instruction is compiled, the compiler identifies all stress-flow atoms used in the instruction and builds a list of them. Instructions for going through entire list and reserving lock of every stress-flow atom found in the compiled instruction are placed before the regular compilation of the expression. Calling a stress-flow atom was previously defined as a multiple step process precisely because the lock reserving/releasing steps had to be separated from the other steps and placed together with reserving/releasing instructions of other compounded stress-flow atoms.

Unless all locks on the list can be reserved together, none of them are. The way this is done in practice is by going through the list and reserving each of them if they are free. If a lock is not free, the code needs to go back and free all locks reserved so far, and then issue lock reserving instruction for the busy lock. This will place our execution thread in queue waiting for the busy lock and then suspend it. All suspended threads will therefore queue in currently most contested resource and will be restored one by one as the previous user frees it. Thus restored thread will try to reserve the entire list of the needed locks again.

If the "eat" procedure had to do some interfacing with the "Fork" objects, it is perfectly OK as entire eat (or its stressed section if it were a stress-flow atom) runs while both needed forks are reserved. All three atoms/routines could now safely interface with each other any way it was necessary while in their stressed section and then do some processing fully independently in their relaxed sections if this was desired. To make this matter between forks and eating even more clear, both "eat" procedure and the Fork definitions could be placed inside an detach statement as shown on FIG. 7A. The extra lock is not at all necessary, but Forks would be shown to be a resource only accessed when eat is its stressed state.

The process of encapsulating entire expression within lock operation instructions would be applied to all expressions, therefore, the result would be the same if "take" function of Fork object returned values and, for example, these values were added. Exactly the same happens in case stress atom functions called from expressions used as parameters to other calls. This way, if the "take" routine returned some pointers or IDs needed by the eat routine, the whole philosopher "eating" step could look like this:

eat(LeftFork->take( ), RightFork->take( ));

The ordering of instructions would be same as before due to order in which the compiler must always process such instructions: parameters must be evaluated before the "eat" call. Furthermore, if function "take" was implemented as C++ pointer/ID type operator overloading or simply were some data placed in the "detach" block, the instruction could just look like this:

eat(LeftFork, RightFork);

This roughly mimics the goals of SCOOP prior art method with the very important difference that here it is just only one of many coding options naturally available through far more powerful and clear syntax and method, while in SCOOP this was the only method accomplished by declaring parameters to "eat" as "separate." But even that mimicked syntax carries extremely important difference. In our example, simple definition of each fork created all necessary mechanisms to properly use that fork rather than requiring/trusting that function on every possible user of forks. Another critical difference is that in present invention the forks create themselves as needed rather than having to be created ahead of time as was the case with SCOOP prior art.

The "separate" parameter method as means of synchronization is also very ambiguous in case where more than one level of operations are to be performed: if a separate argument needs to be passed further, does it remain only one-level separate or is separate from the first "separate" process/call? No such ambiguities are at all possible with the stress-flow method, where critical synchronization rules of using a specific object can be clearly defined within that object itself rather than by having to be declared by its users. SCOOP programs also could not even begin to express the flexibility and power of the present invention accomplished through the stressed/relaxed code composition idea.

Optimization of Parallelism in Present Invention

As briefly mentioned, parallel performance of the stress-flow code is increased by moving as much code as possible from the stressed section to the relaxed section of each of the stress-flow atom. FIG. 8 shows a simple example to optimize. The code is invoked externally by repeated calls to routine "Go." External routine "Get_Data" obtains an array of raw data. This raw data needs to filtered using routine Calc_MA with a hundred different filtering depths. Every case of resulting filtered data needs then to be processed by external routine "Run_Sim." The un-optimized code of FIG. 8 stores both raw and filtered data in SimData structure member variables. As all our code is in stressed sections of routines "Go" and "StepA," the code has zero parallelism. Even if the target hardware had hundreds processors available, the FIG. 8 example would take just as much time to execute as if the target hardware just had a single processor.

Simply moving code from the stressed to relaxed section of routine "Go" would produce erroneous code. Since "RawData" is declared as "SimData" member variable, consecutive calls to "Go" would all be filling "RawData" with new sets of data before the previous one could be processed. Constructing code that way would be a logical error, but one that could easily be detected by a compiler due to structural clarity of parallel processing declarations of present invention. A properly constructed partial optimization of example code is shown on FIG. 8A. Both "RawData" and "MAData" arrays are now declared as local variables, which means they are located on separate stacks of every invocation of "Go" and "StepA" stress-flow atoms. Entire code of "Go" can now be placed in relaxed sections. However, placing all of the "StepA" routine code in relaxed section would not be correct. It needs to access "RawData" array that is allocated on stack of "Go" atom. Unstressing the "Go" atom before a given set of "RawData" is completely processed would result in routine "Go" finishing and its stack reused by some other stress-flow atom. For these reasons, all "StepA" code that needs to access "RawData" is placed in the stressed section. The rest is placed in relaxed section.

Full optimization of discussed code in shown on FIG. 8B. Both RawData and MA_Data are allocated on the heap. It is assumed that garbage collector is operational, meaning that memory used by both arrays will get released the moment the last pointer storing their addresses gets destroyed. As RawData array persists on heap as long as valid pointers to it exist, all of StepA code can now be placed in the relaxed section.

Side Note: Garbage collector was not part of original C language behavior. It was however added later and is part of many C++ compiler implementations. Such garbage-collector enabled pointers are often called "managed pointers" or "smart pointers" by various authors. Internally, every allocated block memory has a usage counter associated with it. All pointer operations automatically increment the usage counter whenever a separate variable points to it and decrement the usage counter whenever a such variable is destroyed or made to point to another block. When the usage counter reaches zero, the memory block can be safely released.

If the compiler was modified in a way where each stress flow atom would maintain a pointer/reference counter for all anything allocated on the atom's stack, that stack can be automatically maintained until the usage counter drops to zero. This would allow having the same code as shown on FIG. 8B but with variables that would be kept on the stack and not on garbage-collected heap. This solution is actually most efficient from the standpoint of optimal performance and perfect object-oriented design. As such, it will be assumed to be a standard feature of the compiler based on present invention in the reminder of this document.

Unexpectedly, the organization of data in stress-flow programs becomes far more logical than in non-parallel programs. To allow better parallelism, only the data that is persistent beyond several directly communicating atoms should be declared as member variables. For example, the object-oriented matrix processing "Array" object presented on FIG. 5 needed the array declared as a member variable because, on the lower level, many atoms were processing different elements of the array and needed to access it together. However, the actual use of the "Array" object should most likely involve declaring "Array" objects locally or on heap as much as possible, to allow better parallelism.

Following these rules quickly produces code that has all the characteristics and advantages of data-flow concept. The crucial difference that with stress-flow it still is possible to have a structurally persistent data and not just the data that gets passed as the "flowing" values. Lack of a natural method to represent such structurally persistent data was the biggest problem with most attempted universal data-flow multi-processor computer architectures. This was the critical weakness that has prevented wider application of data-flow computer architectures.

This trivial example also shows parallel self scalability of the present invention. If all Get_Data, Calc_MA, and Run_Sim were time consuming operations and routine "Go" was called 100 times, our code would instantly be using almost 200 processors and performance boost would be almost 200-fold. If Run_Sim was modified to be a properly constructed stress-flow atom itself, almost 300 processors would be used in parallel.

Advanced Connecting of Stress-Flow Atoms

In all previous examples if a stress-flow atom wanted to invoke one or more stress-flow atoms, it had to do it explicitly by calling each of them by name. There are instances, however, when it is desirable for a stress-flow atom to be designed in a way that would allow it to call a dynamically created list of atoms. Another way to look at it is as a dynamically created call-me list to which other atoms would add themselves. This concept takes us even further toward being able to replicate data-flow concepts.

For example, suppose we have a timer that "ticks" every couple of milliseconds and we want to be able to have a list of stress-flow atoms to be activated with every tick. Another example would be an event such as a key being pressed on the keyboard or mouse being moved that need to be processed by one or more separate processes. Such a construct can be roughly created in an object-oriented language on top of the present invention as a "standard-library" type addition without need of special keywords. This is however a very important feature of the present invention—one that makes the invention far more usable, justifying making the feature as part of basic syntax of a language implementing the present invention. Due to characteristics of this construct, it is referred to as "connector." To create a connector, the user would simply type the following declaration:

connector <name>(<list of parameters>);

The command to "connect" an actual stress-flow atom to a connector could look like this:

<connector name>.connect(<stress-flow atom name>);

A special operator made for that purpose will make matters more clear:

<connector name>=><stress flow atom name);

An example of connector construct application is shown on FIG. 9.

To an invoking routine, the connector and its invocation is exactly the same process as calling a single stress flow atom: reserving its lock, scheduling its contents, being suspended while waiting for the lock being marked and releasing the lock. However, each of these steps is internally translated into consecutive loops on all elements stored in the connector. If parameters were passed, a copy of actual parameters would have to be prepared for each connector element.

At first the connector concept does not seem particularly earthshaking. It is however an essential tool for creating truly object-oriented programs where all desired synchronization and parallelism is integral part of object definition which was the main objective of this invention. The usefulness comes from the fact that the connector is built from a number of assigned stress-flow atoms and thus inherits and bounds all their stressed/relaxed features and resulting synchronization together. Suppose we need to deal with some piece of data that is constantly being changed. The piece of data is so large that it does not make any sense to store it more than once. However, we need to be able to let a number of unspecified objects to be able to process the data before we allow this data to change again. A stress-flow solution of this problem is shown on FIG. 10. To change the cached value, outside process calls stress-flow atom "change" with a parameter defining the way the cached value is being changed. This changes the value and calls the "changed" connector which causes all objects interested in being scheduled to do their job. A large number of new atoms/processes can now automatically come to life as a result of one statement. Due to the fact that that all this happens in the stressed portion of the "change" atom, the process calling "change" is now being stalled and prevented from changing the value until all atoms connected to the connector properly process/copy everything they need from the value. Without knowing absolutely anything about neither the process causing changes in "value" nor multiple processes running in parallel that need to process the changed values, our simple, and very concise definition defined a very advanced interaction between them.

The most commonly used connector repeats the actions of a number of stress flow atoms compounded into single expression, meaning that invoking the connector would stall until locks of all member atoms could be reserved together. A modified connector that would ignore currently unavailable atoms and only reserve and run the ones currently available could also be useful in many circumstances.

Merging Stress-Flow Atom Paths

The above chapter has shown how present invention is capable of roughly mimicking a data-flow system. It will now be discussed in detail how all the present invention naturally solves all problems of data-flow systems naturally through "structural-persistency" briefly mentioned in paragraphs above.

Suppose we need to perform some complex, time consuming operations on a matrix. Given input matrix A, we need to calculate:

Op1(A)*Op2(A)

Both Op1 and Op2 are time consuming operations producing matrix as a result and their results are multiplied to produce the final result. The operation of this system involves feeding it with large number of consecutive matrix inputs A1, A2, A3, . . . . Listing of bad stress-flow code performing this task but replicating problems inherent to data-flow systems is shown on FIG. 11. To mimic data-flow better, matrix data is passed by value. Input data is fed by calling routine "enter" which fires atoms "do_Op1" and "do_Op2." These two atoms, in turn, report their result by calling "send_O1" and "send_O2" respectively. As we now need both results of Op1 and Op2 to proceed, operation of the "send_O1" and "send_O2" routines depends on whether the other value has already arrived. If the other value has not arrived, the result is stored for when it does. If the other value already did arrive, the multiplication is performed and reported by calling "result." As the many multiple instances of all stress-flow atoms here can run simultaneously, this replicates operation of "dynamic" data-flow machine. If multiple instances of enter(A1), enter(A2), enter(A3), etc are fired before the previous result is reported, we will have serious problems. We might be, for example, getting Op2(A2) and Op2(A3) fed into the multiplication. Even if we correct this problem to make sure only proper pair of Op1 and Op2 results are multiplied, this still does not prevent the problem of, for example, Op1(A3) from arriving before Op1(A2) and thus being multiplied by Op2(A2). This is exactly the problem that required various methods of "tagging" tokens in dynamic data-flow machines and was subject of extensive research.

The proper way to write this code is shown on FIG. 11A. Entire code was enclosed inside object "calculate" which should have been a good object-oriented idea all along, since all this code constitutes a logical set of interconnected operations. Firing of the whole calculation was moved to the object constructor, to make it even better object-oriented code. Methods to start calculations for different A1, A2, A3, are shown on FIG. 9B. Depending on need, the objects are allocated globally, locally on stack, or heap. The last option assumes that garbage collector is operational and that reporting function "result" is capable of reaching the outside world itself without need to store pointer to instances of "calculate" object. This way, they cannot ever interfere with the other simultaneously running instances of "calculate. Everything acts now exactly as it should—as different objects "calculate" come to life, they have totally separate "playgrounds" complete with all necessary internally generated synchronization mechanisms. They do their work, they report their results, and then they automatically disappear. This means that present invention is able to replicate advanced data-flow architectures without a need of the tag. Could the solution be seen as the object's "this" pointer internally generated and maintained by the compiler that naturally acting as the tag here? Not really, being able to create the new objects on the heap results in making a copy of the whole submachine, which was not possible when the actual hardware nodes were doing the work of our stress-flow atoms.

The code shown on FIG. 11A solves the problem, but it is not that elegant. It also needs to create a copy of one of the matrices to have it when the other one arrives. To deal with this issue, a special "collected" construct was added to the present invention. It is simply a stress atom with several headings, but one body as shown on FIG. 11C (functions send_O1 and send_O2). A construct like that would be impossible to comprehend in any prior-art language. In stress-flow, it is quite easy to both comprehend and implement. All what it says—both send_O1 and send_O2 have to be triggered before the body gets executed. The moment the fist one is called, the result is only to store the parameters and suspend until the other call is made, which makes the body of the atom run. This in turn will release all callers to individual collected callers upon reaching the relaxed section. If the body returns a value, it is returned to all collected callers.

The construct can be an option inside a detach block, or it can have its own keyword as shown on FIG. 11D. The separate keyword is easier to spot but it needs to reserve another word. It also eliminates some syntax flexibility of being able to mix regular stress atoms with "collectors" that could be useful at certain circumstances. Internal implementation of the collector in this case only needs to count incoming calls and compare it to the total needed.

Described example deals with common problem found in various prior art visual programming systems. Some such systems actually make a claim that simply due to multiple paths being allowed in visually created data-flow based graph/program, full possible parallelism is achieved. This claim is completely false, which will be discussed in later portions of this description. In case of example being discussed, please note that no matter what Op1 and Op2 do, they are always executed fully in parallel here. Furthermore, countless multiple instances can run together which means countless Op1 and Op2 will be executing simultaneously. If application was slightly different, with the same instance of calculate being fired multiple times, the additional parallelism will come from the fact that multiplication of Op1 and Op2 results and further reporting will be overlapped, which means that while multiplication of the results is taking place, Op1 and Op2 are already calculating new data.

Emulation of Electrical Systems

Present invention was developed through years of trial and error attempting to create efficient object-oriented method for real-time signal processing applications. The conceptual problem was somewhat similar to application of visual-programming tools created for instrumentation markets. The key goals, however, were quite different: 1. Having every little node doing all its synchronization work alone and 2. Avoidance of any central supervisory code handling queuing of nodes, scheduling, and synchronization. These requirements were created by essence of application—creating efficient embedded code for monitoring/controlling numerous hardware devices (some of them other processors) at a very high speed. Efficient code meant a cheaper microprocessor that needed to be used in mass production of large number of devices, translating into cost benefits, and commercial success of the undertakings. As such, the solutions created for emulating electrical instruments and their interfaces though using a personal computer were not acceptable here.

A typical simplest function of an embedded signal processing code is to emulate some analog controller. That involves monitoring some inputs and producing one or more outputs based on the values of inputs. The case with single input and single output is completely trivial and can be solved instantly with just about any method. Still very trivial case with two inputs and one output, however, can already show all the challenges associated with the issue.

Suppose we want to build a digital device that as fast as possible calculates a square root of sum of squares of its inputs as shown on FIG. 12. We have two inputs "a" and "b" and we calculate the square root of the sum of "a" squared and "b" squared: sqrt(a*a+b*b). The triviality of operations performed was selected in order to make the example short to code while explaining various methods of programming it in parallel. If inputs were, for example, matrices, and all the operations extremely time-consuming operations, the templates presented here would be exactly the same. If this were an analog circuit, "a" and "b" could change independently at any time and the output would always instantly reflect the result. But a digital system, by its nature, has to take a finite number of readings per time unit and process each of them one by one. A control-flow solution to the problem would simply involve a free running loop that would read "a", read "b", calculate the formula, and output the result. In a trivial case, such a solution would not necessarily a bad one, especially if reading of inputs required explicit action rather than happening automatically. However, big problems would occur when such a solution would be applied to a large system, with a large number of inputs and large number of outputs. First of all, such a system would be incredibly wasteful. The loop would re-process all the inputs together, at the same interval, regardless the fact that only a few inputs would change from sample to sample, with rest of them changing rarely. Second problem was inability to use structural, object-oriented methodology to implement a system based on that method. Ironically, due to lack of a better method, the loop method would often be used even in advanced systems where some of all inputs would come automatically. Rather than use this feature to improve performance, such asynchronous automatic input readings would be latched into a table of input values to be processed by the main loop whenever it was ready to do it. Such a solution was not only incredibly wasteful performance-wise, it would lead to erroneous results if not implemented correctly. Suppose, "a" and "b" changed at the same moment, but their handler wrote only "a" before the main loop fetched both new "a" and an old "b". Old "b" could have been a value corresponding to an "a" value totally different from the current "a" value. The result would be absolutely wrong. As a result, even such unsophisticated, crude method would require working with hard to use rudimentary synchronization tools (critical sections/semaphores—hardware and/or software) to make the system work. This method would be cumbersome to use even on a single-processor system, and lacking any parallel features, due to the fact that the problem itself had plenty of natural parallelism. For example: Both squares could be calculated at the same time, and the sum and square root could be calculated while squares or new values were already being calculated. This, after all, was the essence of an analog circuit.

This is exactly where the appeal of data-flow concepts came in. If we know when the inputs changed, it should be the fact of changed inputs, not some arbitrarily running control loop that should trigger the recalculation. However, the problem of proper pairing of input data remained. Prior art "virtual instrumentation" market dealt with this issue in one of two ways.

First such prior-art method (used in SoftWire and sometimes called triggered data-flow) avoided the data-pairing issue altogether by building the code out of blocks that all had explicit control-in line triggering firing of a node's calculations and control-out line that would be asserted when the node has finished its calculations. To implement a software instrument emulating our example, the control-in and control-out lines would be added to it. Our instrument's control-in line would be fed into control-in lines of both square calculations. The moment the instruments' control-in line was asserted, both "a" and "b" would be latched as input pair for calculation. The square nodes' control-out lines would go to an AND gate. The output of the gate would go to control-in line of the addition node to initiate addition when both squares were ready. This was cumbersome, but allowed building a system where the connections handling the need for recalculations could be made after change in a single input parameter.

The second method (used in LabView) designed the system around requirement that all such related data would come together and that the system would wait until the complete set of data for the node has arrived at its inputs. Again, our entire example would be such a single instrument. The moment both new "a" and new "b" arrived, the instrument would be placed in execution queue firing the calculation of the squares. Once both squares were calculated, this would provide the set of inputs for the addition node, which would place that node in the execution queue and so on. The second method required less effort on part of the user, but would not naturally handle the case with only one parameter changing.

In both prior-art methods, data passing between nodes involves latching it in storage space allocated inside each globally defined instrument, which by definition turns them into so called "static" data-flow machines thus not being able to achieve most parallelism offered by this invention where ability exists to run a given node on new data before the previous one has finished processing. Also, the scheduler/supervisor handling all the node dependencies/scheduling in prior art is a very complex, centralized process (see "execution map" in U.S. Pat. No. 5,301,336) further limiting data-flow parallel capabilities. The fact that many nodes/instruments of the graph/program would be often executed sequentially in spite of their remoteness makes a good appearance of parallelism to a human user, but is still far from real low level parallelism that would allow running such an instrument on real multi-processor hardware. This issue was discussed partially in background of the invention and will further be dealt with in the next section of the description.

Implementation of the device from FIG. 12 using the language of present invention is shown on FIG. 13. For now, firing of the whole instrument happens by supplying the new pair of inputs to routine "go." All routines have all their code in the stressed sections, necessitated by the fact that we need the results outputted at the proper order. If any of the routine passed processing into the relaxed sections, many instances of the same nodes could be running at once. This would mean that sometimes results of calculations on older parameters could arrive after newer ones. In case the "result( )" routine involves latching the result to some output hardware, we would be latching older data after new ones. We still, however are achieving full parallelism possible for static data-flow machines. FIG. 13A shows best-case execution scenario where unlimited number of processors was available. Due to the fact that all code sq1 and sq2 code is in the stressed section, calculations of square on new data will not begin until previous squares are finished. New data arrives before that time, which means that, by making new calls to sq1/sq2, routine "go" gets itself suspended until previous square calculations finish up. This fact is demonstrated by dotted line representing go routine's timeline.

There is always a physical limit on time it takes to process individual set of data, which is often called latency of the system. Assuming that individual operations of calculating squares, square root, and addition cannot be broken down into smaller elements and thus be parallelized, the sum of times it takes to run single square operation plus time to run addition plus time to run the square root is the physical limit here—the lowest latency possible. But our system also limited the frequency at which new data can be fed, in spite having numerous unused processors available. Being able to stall some actions until resources are available is often a desired action. In this case, however, we want to be able to feed and process incoming data as fast as possible.

If the goal of calculations was different, and the data, for example, needed to only to be stored in an array, code with dynamic data-flow machine characteristics could be created by method described in the previous chapter. Such code is shown on FIG. 14. All calls to "calc_inst" have their own instance with separate paths/synchronization mechanisms. The paths of different data cannot get mismatched, therefore the calls to sq1 and sq2 can be placed in relaxed section of the routine. Same could be done with all other routines of the object, but this would not really improve performance because all the locks in individual instance of "calc_inst" are free and are used only once. Due to the fact that "calc_inst" does not stress the caller and does not make him wait will sq1 and sq2 are finished, many input pairs can be fed into the system with minimal delay when a number of processors a waiting for work. This is shown on timeline on FIG. 14A. The overhead of creating an instance and incrementing the table index are the only factors limiting the speed at which the new samples can be fed.

The code from FIG. 14 removed the data feeding speed limitation of FIG. 13 code, but is not really applicable to the problem at hand. When trying to emulate an electrical device, we need to feed data out to either some output hardware or to another software instrument. In both cases it is required that the data is outputted in the right order. In fact, if we could guarantee that the newer data never manages to make it to the end before older data do, the code from FIG. 13 could all be running as "relaxed." It may appear that the problem would be solved if we created consecutive numbers(tags) or time stamp accompanying every dataset, passed it along to every calculation in the chain, and made sure that at "merging" collection nodes sort queued calls in order. This would roughly be replication of the "tagged" dataflow machine. Not only would it require costly sorting operation of waiting calls in each stress flow atom, but what is far worse, it wouldn't work in some situations. Imagine we were so unlucky that sq1(a2) and sq2(b2) finished before both sq1(a1) and sq2(b1). Tagging would not help if there was nothing waiting at the "add" construct, the "add" construct would have no information whatsoever that there is something that needs to come through ahead of (a2,b2), and the result of calculations on (a2,b2) pair would still make it through the instrument before (a1,b1) would.

Ordered Stress-Flow Calls

The atomic concept and operation principles of stress-flow atoms have made another solution possible for such problems requiring chains of operations to maintain chronological order. Suppose that at the beginning of every stress flow atom in such chain operation we would call the next atom(s) in chain and "informed" it/them to expect the data some time later. The target's lock has the list of atoms queued up/suspended and to be awaken when it is their turn to get the lock. All what such a "reserve-a-place-for-me" call would do, is create an entry with the calling atom's ID/pointer, but marking it to inform that this is not yet a completed call, and not suspending the caller. When the actual call is later made, all that has to be done is to "unflag" the reserved place in the queue and to suspend the caller. If it the reserved place would make it to the head of the queue before the actual call was made, the target lock would be suspended until the actual call would wake it up. The whole process is quite easy due to low level atomization of the entire solution into mini-threads.

The reservation process could be done explicitly, by using keyword as shown in FIG. 15. This coding is most natural due to the way it has to be implemented, and actually can be implemented with a regular compiler—but it is a little cumbersome. The ordered calls themselves could be marked as such by some special keyword or operator as shown on FIG. 15A which would make the compiler automatically find all such calls and build a proper reservation list executed at the beginning of the atom. Allowing this implicit method is desired due to the way the method is most commonly used even if it puts more strain on the compiler construction. The disadvantage of this method is difficulty to call stress-flow atoms out of expressions unless some special operator was reserved instead of keyword for this purpose, for example: !!add_a as shown on FIG. 15B. The explicit, manual method is however desired in some circumstances, and when used together with the special operator, it would result in code shown on FIG. 15C. It may appear that using both manual reservation and the new operator is a little redundant, but the framework shown here is used to implement other mechanisms similar to the "ordered" scheme. In case explicit reservation method is used, the compiler could allow declaring type of the call as part of the reservation scheme instead of part of the call. In example on FIG. 15C if the reservation had format "reserve !!add(aaa_a)", the call to "add" would not need the "!!" or "ordered" operator. Another way to declare the "ordered" stress-flow atoms would be to reserve another operator (like "ordered") and use it as stress flow atom definition modifier. Any use of such stress flow atom would generate the proper modified "ordered" calling sequence as described here.

Most uses of the "ordered" stress flow atoms do not need manual explicit reservation and automatic method will be used in the following examples. The special "!!" will also be used other than a new keyword as shown on FIG. 16. All stress-flow atoms calls used have been now marked as ordered and so the atom bodies can be safely moved to the relaxed section. The performance of the circuit now mimics the timeline from FIG. 14A and there is no danger of disordered data.

Proper implementation of ordered stress flow atom call must deal with the case in which the "reservation" call was made at the beginning, but the actual call never came due to some conditional construct inside the code. The implementation must then issue an "un-reserve call" at the end of the calling routine.

Internally, the compiler builds for every stress-flow atom a list of "ordered" atoms that can be called by current atom. This list will from now on be called the "order reserve list". At the beginning of each atom, the compiler also inserts code that reserves places on local stack for the pointers/references to the queue places reserved for all order reserve list atoms. Actual call to a reserved location takes stored value, uses it to properly modify the queue and then zeroes the pointer stored on local stack. Upon reaching the end of execution of the stress flow atom, all pointers to the reserved locations are checked. If any of them is still non-zero, the "un-reserve" call is issued. What this call does relates to the "default path" processing described in separate section.

Last-Only Stress-Flow Calls

Often we are interested in just most recent information, or a most recent set of data. Consider a program that redraws complex shape in response to mouse movements. There is not enough time and it would not make sense to redraw the shape every one pixel movement of the mouse, especially if the computer has its resources used up by something more important. On the other hand, sampling it arbitrarily, say every predetermined amount of time, will limit responsiveness. Similar issue exists in instrumentation and signal processing application. Our FIG. 12 example most likely would be a candidate for something like that as well. Suppose the output device is much slower compared to the input. In such a case, if lots of data was fed into the system, a queue of values to output would build up and it would grow, which would mean that after a while, we would be outputting extremely old data while building up backlog of new data waiting at stress atom locks. Even if such a problem could not usually occur by guaranteeing proper speed characteristics of inputs and outputs, it is a good practice to make sure in software that something like that cannot happen. In the particular case of instrumentation signal processing application, letting the most recent data through ASAP is generally much more desirable than trying to process and output all data samples. In particular, if the output is for human eyes, the last value is all that is desired.

Suppose we were to modify the "ordered" stress-flow atom mechanisms in a way that would discard all older scheduled requests to a specific stress-flow atom the moment the completed (not just reserved) newer call has arrived. This is very easy to accomplish, and pretty much the only thing to do is create a new definition designator for such type of an atom. As before, rather that reserve another keyword, we can just use the question mark instead of the exclamation mark in the listing of atoms to be called in ordered fashion. See FIG. 17. From now on, this new type of stress-flow atom call will be referred to as "last-only" call.

Group Inputs and Default Path

The introduction to application of current invention to electrical circuit emulation has described the problem of paring or grouping inputs when emulating analog circuits digitally. So far, the discussion has avoided the issue by declaring two parameters for the entry point to the routine. Prior art avoided this problem altogether by either using a special control input to trigger calculations or by requiring that all parameters must arrive at inputs for the calculations to begin—which is a serious constraint. Our temporary solution of requiring an entry point with two parameters would actually be worse than the unnatural prior art methods, because we would be unable to connect inputs of our instrument to separate outputs of other instrument(s).

If we separated the input to the instrument into two separate inputs, "in_a" and "in_b," triggering sq1 and sq2 separately, we still would be able to trigger the pair together, by either the compounded expression, or by adding them both to the same "connector" construct. An example of a compound expression call to our instrument would look like this:

in_a(10),in_b(12);

This would naturally express the problem at hand, but it would also introduce a problem of semantically allowed firings of just one input:

in_a(10);

This would be totally incorrect because the "add" atom expects calculations on a pair of inputs to arrive before it can proceed. Calling a single input like that would result in completely erroneous results being outputted. A call like that is not conceptually wrong. An analog circuit that we were trying to emulate naturally allows being able to change one input without changing the other. To emulate such operation correctly in a digital model, we would, however, have to be able to feed previous value of input to an unmatched firing. For example, if firing of our instrument had the form of "in_a(10), in_b(12);", then the consecutive, unmatched firing of "in_a (20);" should be internally translated to equivalent of "in_a (20),in_b(12);".

To accomplish this goal, the present invention introduces the concept of "group stress-flow atoms." Group stress-flow atoms simply list several atoms that must be triggered together. To describe action to take in place of a missing member of a group, some special keyword (like "default") could be used together with name of function to provide the default action for as shown on FIG. 18. The default functions would use copies "a_cp" and "b_cp" of previous values of the parameters to calls of in_a and in_b to issue proper calls to sq1 and sq2.

This solution will work, but is not optimal. There is really no need to recalculate sq1 or sq2 for default path operations. To further optimize the example, we could provide default paths for sq1 and sq2, again storing the results of square operations. In general case, however, we should also provide default path for "add_a/add_b" collector and "dsqrt" atom because it would be possible that both in_a and in_b were following the default paths. First problem with such a solution would be that it would require a lot of typing resulting in essentially the same operation for every atom (store parameters/results in regular operation code and use it in default operation code). Second problem would be that this would not work with the collector, which has two or more inputs, possibly generating combinations of regular/default calls, which would require separate function for each combination, which would not make any sense.

The best way to implement the default path functions is to have the compiler internally generate default path functions for all stress flow atoms that have "ordered" and "last-only" calls. A default path function for all other atoms could also be generated, but the issue is strictly philosophical since such function would do nothing. Each stress flow atom making "ordered" and "last-only" calls already possesses the "order reserve list" of "ordered" and "last-only" atoms that it calls from its body. Therefore, all that default path function has to do is call the default path functions of all the atoms on the "order reserve list". Code written for a compiler that uses this idea became much simpler and is shown on FIG. 19. Default path functions of stress-flow atoms are actions to take, "by default" if the normal path is missing. Therefore, the default path function is called when a place for an ordered/last-only call was reserved but unused. This now completes the explanation of the ordered/last-only atoms operation.

For this code to work properly, the default path function for a "collector" must only be triggered when all arriving calls in the set are default-path calls. One or more regular call in the collector set forces "regular" collector function to be processed. For this reason, the compiler must store the previous values of parameters for each collector entry point here. Similar need occurs for some other situations and this is why the compiler must often or always internally store last parameters for each ordered/last-only stress-flow atom. Suppose we have a situation where the "result" function in "dsqrt" is not an ordered/last-only atom call, but a non-stress flow atom function that simply outputs the calculated value to some hardware. In such a case, the functioning of the default function of "dsqrt" might be incorrect in case we actually wanted to output the repeated value anyway. The best solution for such a situation is to be able to force default path execution onto the regular path and be able to test inside what path it is. The "dsqrt" function redefined this way is shown on FIG. 19A. The "nodef" keyword informs the compiler that compiler generated default-path function isn't wanted. The default-path calls still can happen, they just will go to the same function. Expressions with the name of the atom are used to check whether or not the currently executing atom was triggered as regular or default-path call. The name evaluates to zero for default-path calls. This method is better than using some "isdefault" keyword/built-in function due to construction of the collector that can have some paths default and some not. Using the path names for checking allows access to default-path/regular info for each path. For example, in our collector we could write: if (add_a && add_b) to test if both entry paths are "regular". Since the result in FIG. 19A modified example is a function that writes directly to some hardware, not overlapping it among different atoms is most appropriate and this is why it is moved to the stressed section. This example shows how large interconnected blocks of ordered/last-only operations can naturally interface with non-ordered stress-flow atoms or hardware. The "if" statement isn't needed for anything in this case, it was just placed there to demonstrate the default-path/regular test. It would be possible to design the present invention language in such a way that there would be no compiler-generated default-paths and the needed functionality would be performed by a single if statement testing for regular/default-path condition. This would save one keyword, but would not be as elegant since decisive majority of ordered/last-only stress-flow atoms need nothing original in the default-path section. (Other than calling default-path function for the order reserve list atoms, that always needs to be generated internally by the compiler).

In some cases that use the group construct, it may be required to be able to trigger the default path for entire group construct explicitly. This is best done by naming the group and using the group name for the all default-path triggering as shown on FIG. 19B. It would also be possible to do similar thing by creating a fake expression like: "if(false) aaa.in_a( )". In case the group is defined as ordered/last-only, this will reserve the space in the in a queue and never use it, which will trigger the default path. Problem with this solution is that the good compiler will optimize the whole expression out if the "if" statement evaluates to a constant. Depending on method chosen for creating the "order reserve list" of each atom, specifically on counteraction of it with the optimization process, this method might be a good or a bad idea.

In some cases of the group construct use, it is necessary to declare one or more grouped atoms as always needed to be called explicitly. This would only be a compiler information feature included in declaration and has no other bearing on the functionality. Suppose we used some "required" keyword to inform the compiler that "in_a" function is always required to be used explicitly. This would only mean that "in_a(10),in_b (20);" and "in_a(20);" expressions would still be valid, while "in_b(10);" would generate a compiler error. As before, rather than reserve another keyword, "void !in_a( )" declaration could be used to accomplish the same thing.

Code implemented using all concepts of the present invention removes all the imperfections and limitations that were hounding prior art systems, it naturally runs on multi-processor system without any centralized supervisor, and it optimizes itself to the highest extend possible. Consider the FIG. 19 example with FIG. 19A improvements. If both "in_a" and "in_b" calls are "regular", all operations overlap themselves in the highest theoretically possible way as shown on FIG. 14A. If one of the paths is a "default call", the square for that path is not recalculated. If both paths are "default calls," all atoms in the model including the "add" collector and "dsqrt" are default calls which almost instantly outputs the previously calculated result.

Complex, Dynamically Created and Modified Software Systems

Examples implementing circuit from FIG. 12 constitute extremely efficient pieces of code that run a predefined, hard-coded, circuit. Changing the circuit would require recompiling the code. In order to build a dynamically reconfigurable system, all components used would have to be converted into separate, universal components, each having one or more inputs and each having a connector construct for their outputs. Connection of the output to the next input would therefore not be hard-coded, but be accomplished by linking/adding the input to the appropriate connector. Adding a new element to a circuit being constructed would involve allocating that element, and issuing instructions on its output connectors that would link these outputs to any number of required inputs. The complete set of elements described above allows constructing universal building blocks that on their own describe their best parallelism that can be allowed, without knowing anything about the elements connecting to them, without placing unnatural constraints on the idea being expressed, without needing any supervisory software to manage the system, and being able to naturally run on a large number of processors. All these elements contrast with previous art systems that sometimes had similar conceptual goals, but that were unable to achieve true object-oriented programming and true parallelism.

Most of the new elements defined on top of the stress-flow atom concept were introduced by showing how the present invention elements can be used to implement a simple electrical circuit. This was only an example to introduce the elements of the present invention. In fact, all present invention elements were intended as lowest-level necessary blocks to allow solving any commonly occurring parallelism problem. Emulation of an electrical circuit just happens to invoke right intuition that leads to better explanation of the concepts of present invention. The present invention was developed by defining a set of various, conceptually different parallel programming and synchronization problems and then trying to solve them with present invention at different stages of development. This is how each element presented here was developed. One of such applications considered was a brute force simulation system that had to generate all possible combinations of a set of input values, recalculate elements of extensive set of auxiliary data only when necessary, and then run final computationally-intensive simulation corresponding to a given combination of inputs. In particular, the system has been used to evaluate various market day trading strategies. An example of such a system will be described as it shows the use of introduced elements of present invention in application different from emulation of electrical system.

Figures 20, 21:
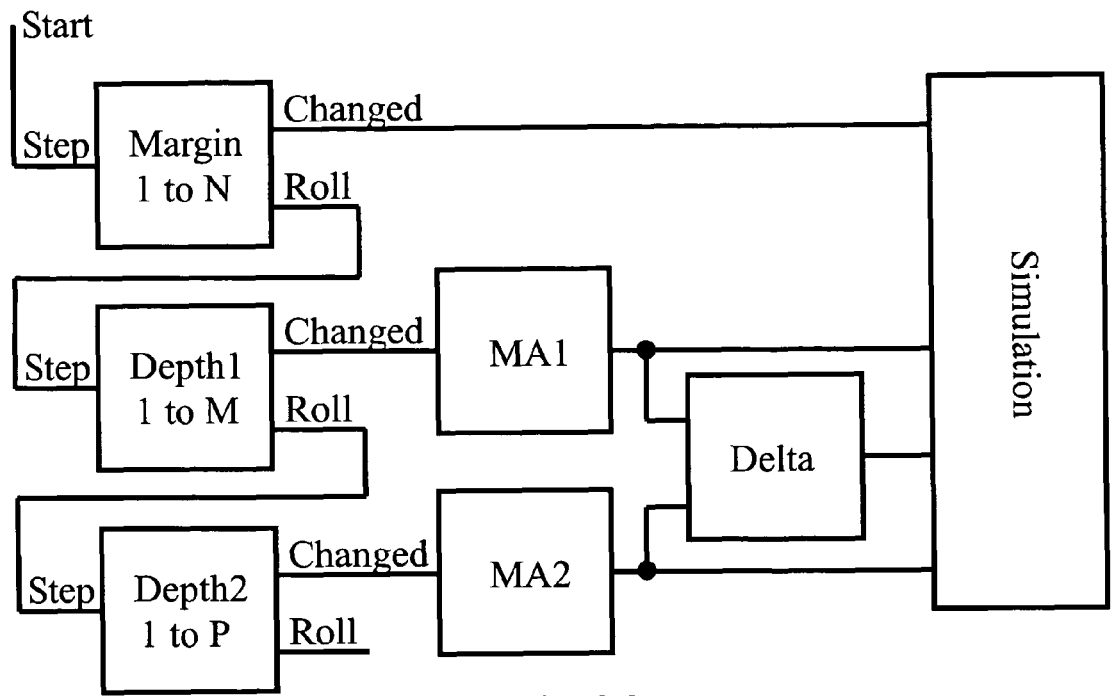
FIG. 20 shows diagram of a trading system simulation to be implemented as an example
FIG. 21 shows required sequence of operation of code implementing diagram from FIG. 20

A diagram of a simplified trading simulation system to be implemented is shown on FIG. 20. The purpose is to step through all possible combinations of Margin (N different values), Depth1 (M different values), and Depth2 (P different values) for a total of N*M*P steps. The simulation itself takes the Margin as parameter, moving average MA1 calculated at Depth1, moving average MA2 calculated at Depth2, and Delta calculated as subtraction of MA1 and MA2 tables. The object is to create universal components that can be used to implement the example and much more complex systems, based on more variables to base combinations on and with more intermediate data. Due to calculation intensity of the problem, the goal is to do implementation in an optimal way, so that the intermediate data is recalculated minimal number of times. For example—MA2 recalculates itself only when the Depth2 changed. This optimization must be automatic—meaning that each element of the library, including the simulation node, is written in a way that all recalculations happen automatically, only when needed, and nothing extra needs to be done besides connecting the intermediate data recalculation nodes into the system. Since the subject of this invention is parallelism, we want the solution to scale itself into (i.e. be able to take advantage of) the highest number of processors possible as well. FIG. 21 shows required execution schedule for N=2, M=3, and P=3. Margin, Depth1, and Depth2 columns show the state of their respective counters. The other columns show whether or not (Y=YES, recalculated) given node are to be recalculated for the given set of counters. The simulation node obviously needs to be recalculated after every change of counters. To meet the parallel scalability requirement, the simulation step for one set of counters must be able to start while simulation steps for many previous sets of counters are possibly still running. Same applies to MA1, MA2, and Delta calculations. In a case with unlimited number of processors where the Simulation step is more intensive that the sum of intensity of all intermediate data recalculations, a total of N*M*P of Simulation instances must be able to run at the same time.

Accomplishing these goals in prior art object-oriented languages even without requiring any parallelism is already quite difficult, if not impossible, since centralized update handler code/loop/queue would be needed. Due to the fact that one intermediate data calculations are cascaded, one relies on results of another, with paths splitting and then merging back, universal solution to the problem is not a trivial one. In our example, the simulation node cannot fire until MA1, MA2, and Delta are recalculated, if they need to be recalculated. Also, Delta cannot be recalculated simply as a result of MA1 being recalculated, because MA2 might need to be changed as well, only a little later. The common way to do something like that is to go through the graph invalidating and queuing all nodes that need to be recalculated, without actually recalculating them yet. After this is done, the queue is processed in a way that only recalculates a node that has all its inputs ready. In our example, the Simulation node would be queued first, but be processed last (after Delta) in situation where Depth2 has changed. This solution brings us very close to the prior-art data flow implementations methods with centralized execution model and its queue for nodes to process. Additionally, the algorithms to make sure the queued nodes are processed in the right order are complex and time consuming. This solution and its limitation is what present invention sought to totally avoid, replacing it with a model without any centralized supervisor or centralized queue of any sort.

For all these reasons, this particular problem is ideal grounds for comparing the present invention to all previous prior art systems, languages, and methods. In spite of being relatively simple, the given problem offers all the challenges of ideal object-oriented and parallel design. Ease of implementation, universality, and parallel scalability performance of coding this problem in previous art languages and systems is a good benchmark to compare them against the present invention. In fact, it seems to be impossible to solve this simple problem in any previous-art language or programming system without sacrificing one or more specified goals.

FIG. 22 shows object declarations for implementation of diagram from FIG. 20. All components are designed as elements that can be dynamically interconnected. This means that all objects are fairy universal library-type components that provide "connector" interface for their outputs, rather than calling specific stress-flow atoms by name. The source data to work on is stored in global table named Tick. In fully universal library, this source data would be part of some base object that all the other library components were based on, or passed as parameters. Doing that here would only clutter the code making it harder to explain without changing the parallel functionality in any way.

The "Counter" object has one "ordered" input to "Step" it and two "connector" outputs. The "Changed" output is triggered after every change of the counter. The "Roll" output is triggered whenever the counter rolls over. On initialization, the counter is set to its highest setting so that first "Step" rolls it over into the starting position and triggers recalculations required at start. Another way to deal with this problem would be to special case the initial update out of the constructor. The intention is to cascade the Counters so that "Roll" output of one is routed to "Step" input of another. Since "Changed" call inside "Step" is ordered, a counter that was stepped but did not roll will sent a "default" Step call to the next counter. This call, in turn, will be propagated to all ordered inputs connected to both outputs ("Changed" and "Roll") of such next counter.

The "MA" object calculates the moving average of the "Tick" source data at depth given by parameter. The object has one input point "Go." The simple moving average calculated here is the average value of last depth (iD parameter) elements. The result is a table of the same size as source data passed as parameter to the output connector "Changed." This result table is globally allocated on heap and it is assumed that the garbage collector is operational, which means the table is automatically de-allocated the moment the last pointer to it is destroyed or overwritten. As the pointer is passed on to the output connector, the stress-flow atoms that need that table will maintain it in the memory only as long as they are using it. This also allows moving all the code of "Go" stress-flow atom to the relaxed section. This means that each instance of "MA" can run simultaneously with many potentially still running previous instances. The standard (compiler-generated) default path of MA object will call default paths of all stress-flow atoms connected to the "Changed" connector.

The often occurring reliance on automatic, garbage-collected pointers and memory allocations (sometimes called managed or smart), leads to a question if some special method of "automatic references" seen in some object-languages (like C#) should not be used in the present invention language. This might be a good idea, but would make the explanation more difficult. On the other hand, declaring all pointers as managed and garbage-collector operated (an option in many existing C++ compilers) is even better idea in a real multi-processor environment, where each processor would manage its own heap.

The "Delta" object has one "collector" input, with two entry points, each passing a table of data to process. As is the case with any collector, the body of the routine does not execute until both input paths/headers are called. The calls can either be regular, or the default-path calls. The collector's compiler-generated default path is only followed when both header calls come from default-path calls. In this case, the compiler generated default path simply runs the "Changed" collector with the same parameters as before, in this case the pointer to the previously calculated result. If any of the headers calls came from regular (or non-default path) calls, the body is executed and a new result table created. Both parameters are valid, in case one of them is from a default-path call, the parameters are a copy of parameters from the previous regular call, which is exactly what is needed to calculate the result correctly. In this case, the result is simply a table that stores subtraction result of every pair of elements from the parameter tables. This is a very simple operation, one that could often be done by subtraction when needed. The routine is presented here as example of universal template to implement any two table parameter stress-flow atom, performing any complex operations on the two input tables and producing an output table as a result.

The "Simulation" object has one four-path "ordered collector" entry point. As any other collector, it does not execute until all four entry paths are collected, either by obtaining a regular call or a default-path call. Multiple instances of tables given as parameters persist in memory as long as there are "Simulation" instances using them and as long as they are needed as possible default-call copies. In its "stressed" section, the "Simulation" object stores incrementing index to the place in the output table where it will store its result. Doing it this way declares that we want the results stored in order the "Simulation" instances started executing and not in the order they finish.

Variable/node definitions and instructions interconnecting them are shown on FIG. 22A. Each node is represented by a variable, and each wire by a connect instruction. This completes the implementation of the problem at hand. All that has to be done is call rMargin.Step( ) from a loop as shown on FIG. 22B. To actually know when all started simulation instances finish, the methods shown on FIG. 2 through FIG. 5 can be used. The "all_done" function implemented there can be used for current simulation problem.

Figures 23, 24:
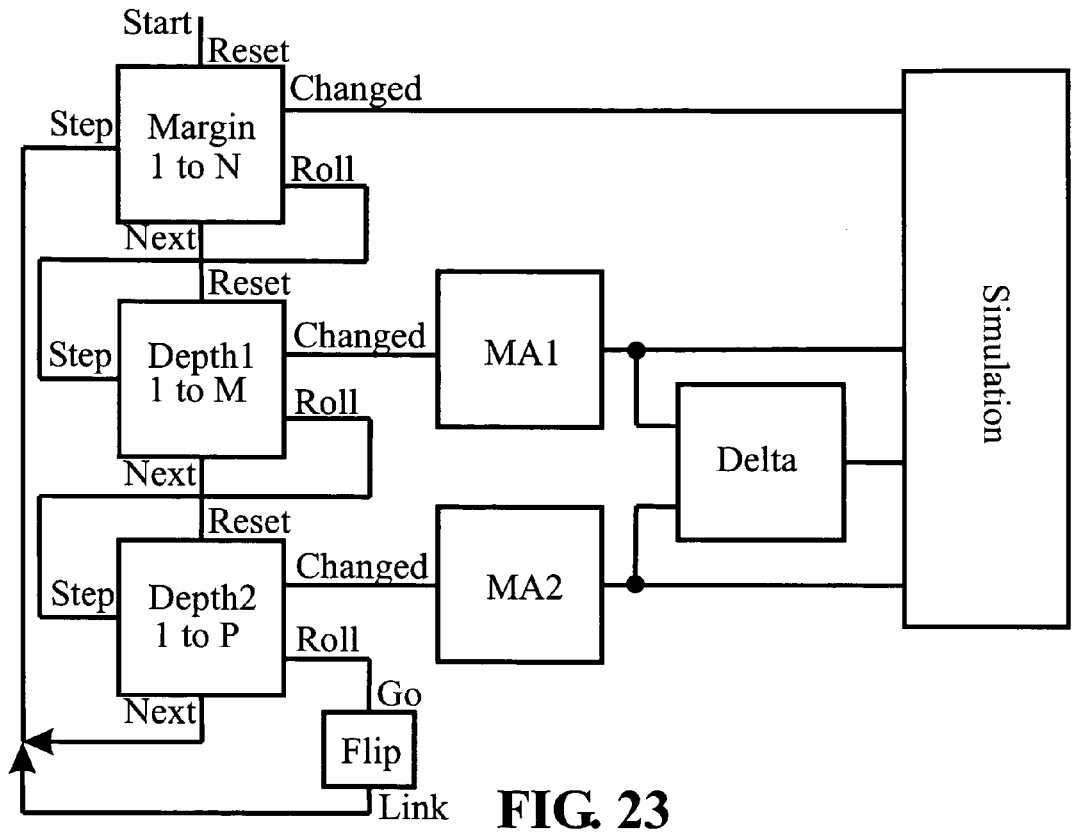
FIG. 23 shows variation of problem shown on diagram on FIG. 20
FIG. 24 shows modified counter definition for diagram FIG. 23

Code shown on FIGS. 22, 22A, 22B is simple and concise. But the method of starting the code is not. The spread of each simulation variable (N,M,P) had to be entered twice—once in constructors for the counters, the other to calculate the number of times to step the whole code in a loop. In order to be able to trigger the whole simulation experiment with one statement/call, the diagram was modified as shown on FIG. 23 and the corresponding code is shown on FIG. 24 and FIG. 24A. The new Counter2 object has "Reset" input that allows forcing recalculation for the initial state and "Next" connector to cascade the "Reset" to the next counter. Instead of using "Next" connector, the "Reset" input of each counter could have instead been connected to a single control function/line. The chosen solution is however better because a given counter does not have to be aware of the whole system, but simply its immediate neighbors. "Reset" function of Counter2 therefore always forces the recalculation of data dependant on it by calling the "Changed" connector, and then it calls the "Next" connector. The "Reset" function/line of the first counter is used to start the whole system. The "Next" connector of the last counter is fed back to "Step" input of the first counter. This will trigger first regular counter sequence. To trigger further consecutive updates, some form of "Changed" connector of the first counter (but without parameters) could have been tied back to the "Step" input of the same counter. This would work, but the processing would never stop—after going through all the combinations, the counters would roll over and start again. To construct the code in a way that will cause processing to stop when all combinations have been processed, the retriggering of the first counter must not happen when the last counter rolls over. Since "Roll" connectors are used only by "ordered" operations, the "Roll" connector of the last counter gets a default call with every step and the only regular call when it rolls over after the last operation. It is thus easy to construct object "Flip" which can be used to retrigger the first counter every time except when the last counter rolls over.

Please note that apparent complexity of this particular example is mainly due to building it in a way that relies on universal library components and demanding optimal performance. Without these requirements the implementation is far simpler. An optimizing compiler can also remove most of the connectors and replace them with hard-coded calls when the connections do not have to be changeable at runtime. Regardless if the compiler can optimize or not, the example remains an excellent comparison vehicle to evaluate the present invention versus the prior art tools and techniques—where meeting stated goals is impossible or resulting in far more complex code.

Comparison to Prior Art Data-Flow Tools

The complete set of elements described above allows constructing universal building blocks that define best parallelism to be allowed, without knowing anything about the elements connecting to them, without placing unnatural constraints on the idea being expressed, and without needing any centralized supervisory software to manage the system. This is in total contrast to prior systems that had similar goals, but which were unable to accomplish them in such a universal and efficient fashion and incapable of producing self-scalable code that could naturally run on a large number of processors at the same time.

The present invention lends itself extremely well to visual programming and when used there, it produces far more universal, efficient, and actually truly parallel code. The only problem to overcome is the erroneous claim of some previous art systems that being able to design a program as a graph with multiple wire-like connections is by itself a sufficient methodology to describe universal parallelism. This claim was discussed in the background section of this application. In particular, LabVIEW™ Application Note 199 "LabVIEW™ and Hyper-Threading" discussed there made a strange and erroneous claim that dataflow concept itself prevents full parallelism. To bypass this limitation, it was shown on pages 2 and 3 how splitting a "Primes Parallelism Example" into two loops "odd" and "even" can make such code be able to run on two processors in parallel. To show that the present invention naturally solves problems and removes limitations of the prior art, the "Primes Parallelism Example" implementation is shown on FIG. 25. This is, of course, an extremely easy program to write in language of present invention without need of any unnatural trickery found in the previous art. The implementation is very straightforward and, if enough processors are available, each individual prime number search will be run on separate processor, simultaneously with the other prime number searches. This is probably the simplest parallel problem possible as there are no interactions and no synchronization needs between calculations of different prime numbers. The constructor loop calls CalculateOne stress-flow atom for each prime number to check. The CalculateOne stress-flow atom runs everything in its relaxed section, which means as many CalculateOne instances will be initiated as there are waiting processors. The task is very similar in operation to the matrix processing routines shown on FIGS. 2, through 5 of this specification. If there is a need to report completion of calculations, the exact method shown on FIGS. 4 and 5 can be used.

In order to make better written object oriented code that includes notification of completion of calculations, a small array object can be written as shown on FIG. 26. The code represents simplified short basic operations on array object as found in standard libraries of object-oriented languages. The object reserves storage with its constructor and has simple operations for filling and retrieving array elements. The only difference is that the application needs to fill elements asynchronously other than sequentially by adding at the end as was the norm for prior art object-oriented languages. To accommodate that, the object keeps count of elements already filled in variable "used". When last element is filled, the filling function "Fill" reports this fact. All of "Fill" code is in the stress section to prevent corruption and wrong access to the "used" counter. This simple object is a short template for parallel operations on array and matrices that will support filling and working with array elements in parallel. All operations are stress-flow atoms sharing the same lock which is accomplished by adding "detach" specification to the struct definition. Actual, complete parallel array library object would most likely include more code for error checking, possibly for preventing filling the same element twice, etc.

The "Array" object described above will now allow us to create a version of "Primes" code that completely reproduces interface of the LabVIEW™ "virtual instrument" discussed in the application note. Code that detects end-of calculations condition is now added and the result is reported to a connector as shown on FIG. 26A. The "Results" array is defined on stack which assumes automatic maintenance of instances of stack was implemented as described with examples shown on FIGS. 8A and 8B. The Results array could instead be allocated totally on garbage-collected heap. This example will be used later to demonstrate applicability of the present invention to visual programming. The data could also be declared as object member data since in this particular case ability to be able to retrigger calculations of the same prime numbers is not necessary. Interestingly enough, unlike previous art systems, allowing full unrestrained parallelism is most natural with the present invention. It is restraining parallelism when such restraint is needed that generally may require some extra work. In this particular case, the simplest way to restrict multiple calls to "Primes" constructor atom would be to move its contents from relaxed to the stressed section.

Application in Redundant Software Design

Universal method of redundant software design is completely missing from prior-art software programming systems and methods in spite of tremendous need for it in many critical areas of computer/microcontroller application. Software/computer redundancy, if done at all, is still done in custom way for each application. For a single processor-system it would not make much sense to do such a thing any other way than by replicating the processor hardware as well and thus implementing the redundancy mostly in hardware made to run the same software twice. This is a crude solution and only applicable to relatively small number of applications. Situation is totally different in a system with an array of processors. Different parts of the array could work on the same problem in order to make sure that the solution is arrived at or that it is absolutely accurate. Accuracy could be determined by comparing results of different paths working on the same problem. Such redundant design would have application far beyond mission-critical systems. Among many other things, redundant software would greatly decrease cost and energy consumption of electronic hardware. Due to complete lack of universal redundant programming methodologies, decisive majority of the software makes infallibility and error-free operation of the computer hardware the key underlying principle. To make this principle true for most practical purposes, quality norms of the computer hardware manufacturing need to be extremely high. This, of course, costs money. Suppose our computer quality norms allow some program to have one chance in a million to yield incorrect result due to hardware failure (very low expectation). In most cases, increasing quality norms to allow only one failure chance in 10 million would double the cost of the hardware at the least. Suppose that we instead double the hardware cost by simply replicating the same quality hardware to run the same software twice. The probability of such redundant software paths failing both at the same time would be one chance in million squared. This means that the same cost resulted in a million-fold quality of calculation improvement.

Using the mechanisms of the present-invention it is extremely easy to implement redundant software design. Suppose we need to implement the Primes example from FIG. 26A by running it through two duplicate paths. The modification needed to Primes code itself requires changes where results of these two paths merge together. This can be easily done with the present invention with already explained collector mechanisms as shown on FIG. 27. The collector mechanism merges reports of completion DoneA and DoneB. When both of these entry points of the routine are called, the code inside the routine is run which in this case allows checking if both results arrived at are correct by comparing A and B arrays. Rather than duplicating the code for prime calculation with one of them calling DoneA and another DoneB, the proper label to call is passed as parameter. Please note that the parameter declaration uses detach as parameter designator. Keyword "collect" even if implemented (it does not have to be—as explained before), should be a special case of detach, thus allowing this code. Another way to handle it could use the "connector" inside Primes object.

To make writing such code slightly easier, especially if more than two such merged paths are needed, the compiler implementing present invention can allow declaring multiple collector paths of the same layout to be declared as an array, rather than list with separate labels. This is shown on FIG. 27A. To refer to specific entry point or parameters of specific entry point, array indexing will naturally be used (example Done[1] or A[1]).

The method of redundancy shown so far calculates the same problem through two or more paths and then reports all results at the same point. Another method of redundancy could require calculating the same problem through two or more paths and then reporting the first result arrived at and ignoring the next ones. The underlying mechanisms of the present invention can easily support such schemes which can be implemented at the cost of another keyword as shown on FIG. 27B. To identify which path arrived at the solution, the name of the entry label can be tested as boolean expression inside the routine, which was the method already introduced with the "nodef" stress-flow atoms. Starting of the redundant calculation in this routine may be done as before, or the calls can be made into "ordered" by using the "!!" operator before passing them to the routine calculating primes as shown on FIG. 27B. Due to the way the ordered operator reserves places in final collector queue, this scheme can be easily utilized for marking the other paths going to the "firstof" collector as no longer necessary and possibly killing them after the first one makes it through. This can be done by means of another definition modifier—for example "cancelrest."

Complete implementation of the scheme where late corner calls to "cancelrest" collector can be canceled must involve means to cancel these calling tasks gracefully, which means allowing them to process their destructor functions and properly de-allocate all objects. Destructor functions are object-oriented programming concepts allowing programmers to define actions that take place when an object of a given type goes out of scope. This means that if some object is declared on stack the compiler inserts destructor calls automatically as part of sequence of instructions executed after all user programmed actions in the routine end. Canceling the late corners would therefore mean forcing the makers of the late calls to jump to their destructor sequences at the end of their code. A mechanism such as this is far easier to implement than say "try-catch" constructs of the object-oriented languages, but due to inherent true multi-tasking of the present invention become extremely powerful tools.

It still will make perfect sense to use the indexed entry label scheme with this method. Please note that a fully capable compiler implementing present invention should allow defining several indexed entry points together with non-indexed ones, as show on FIG. 27C where an additional entry point is used to report a special case of user canceling the calculation.

The underlying elementary mechanisms of present invention do not prevent multi-label collectors of any described type to be used as basis for a connector, as shown on FIG. 27D or basis for a socket construct as shown on FIG. 27E. This last example shows how the present invention can be used to create massively parallel and redundant calculation of primes. The whole routine can be called from a parallelism unaware regular command-flow routine which will get results back when both redundant paths come up with the same results.

Application in Visual Programming

It would be possible to use the present invention in limited fashion only as means for better internal implementation of prior art visual programming systems. Each specific building block in a prior art visual programming system could "hard-code" its internals to correspond to one particular method described in this invention. For example, all building block outputs could be forced to be "ordered" connectors. This would already produce a superior internal implementation of the prior art systems by decentralizing operations, allowing actual real auto-scaling parallelism, and eliminating the node execution supervisory code. This way, the performance would be greatly improved without changing user interface, but at the cost of limiting application of such systems. Visual programming using the stress-flow concept of present invention can however do far more than that.

The key problem with prior art systems is that they could not smoothly transition from constrained or sequential execution to unconstrained parallel or to dataflow model and back when it was required. Commonly used script languages could not do dataflow at all while popular visual dataflow-proclaimed languages did it in a way that strictly separated code into blocks of sequential code that were executed by higher level centralized code which was fairly inefficient and as shown in previous paragraphs actually prevented true parallelism. This was necessary in prior art because non dataflow portions are actually always necessary for all but few very specific programming problems. Key advantage of the present invention is that it that this limitation is non existent as the stress-flow model uses atomic layer of abstraction that can describe both sequential and data-flow execution model and smoothly transition between the two. This not only allows real parallelism but also totally new unexplored avenues for visual programming.

It is often suspected that visual programming does not get as much use as it should. Programming, of course, had to start as text based because of limitations of original computer hardware. These limitations definitively no longer exist, yet most professional programming is still done in text form. Visual programming was introduced with great pain where it was really unavoidable—for example for designing dialog boxes, human form interfaces, or instrument interfaces in control/instrumentation markets. However, in spite of huge effort toward developing visual programming methods, complex, professional software is still very rarely developed in visual languages. At present time, it would still be quite difficult to even try to propose developing code for an operating system or even a professional word processor in any prior art visual language. If visual software can and is successfully used to develop mechanical systems for very large systems like giant jets or electronics of extremely complex modern computers and processors, there should be no fundamental reason to prevent visual software from being used to develop complex professional software. If a picture can say a thousand words, why shouldn't a graphical diagram that can use symbols, icons, and colors be a better, more understandable design and representation of software than say 100 lines of code maximum that can be seen at once on the largest commonly used monitor?

In process of developing present invention it became obvious that lack of good, versatile, universal parallel programming method was responsible for inability to program complex code visually. As sequential control-flow code is fundamentally one-dimensional, it is unnatural and hard, if not impossible, to represent it graphically in two dimensional space. Visual program can easily split paths into many sub paths and it can merge previously unrelated paths together. Such things are still pretty much heresies or rarely used black-art tricks in the world of sequential control-flow programming where majority of subroutine calls have to return back to the same place they got called from. And this isn't even a limitation of computer hardware but rather a requirement generated by the way data was stored and accessed, a constraint seemed to be made necessary for data to be managed safely. The present invention naturally eliminates these problems. Stress-flow model allows control paths splitting and merging. It allows them to be cloned and allows them to disappear anywhere—exactly what is a graphical diagram describing any actions will naturally look like.

Any interface of previous art visual programming methods can be adapted to take advantage of present invention, although internal workings of generated code will be completely different. Key new element of such adaptation will be a representation of transitioning from stressed to relaxed code. This can be done by means of special barrier or symbol on control line being crossed. The first method is shown on FIG. 28A where some visual programming subroutine containing two operations Oper A and Oper B uses a separation barrier between stressed and relaxed parts of visual subroutine. The second method is shown on FIG. 28B where a symbol placed on control line indicates transitioning from stressed to relaxed part.

Full utilization of present invention might also have special visual symbols to represent ordered, last only, and redundant calls; collectors, etc.

Stack Use, Automatic Stack Use Count and De-Allocation

The fact that all execution is split into a very large number of mini-threads each with own stack requires that these stacks can dynamically grow (and at times also shrink) as needed. This would have been a problem with older processors that used "flat" (also called unsegmented and non-virtually mapped) memory model. Since in general case we do not know how long the stack would need to be, fixed size allocation of stack would make the present invention practically unmanageable. The only way to run present invention on processors with flat memory would be for the compiler to determine maximum required stack at compilation time which would not be that complex (due to relatively small size of stress-flow atoms) but would require prohibiting techniques that would make such determination impossible (example: allocating an array on stack with non-constant number of elements). The modern processors obviously do not have such problems. Virtual (or segmented) memory mapping techniques used there allow starting with minimal stack and growing it as needed and this is precisely what is required for efficient implementation of present invention.

There are, however, additional stack allocation requirements. As briefly mentioned in discussion of code from FIGS. 8A and 8B, the management of stacks for stress-flow atoms creates some challenges. Suppose some data structure is allocated on stack of a stress-flow atom and another stress flow atom is called with address of the stack allocated data structure. Normally, the first stress flow atom finishing its calculations would result in destroying the stack or allocating it to another micro-thread. If this happened before the second stress flow atom accessed the data, the consequent access would result in reading invalid data. The problem could be avoided by allocating all local-use data on automatic heap rather than stack, but this solution, (resulting in some code limitation that would have to be rigidly enforced) would be fairly inefficient in case of many small variables being constantly allocated and de-allocated from the heap. The solution to this problem is a stack organization that counts all references to an instance of stack and prevents releasing/reusing a stack as long as references to it exist—as shown on FIG. 29. The functioning is similar to garbage-collected (or managed) dynamically allocated heap memory blocks. Each stress-flow atom/mini-thread associated stack thus maintains the counter of references to it and persists past the last instruction of the stress flow atom instance it was generated for. Once the counter drops to zero, the stack can be released/reused.

Another issue affecting construction of stack interfaces is the need of handling the default path calls for ordered and similar stress-flow atoms. Default path calls require re-firing the ordered and similar stress flow atoms with the same set of parameters as immediately before. This requires keeping a copy of these parameters somewhere. The method of stack operation based on previous art concepts would allocate or assign a stack right after the lock of a stress flow atom was reserved. The parameters would then be pushed onto the stack and a new stress-flow atom scheduled. In case this was a default call, the previous parameters stored somewhere would now have to be pushed on the newly allocated/assigned stack. On some large number processor system, several parts of such scheme would be inefficient even without default path support. Consider a FIG. 29A four node part of "mesh" multi-processor computer with distributed memory. In such organization a node consists of a processor, memory, and interconnect circuitry to communicate with neighboring nodes. A new task (instance of stress-flow atom) has to be assigned a node as close as possible to the nodes the new task has to communicate with. This is required in order to optimize performance. Suppose we have some object X allocated in node C and node B executes code that needs to fire stress-flow atom aaa from object X. In order to be able to pass parameters, node B needs to obtain access to the stack that will be used by X.aaa instance fired by it. In this architecture this means the need to already assign node to the fired instance of X.aaa even if all the nodes around are busy and none will be able to actually run X.aaa any time soon. Since B needs to write parameters for the new instance of X.aaa, it has to be allocated somehow close to both B and C where the object X and its data reside. In the situation shown on FIG. 29A, if node C was overloaded and node A was relatively free, A would be assigned the new task due to its relative closeness to both B & C even if say node D was significantly more free than A. Performance problems with this solution come from the fact that the new node and especially new local stack had to be assigned up front at firing time, based on node loads at time moment possibly way ahead of the moment X.aaa will actually be executed. At the time X.aaa actually runs the node load situation might be totally different. The second performance problem comes from the fact that due to need to write parameters for the new stress-flow instance, the node selected for X.aaa has to be close to the node that fired it (in this case node B).

It may appear that not much can be done with the problem described above. The present invention, however, has some unique characteristics that can be taken advantage of in order to greatly improve performance in the situation shown on FIG. 29A. Every stress-flow atom consists of the stressed and relaxed sections. The underlying principle of the present invention is that only one process (or one mini-thread) can be inside the stressed section at the same moment. Also, once a newly fired stress-flow atom gains control of the associated lock, it does not release it until it is run and until it reaches the relaxed section. The implementation also already requires allocating data space for holding the lock data at the same scope where the stress flow atom was defined. This is also where the default-path copies of the parameters of a selected stress-flow atom types would have to be stored. But, there is nothing preventing us from reserving proper space there and storing the stress-flow atom parameters themselves. The only downside would be that doing something like that is impossible with currently available compilers.

The firing code would thus store a call's actual parameters in the space reserved for it with the stress flow atom lock. The stored values would need to be copied from there to the stress-flow atom's stack only if they were used in the relaxed section, as shown on FIG. 29B. Storage for all actual parameters for "SomeAtom" is generated at the same place and scope the lock data is. If a parameter is used only in the stressed section, no copy of it is ever made on the local stack. If a parameter is used in the relaxed section, a copy of it is made on the stack and the accesses to it within the relaxed section operate on/with the copy.

This may seem as a little unorthodox and complex, but the advantages, however are enormous and well worth the cost. First of all, there is no delay associated with allocating a stack (or a whole mini-thread) to a newly fired stress flow atom which already improves performance on all possible implementation platforms. The moment the control of the stress-flow atom's lock is obtained the parameters can already be stored in the space reserved with the lock without even knowing what node/processor will actually run the newly fired atom. In case no acceptable node is ready to run the fired atom, it can be queued inside the node that hosts the atom data awaiting change in situation. Queuing the fired stress-flow atom rather than actual node-assigned mini-thread complete with local stack with parameters written to it means that we do not tie resources (such as mini-thread control data and stack) until a node is ready to run the fired atom. This means ability to easily assign and reassign the target node to run the atom and further improvement in performance. But the gains are most important in distributed parallel architectures. The firing node does not have to communicate directly with the node that runs the fired atom which allows more flexibility in assignments and a simpler assignment algorithm. Also, not being forced to assign a node ahead of time means that when the atom actually runs it will run on best possible node and not one that had to be guessed to be the best ahead of time. If the guessing was wrong, and an atom was assigned to a very busy node, it can be easily reassigned to its neighbors as soon as they become free. In situation shown on FIG. 29A this means that X.aaa can be assigned to node D rather than being artificially and wrongly forced into node A.

The last advantage is that default call/firing implementation is automatic. Since the stress atom actual parameter data is persistent between calls, default call firing simply means firing the node without touching the parameters at all since the copies of previous values already are exactly where they need to be.

Above described method of passing actual parameters has another advantage of allowing new type of parameter passing. Since storage place and previous value are persistent between calls and safe to access by tasks while the corresponding lock is reserved, this can be taken advantage of by allowing calls of, for example, "one more than before" sort. Such parameter method could be indicated by placing say "@" character inside parameter definition as shown on FIG. 29C. Such scheme would allow passing unary expressions operating on the space reserved on the parameters as also shown in several examples of calls on FIG. 29C. With prior art parameter passing through stack, something like that would be impossible, but here it has perfect sense. Before the expression given is executed, the lock of function "Func" must be reserved, assuring that two processes cannot be accessing the parameter space at the same time. Due to its characteristics, such method of parameter passing could be named "by expression" or "by coercion". This method will allow merging many separate functions for typical object operations into one. Rather then write several functions for object: "increment," "decrement", "set"—all of it can be now done with one function passing proper parameter through "coercion."

It may appear that similar effect could be achieved with prior art object-oriented languages through operator overloading. This is false. Here, we specifically guarantee that only one task/process can be changing the variable at the moment while also allowing proper notification of other objects and functions if it so desired by designer of the function. Consider, once more, the example on FIG. 29C. The function body allows notifying others to take action, before another change can take place, through "notify_A" call, and it also allows to start post-fact notifications by "notify_B" call made from the relaxed section of "Func" routine.

Inner Workings of Implementation

The set of mechanisms described so far may seem fairly complex. The most important characteristic however is that all of the described mechanisms are easy to implement on any existing microprocessors in just a few instructions and specially created micro-processors could do key work as single hardware instruction. This is important because otherwise the overhead of switching the stress-flow atoms (which are essentially micro processes executing separately) could make the present invention impractical. The set of operations used for interfacing between stress-flow atoms actually removes all the hardest elements of multi-processor design from the user's code into the hardware or core interface layer. This has resulted in previously impossible level of simplification of parallel code design.

A big advantage of present invention is offering the same programming method regardless if the code is to run on one processor or on a hundred of them. Some key elements of implementation must still naturally vary according to target platform. In particular implementation running on a one, two, . . . up to several processors system will be slightly different from implementation on a massively multi-processor hardware. The first implementation actually has to emulate an interface of having minimum say 50 processors available as hosts for stress-flow atoms. Implementation on massively multi-processor hardware does not have to do that but it is desired that a single processor presents itself as several stress-flow hosts. This is helpful because stress flow atoms can be stalled waiting for some other stress flow atoms. If one hardware processor (even in a very-large number of processors system) could only be hosting one stress atom at a time, it would mean very inefficient use of resources as a processor hosting a suspended stress-flow atom could not execute a more recently fired (but ready to run) stress-flow atom. What this means is that regardless of target hardware, the most important interface layer is one or more pool of potential handlers for stress flow atoms. An implementation hosted on a system with shared memory and up to a several processors will have one such pool especially if it has to run on an existing operating system that already manages assignments of any threads to physical processors. But, for performance sake, a system with large number of processors will have separate pool of handlers for each processor or for a group of them bound by common location. The purpose is to be able to try to assign newly fired atoms to processors closest to the ones running stress flow atoms that the newly fired atom has to communicate with. This layer of implementation will be described together with hardware architecture best suited for present invention.

The biggest obstacle in implementing and testing the present invention was the fact that pretty much all aspects of processor interfacing were done in fairly unorthodox matter. In fact, no synchronization tools offered by an existing operating system were used. Instead, all interface mechanisms were written directly using machine instruction-level operations, some of them being interlocked memory operations. Some standard terminology had to be used in description here (like critical-sections) but all the critical sections used were custom-made and fairly non-standard as well. The stress-flow interface consists of three elements: mini-thread (or mini-task), stress-flow atom base, and a lock mechanism. In greatest simplification, a mini-thread is a resource associated with its own stack and it implemented as two pointers—the "next thread pointer" and address of a stress-flow atom to run or being run. The "next thread pointer" is used to link mini-threads into lists/FIFOs/queues of idle, active, waiting for a free processor, or waiting for a lock mini-threads. A stress flow-atom base consists of a pointer to associated lock and associated member or global routine. A lock is simply the head of a FIFO of threads waiting for it plus pointer to the current owner thread which can be NULL.

As previously explained, initiating/calling a stress-flow atom is a multi-step process. The first thing that happens is attempting to reserve stress atom's associated lock. If a lock is free the calling thread marks it as reserved and continues. If the lock isn't free, the calling mini-thread adds itself to the lock's FIFO and then suspends itself. Adding to the lock FIFO or any other FIFO simply means manipulating the "next thread pointers". One way or another the next instructions of the calling mini-thread get executed when the lock has been reserved (either without waiting or as a result of the lock release call). Once this happens, the calling thread can obtain access to previously idle mini-thread, store parameters in it, and schedule it. Scheduling simply means storing address of the stress-flow atom to run in the newly obtained mini-thread and inserting it to the active mini-thread FIFO. Somewhere inside its body, the newly scheduled stress-flow atom will release its associated lock, which means taking the head thread from the lock's FIFO off and activating it. Very low overhead of this system comes from the fact that each of these operation needs just a few pointer setting/resetting steps while micro-processor hardware built with stress-flow in mind could do it all in hardware.

Implementation in Microprocessors

To be able to implement the rudimentary synchronization mechanisms and to be able to safely share common memory in multi-processor architecture, prior art depended on special "interlocked memory" microprocessor instructions and that guaranteed that only one processor could perform such "interlocked memory" instructions on the same data at the same time. The present invention can and actually was implemented in multi-processor hardware using such instructions.

The key feature of present invention is that all process synchronization and shared data protection is performed solely by means operations on the lock variable associated with every stress-flow atom. Therefore, multiprocessor hardware design can be greatly simplified by implementing the present invention as part of microprocessor core. Simply providing a special purpose register to store the address of the currently used lock variable would not only eliminate need for all interlocked memory access instructions completely, it would also allow performing all synchronization and process control by means of single instruction. Just as currently produced microprocessors have program counter or stack pointer special registers, the proposed microprocessor would have a "lock address register."

All microprocessor operations with the lock register null are the same as before. Otherwise, the operations look like this: Attempt to assign an address to the lock register (microprocessor move instruction with lock register as destination) attempts to reserve the lock. Subroutine call instruction with lock register set initiates execution on another thread or processor. Return instruction with lock register set marks the lock for release and zeroes the lock register.

This way all of present invention functionality is accomplished by means of one special-purpose register and single microprocessor instructions related to it. "Move" instruction involving the lock register would be the only operations requiring memory interlocking shared memory—a great simplification in designing symmetrical parallelism capable microprocessors.

Application in Parallel Architectures

The important feature of the current invention is that, in spite of being intended as extension to existing object-oriented languages, it always relies on a large number of processors (physical or simulated/virtual) to accomplish its object-oriented character. This means that the present invention offers substantial gains in clarity of software development even if a program developed using it runs on a single processor that emulates many virtual processors. This is the key, crucial element that seemed to be missing from the previously proposed parallel programming methods. In many people's view, this is the very characteristic that has doomed all previous methods, limiting most practical parallel software development into sequential design in Fortran or C where elaborate compilers tried to parallelize software written as sequential. Specifically proposed parallel methods, on the other hand, would almost always be geared toward one specific architecture, sacrificing universality of written code and extremely complicating debugging process. The present invention does not suffer such limitations and it can be said that decisive majority of algorithms correctly coded using the present invention will run equally well on all universal-purpose computing platforms. Furthermore, it naturally distributes/localizes the memory it uses which allows application on distributed memory systems. It will be shown how present invention is implemented on different existing parallel platforms.

Implementation of present invention on shared-memory multi-processor system is most straightforward and leaves least issues to resolve as far as application of present invention goes. But the problem with such architecture is that it either uses the same memory bus for all processors or it uses crossbar circuitry for connecting memory with processors. The first solution makes the system bus the hardware bottleneck resulting in situation where only a few processors can be used efficiently. The second solution of using the crossbar is quite expensive and not easy to miniaturize. It results in complex, high-speed, energy-consuming circuitry that connects multiple processors with multiple memory blocks. The present invention can run well on shared-memory multi-processor system but its advantages come from the fact that they can run equally well on other multi-processor architectures.

The object-oriented stress-flow programming method of present invention results in breaking the problem into a number of stress-flow atoms or parallel mini subtasks. Each of them is clearly defined user of one or more small sets of data and a producer of usually one small set of data. To be able to break a problem into sub-atoms, the data itself has to be organized into subparts that can be worked on independently. A well written stress-flow atom only gets access to the subset of data it actually needs to access and the stressed/relaxed layout of atoms naturally encourages it—properly written stress-flow code is almost always shortest. Practice quickly shows that stress-flow object-oriented programming is often more clear and easier to understand than object-oriented programming without it.

The sets of data processed by a particular stress-flow atom are most often data located on stack or heap of the stress-flow atoms that led to firing current stress flow atom and rarely some more persistent structure created far back in some remote location. For these reasons, the ideal hardware for present invention is a large number of small processors configured into an n-dimensional mesh/toroid of processing nodes, each having own processor(s) and its own memory, preferably all on one chip. The node interconnecting circuitry/bus could be much slower than the internal bus thus allowing low cost/low power design thanks to all high speed circuitry being inside individual chips. Large number of slow processors organized in a higher degree mesh (three, four, five-dimensional, etc) thus becomes a far better computing platform than a few very fast processors. Such architecture is very natural from the standpoint of ease and cost of hardware design.

Since the present invention inherently atomizes all problems into a very large number of mini-tasks running in parallel, increase in number of processors directly translates into performance increase even if both individual processors and their means of interconnection are relatively slow. What is required, however in such a situation is a method of properly assigning newly fired stress flow atoms to processors in a mesh, in order to minimize performance loss due to remote atoms accessing each other's data. The issue is very important, because it only makes sense to spread newly fired atoms around the mesh as long as delay of accessing remote data is not higher than cost of waiting for processing resources to be available closest to where the data resides.

To properly assign a newly fired stress-flow atom through a localized (non-central) computation of best node to use, we need current load of each processor and cost of node hops required to access each of the non-local memory blocks passed as pointers/references to the newly fired atom. This computation can be crude, giving only very rough estimation of the best node to run the new stress-flow atom on. Since stress-flow atoms are run as relatively short mini-threads, load situation of nodes changes rapidly. Therefore, key to performance of stress-flow design is atomization of all code into a large mass of mini-threads and being able to instantly reassign scheduled atoms from one node to another—not completely accurate/optimal original choice of node to run a newly fired atom on. Whenever a node becomes free it takes work off the queues of its neighbors if they are busy. Moving a scheduled instance of stress-flow atom is quite easy and, if the actual-parameters-stored-with-lock method is used, it requires moving just one pointer from one node to the other. Empirical experiments and simulations show that roughly accurate estimation of node hoping cost is far more important that estimate of current or projected node load. This has to do with the fact that if the node load is self correcting, while node hoping is not. A node with underestimated load will get more waiting tasks that the neighbors, and the neighbors will either be now getting newly fired atoms or they will quickly finish and take the load of our overloaded node. A node with overestimated load will finish its work and thus will get its load estimate lowered. No such self-regulation is possible as far as optimizing node hoping is concerned. Wrongly assigned stress-flow atoms will push new calculations away from the data that needs to be accessed and the problem will compound itself rather than self-correct.

For these reasons, it is helpful to have a universal mechanism to properly ascertain penalty associated with accessing remote data. Such mechanism does not have to be accurate. Doing that completely accurately would be time consuming and the cost of it could outweigh benefits. The idea is to have an estimate of where most needed data is located and how much of data is there plus quick method to combine such estimates together into one as roughly shown on FIG. 30. The result location structure A+B is not an exact merging of A and B but rather rough approximation of one data location structure somewhere in the middle between A and B or the most important elements of A and B, depending on architecture.

In a mesh parallel processor architecture, the best starting candidate for running a newly fired stress-flow atom from the standpoint of least node hopping is a "center of gravity node" of pointers/references passed as parameters to that newly fired atom. If that node's neighbor offers better performance because of the lower load, it now becomes the candidate and its neighbors are checked. The process would stop when the current candidate was found to be better than any of its neighbors. Such algorithm, combined with natural, non-hardware specific stress-flow design rules therefore allows optimal utilization of any specific architecture. FIG. 30A shows an example of how such algorithm would work for a 8 by 8 mesh of processing nodes. The numbers inside the squares represent the number of tasks waiting for processor (but not a lock) in a particular node. The shaded nodes N(2,2) and N(5,5) show nodes where memory of the parameters for some atom being fired are located. If the amount of data that needs to be accessed in both shaded (parameter data) nodes is the same, we want the fired node to run as close as possible to half distance between the parameter nodes but while taking current load of nodes into consideration. If amount of data to access is considerably more in one of the shaded nodes, we want the newly fired node as close as possible to the node with more parameter data. A sufficient method to calculate the center of gravity in this system is simply the average of the coordinates of nodes weighted by the amount of data to access in each of them. For example, if the amount of data to access in both N(2,2) and N(5,5) was some number m, then the center of gravity would be ((2 m+5 m)/2 m,(2 m+5 m)/2 m)=(3.5,3.5). If the amount of data to access in node N(2,2) was twice as much as in N(5,5), then the center of gravity would be ((2*2 m+5 m)/3 m,(2*2 m+5 m)/3 m)=(3,3). Locations structures for this situation and process of combining them is shown on FIG. 30B. Structure A has 2000 units of memory at (2,2) and structure B has 1000 units of memory at (5,5), therefore, A+B means 3000 units of memory at (3,3). Such location information passed to the node assignment circuitry or routine will try to assign relatively non-busy node as close as possible to node (3,3).

In order to make possible optimal assignment of a processing node to a fired atom in any architecture with distributed memory and to limit penalty associated with accessing remote data, the present invention provides platform independent means of retrieving and processing location and amount of all accessed data. This is accomplished by means of defining a special "location" function and type as part of the language of present invention. The idea behind location type is to provide platform dependent data location and amount information but allowing platform independent way of providing and processing this information according to scheme of FIG. 30. In the two-dimensional mesh described above, the "location" type would be a variable combining x and y node coordinates and some rough amount of data to access at these coordinates. Platform independent calculation of "location" variable is accomplished by means of assignment of pointer or reference to some data, for example:

```
char* p = new char[2000];
location loc_p = p;
```

This code makes sense regardless of how the location data is stored and formatted. Depending on type of data and type of platform, the location may return meaningful data or empty location as indication that cost of access of data is negligible. Any pointer or reference to any globally accessible data already must contain the identification of the node where the data is stored, therefore, the only thing to do is to strip that part and to combine it with information about the amount of data to access there. Statically allocated data are obviously no problem as we simply combine "sizeof" information with masked part of the pointer. For dynamically allocated data it is also as simple all dynamically allocated data already includes a header with platform dependant maintenance info. The user data is located directly below this header and the header out of necessity always includes amount of allocated memory and other info such as usage count for garbage collection purposes. For purposes of processing node assignment it is actually beneficial in most cases to use the amount of currently allocated memory rather than amount actually used at the moment and all that we want and need is a rough estimate.

For structures and objects (classes), the location info needs to be more elaborate. For example, for a structure defining a dynamically allocated string or array, the location and size of the dynamically allocated buffer is obviously much more important than the location of the pointer to it.

```
class String
{ char* m_buffer;
} s;
location loc_p = &s;
```

The location calculated here should obviously contain location of m_buffer as the main component and not location of the place where the pointer to it is stored. A compiler can automatically generate such location function, or it can be written/overwritten by the author or the class. To avoid having to reserve another keyword, the location function can take advantage of the fact that constructors cannot return information and therefore declare the class location function with the same name as the class, except returning the "location" type:

```
class String
{ char* m_buffer;
    location String( ) { return m_buffer; };
} s;
```

If an object contains pointers to more than one block, the location function needs to combine them in some way, but not necessarily in a way that assigns equal weight to all components. Consider a binary tree class. Assigning the same weight to both current object and the left and right branches would needlessly constrain the tree from distributing itself throughout many nodes. For these reasons, a proper general case "location" function for a binary tree would look like this:

```
class Tree
{ char *left, *right;
    data m_Data;
    location Tree( ) { return this+left/2+right/2; };
} s;
```

What the location function in this case says is: return center of gravity of current, left, and right elements, but in a way that treats left and right contribution to have together the same weight as that of the current element—which makes perfect sense for a tree that we want distributed throughout many nodes. Increasing or decreasing the weight of a location expression parameter through multiplication and division operators makes perfect sense because these operators do not need to be used for adjusting/combining coordinates and because the adjustment relative to amount of data being processed is the ideal required effect. A simple scheme simply declared importance of different data components as seen by the designer—all that should be required from standpoint of high-level language design. This scheme has been found to be sufficient method of optimizing parallelism for any parallel architecture. If interconnect cost is fairly small or non-existent (as in case with shared memory system), the generated location info can be ignored or implemented in a way where same weight is returned for all original data pointers. The scheme will still keep all processing in general proximity of the nodes containing data.

Such crude universal data location scheme would not work with other methods of programming, but it is completely sufficient as far as stress-flow method of programming is concerned due to the way most data is defined and used. Therefore, the programmer does not need to concern himself with details of hardware on which his software will run. The programmer only provides expressions listing importance of various components in interactions with others, and the actual hardware provides means to store and combine this information.

Application in Virtual Parallel Platforms

High cost of custom parallel-processing computer hardware resulted in fairly significant interest in being able to organize low-cost "commodity" computers into "virtual" parallel processing platform. The commodity computers would most often be connected with relatively slow universal network hardware. Communication between nodes is accomplished explicitly by means of message passing framework, including data interchange between nodes by means of explicit commands. In spite of its limitation, the method was quite successful due to low cost—result of utilization of often unused processing power of many computers connected to a network. The computing structures utilized in such virtual parallel commodity systems were relatively simple, most often computing the same code with different sets of data on many network machines—which happened to be quite sufficient for many common problems requiring massive amount of processing. Programming/communication method used there is rather crude and incapable of implementing truly complex systems where large number of many dissimilar software objects communicates with one another. There were attempts to encapsulate the crude, low-level message processing interface used for programming such architecture in object-oriented programming wrappers, but no universal programming method was proposed for such an architecture, much less a universal programming method compatible with other parallel systems.

In spite of relying on a generic, low level programming technique, the stress-flow programming language and method implement well on virtual parallel processing platforms. The stressed/relaxed programming layout of all elements is sufficient method to describe all common applications of virtual parallel processing platforms, while its unique features (such as redundancy support) allow a lot of new applications. Feasibility of the present invention for "virtual parallel platforms" is also a very good demonstration of universal characteristics of present invention with data "location" functions described in previous chapter.

The most challenging part of any "virtual parallel platform" is lack of any direct means for platform participants accessing each other's memory which necessitates copying data back and forth in order for parallel processing to take place. If the means of communication between participating computers are relatively slow network interfaces, the overhead of the communication becomes the most important system management issue. The prior-art methods of programming "virtual parallel platforms" performed the copying explicitly. Manual, explicit method of inter-computer communication might offer appearance of being a performance safe, efficient method and is sufficient for some computation intensive tasks. However, this approach totally prevents high-level structural software design concepts and as a universal-purpose computing platform is as efficient as programming complex software systems all in assembly language would be.

The first necessary step to adapt the present invention to "virtual parallel platform" is globalization of pointers passed between stress flow atoms to identify data being passed from remote computers (processors with local memory). The details depend on particulars of the used processors, but special far pointers, with locally illegal segment ID, is the most optimal solution in most situations.

Figure 30:
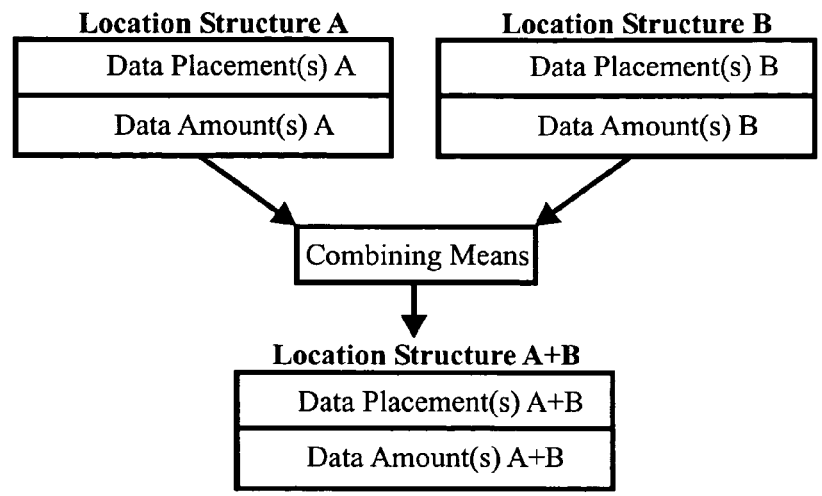
FIG. 30 shows subroutine data location concept used for assignment of processing node
Figure 30A:
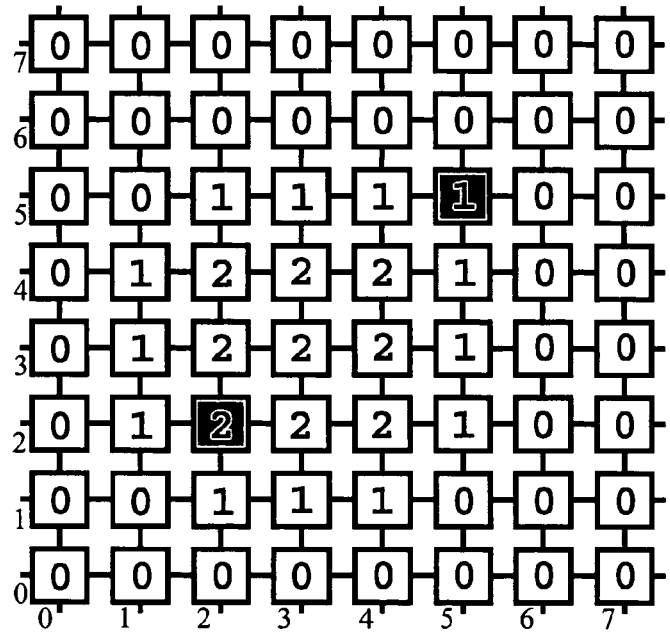
FIG. 30A shows sample assignment and distribution of tasks in mesh architecture
Figure 30B:
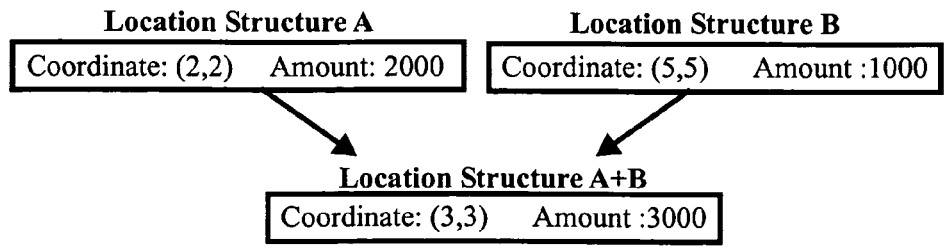
FIG. 30B shows sample operations on data locations in mesh architecture of FIG. 30A

Second step is creating proper location processing implementation appropriate for virtual processing platform corresponding to the generic scheme shown on FIG. 30. One way to implement location representation is simply by making a list of amount of data used on different remote computers. As the purpose of the "location" functions is to determine best node to fire a new atom on, the location information does not have to be complete or precise. The goal is simply to try to assign the new atom to one of the nodes that already have some or most of data needed if it is not overloaded with tasks. It can simply be a fixed length list/array of IDs of nodes containing data most relevant to the newly fired atom together with the total amount of data in it to be accessed by the new atom. Empirical tests have shown that such list being about four elements long is completely sufficient for all practical applications of the invention. Combining such location information is fairly straightforward too. If both added "location" structures have elements indicating use of data in the same node, the amounts of data are added up and all the elements combined into the result "location" structure. In case the result structure is too short to keep all the elements, only the elements with the highest amount of data to be accessed are kept. Platform specific code that knows costs of copying data then processes the location information and assigns optimal node based on amount of data needed to be copied versus current load of a node. The necessary copying is then initiated and running in parallel with previously scheduled atoms at the node. This is where the key feature of present invention makes it possible to efficiently use it on Virtual Parallel Platforms—for all time consuming calculation the code generated by the current invention will schedule a lot of atoms together, long before any of them are even run. This results in automatic overlapping of data copying and execution phases—a key advantage without which this universal scheme could not generate efficient code.

Figure 30C:
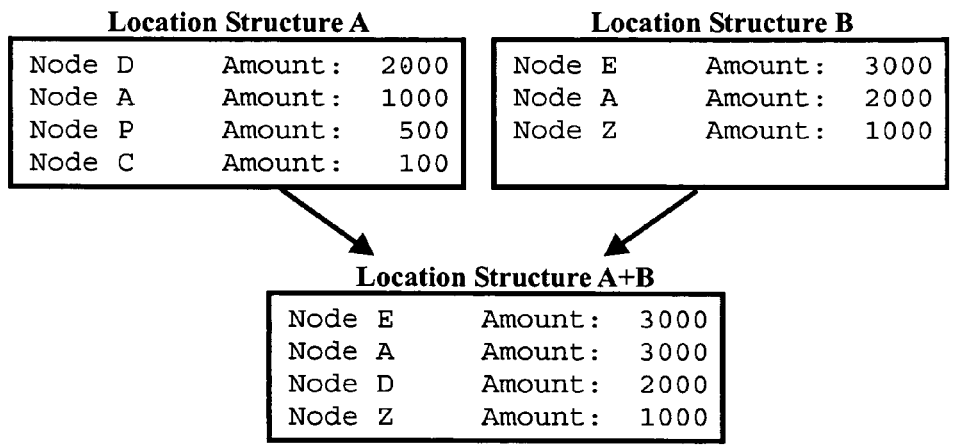
FIG. 30C shows sample operations on data locations in a virtual parallel platform

An example of this scheme at work is shown on FIG. 30C. Locations structures A and B contain list of nodes where needed data resides together with the amount of data needed. The list is sorted by amount with largest amount being first. Adding such location structures involves merging two lists, keeping the result sorted by amount as well. When both lists have matching nodes, the amount of data is added together as is the case with Node A of the example. Elements with smaller amount of data that do not fit in the final list are simply discarded. When such combined location structure is now passed to the node assignment routine, an attempt is made to assign the new task to node E or node A because this is where a lot of needed data is already located. If both E and A are so busy that cost of copying 6000 units of data would mean lower delay than waiting for E or A, an attempt is made to assign the new task to node D, and so on.

The method of calculation described above might appear imprecise and crude, but is sufficient to determine location information needed to allocate newly fired atom to a node that will run it. If it was more complex, the overhead needed to calculate location would outweigh its benefits since we always want the individual stress flow atoms to be as short as possible. For all this to work properly, we now have to do one little thing more. Once a node determines that load situation justifies copying some data to another node, from now on the other node's copied data location has to be returned as location of source data until load situation changes to the point where the original node is loaded less. Once the assignment algorithm decided the current node was so overloaded that it was worth copying the data to another node, we have to try to take advantage of that copying work as much as possible. If we didn't do that, copying would rarely be worth it, and what's worse, the original node's algorithm would try to copy the data to yet another work-free node, and then another, and so on. With this scheme, for most cases, a well tuned node assignment algorithm tries to keep everything in one node/computer due to heavy cost of copying. Once that load gets loaded so much that it justifies copying some data to another node, a significant set of associated data gets copied there and location of it reassigned. Now that node will be getting loaded with all new work until it too gets overloaded. The reversal of the scheme happens if one of the original nodes finishes its work and discovers that it is less loaded than some of the nodes using copies of its data. The "location" function is fixed back to return the older location. It would be possible, of course, to use more elaborate scheme, one that, say, could remember all copied locations and try to come up with best location set combinations for each atom call, but like almost everything else with stress-flow concept, the simplest scheme is best and most compatible with other platforms. Sfress-flow thus becomes an excellent tool to program virtual parallel platforms, compatible with other platform implementations. The only thing that has to be remembered about it is that due to need of copying data, this platform is less forgiving performance-wise if data and parameters are declared in clumsy fashion and, for example, "const" data is not declared as such, forcing unnecessary copying.

Electronics Architecture View

So far the present invention has been described mainly from the perspective of universal interface to the multiprocessor machine it offers to the user. But it also has another side to look at—namely how it defines multiprocessor architecture and how it utilizes it. These two faces of the invention are not separable and have to come together to make it a practical invention. The model of the present invention from the point of view of low level organization and electronic circuitry also allows better explaining of inner workings of the present invention.

Figure 31:
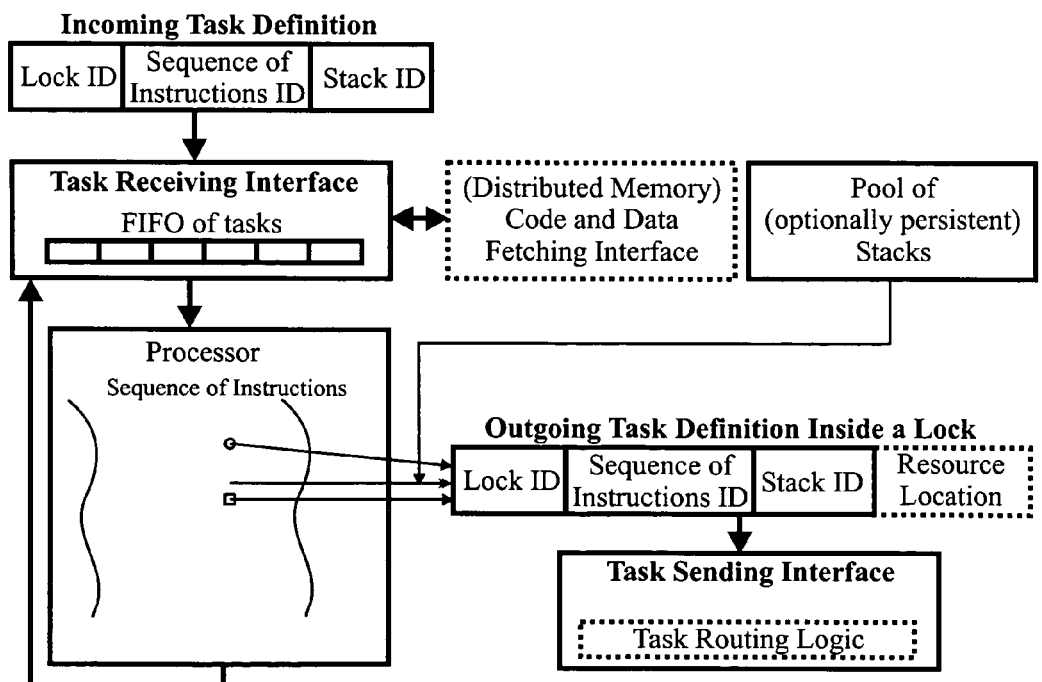
FIG. 31 shows layout of processing node of present invention using conventional stack parameter passing
Figure 31A:
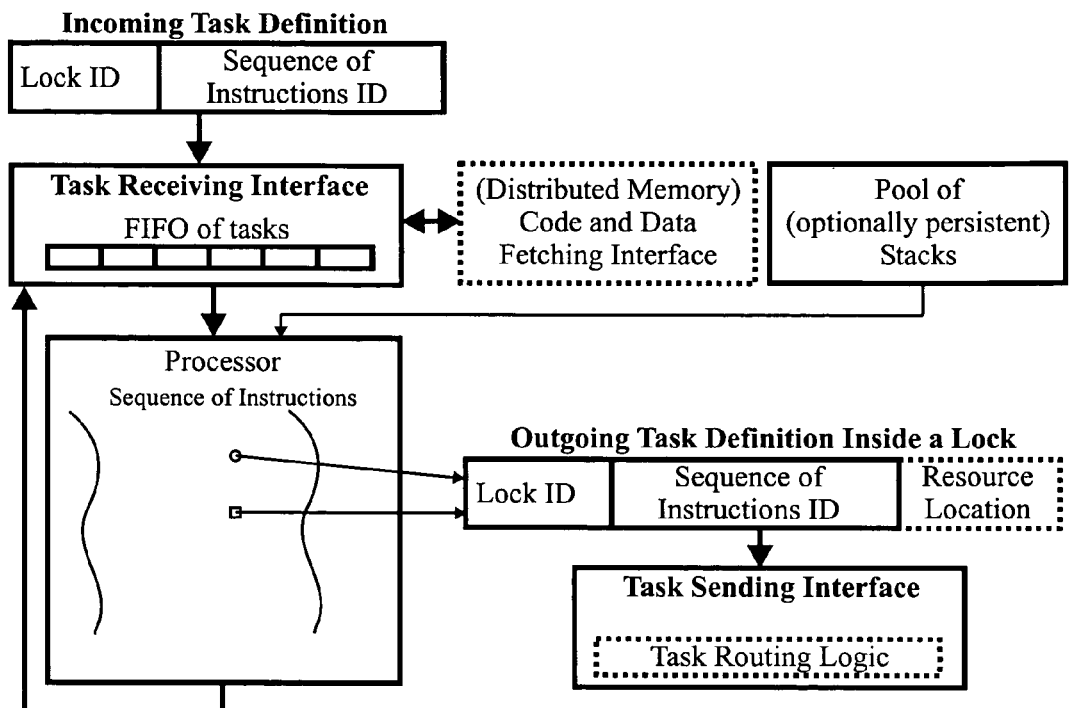
FIG. 31A shows layout of processing node of present invention using lock structure parameter passing

FIG. 31 and FIG. 31A show hardware conceptual layouts of processing node of present invention. FIG. 31 shows the layout where actual parameters of the tasks and optional return value are passed through stack in conventional fashion. FIG. 31A shows the advanced architecture where task locks provide storage for both actual parameters and optional return value.

The solution shown on FIG. 31 has to be discussed because it is still capable of fulfilling all functional requirements that necessitated the current invention, although with much lesser efficiency, particularly on distributed memory architectures. Other than the issue of selected method of passing parameters, presented layout is the same regardless of details of particular target hardware. There always has to be plurality of such nodes, even in special case implementations that run on a single processor. In such case, the implementation must emulate virtual processors that time-share the same physical resource, but which otherwise behave as if they were separate hardware pieces. From the standpoint of code running on a single processor, every architecture appears the same, the code only interfaces through lock constructs which, by virtues of the current invention, become critical processing/hardware resources, are regulating all aspects of parallelism and providing interface to other tasks. The locks in turn interface with implementation specific Task Sending and Task Receiving Interfaces—which could be seen as part of hardware/software implementation of locks themselves. Due to importance of the locks it would only make sense that computer architectures geared toward current invention would attempt to implement all lock operations in hardware.

Operation of architecture shown on FIG. 31 is as follows. For a new task to come to life, it has to be sent to the Task Receiving Interface. The task definition always consists of lock identification of the current task plus identification of sequence of instructions to run. In this architecture, with parameters passed through the stack, the new task stack identification or address has to be also included in task definition because at the point of sending the task definition to the Task Receiving Interface the stack must already be allocated and set with task's actual parameters.

The lock is reserved before the task is sent to Task Receiving Interface. Task Receiving Interface can run the new task at once or store it in some queue to be retrieved from there when the processor becomes available. A queue like that makes sense even in the case when the target platform has a very large number of processors. Also, the ability to frequently schedule far more tasks than there are processors is one of the key futures of current invention that allows very efficient parallelism on different platforms. Without such a queue a processor would not have anything else ready for it do after a currently running task has been suspended through a reservation attempt on some lock while schedule instructions would have to suspend the caller in cases when there were no available processors to take the task—complicating the scheme and making it far less efficient.

At the moment the Task Receiving Interface receives the new task, the processor can either be doing nothing or already executing some other task. If it is doing nothing, the Task Receiving Interface will make the processor execute the new task right away. If the processor is already executing another task, the incoming task is stored in the queue and will be removed from it when the processor becomes free: the previous task completes or gets suspended waiting for some lock.

Architectures with distributed memory may need another module connected to the Task Receiving Interface and cooperating with it: Code and (optionally) Data Fetching Interface. The time the tasks wait for processor in the Task Receiving Interface FIFO is perfect time to pre-fetch any code or data if it is necessitated by the architecture since these functions can be performed with little or no involvement of the node processor and all information needed for it is available in from task definition. Data copying pre-fetching should only be performed in architectures such as virtual parallel networks where the overhead of trying to do data access on byte-by-byte as needed basis would be prohibitive. However, code pre-fetching combined with caching is a good idea on all systems with distributed memory, even if nodes can access each other's memory at relatively little cost. The reason for it is that in most cases the same sequences of instructions will be scheduled to execute as separate tasks many times, and often they will be assigned to the same node or one close to it.

Once the new task is running, it will have to release its associated lock somewhere inside its sequence of instructions and it may need to initiate new tasks. The idea here is that few commands performed on the lock constructs is all that a running task knows how to do in regards to other processors or hardware. This lock/task initiation scheme is intended to be the main (or even the only) means to communicate with other processors and to synchronize with them. A task may access some common or global memory without the lock/task interface, but if any constraints are needed on such access, the method used to accomplish it is once again through using the lock construct.

To start a new task, the current task first reserves the new task's lock. Next it obtains a new stack for the new task and stores the actual parameters on that stack. A reserved lock, identification of sequence of instruction to run, and identification of stack for the new lock constitutes definition of a new task. Additionally on memory distributed parallel architectures, the new task definition should also contain originator task provided "Resource Location" to aid in selecting the node to run the new task on. The task parameter resource location concept was described in separate chapter and its idea is to provide rough information as to where most of resources needed by the new task reside.

Next the schedule command is issued to the lock that will allow thus completed task definition to be passed by lock to the Task Sending Interface. If the new task return a value, an optional wait-for-lock-release command may be used before the returned value is accessed which will be discussed in detail later.

Once a new task description is complete it gets passed into Task Sending Interface. This module routes the new task to the node in which it will be run. This involves selecting the optimal target node, using (if available) the Parameter Location information combined with current possible target nodes loads. The cost/delay of waiting for other tasks to complete is weighted against the cost of accessing the needed resources to come up with an optimal target node. On memory distributed architectures the Task Sending Interface of a specific node may only have access to its neighbor nodes. In such a case it simply passes the new task to the Task Receiving Interface of its neighbor in the direction of the optimal target node—and not directly to the Task Receiving Interface of the target node. Regardless of details and architecture of the target platform, the only information that can be required of the user software for proper node assignment and optimization is the Resource Location calculated by the originating task.

FIG. 31A shows how using the special parameter passing scheme through the lock affects the architecture. As previously explained, the idea is to have memory reserved for task actual parameters as part of the lock or next to it in the same memory space. Since only one task can have a particular lock reserved at a given moment, this is a perfectly sound scheme. A task calling a new task stores the actual parameters only after reserving the lock. Another task will be prevented from storing/corrupting the previously stored actual parameters in the lock by the need of reserving the lock first. If some parameters are needed inside the new task's relaxed section, they can be copied to the local stack at or before the stressed to relaxed section transition.

The big difference that this scheme makes is that the stack for the new task needs not to be allocated and accessible until the new task actually runs on the target, possibly after period of waiting in target node's queue as shown on FIG. 31A. This greatly simplifies the Task Receiving and Sending Interfaces as the task definition passed through now does not need to contain the ID of the stack assigned to the new task. But the performance gains are most significant when implementing present invention on any distributed memory architecture. In such a case, the preferred location for the stack is in the local memory space of the target node: The problem is that at the time of writing the new task actual parameters we do not know the target node yet, and it would be better not to have to make final determination of where the new task should run until the moment when it actually runs. The load situation of all nodes changes all the time and therefore so does optimal node assignment. Having to firmly assign target node for new task way ahead of time would therefore introduce costly inflexibility. For these reasons, allocating the stack for the new task way ahead of time only to store parameters passed to it there is a very bad solution. A complex scheme could be designed where new task actual parameters would be stored on the calling task's stack and the pointer to it passed along. This scheme would however be far more complex and less efficient than using the lock as the actual parameter storage area. With no need to pre-allocate the new task stack or need to access anything but the lock space, the Task Sending Interfaces can now freely pass the new task definitions from one node to another based on current node loads. Node loads themselves do not need to be known precisely until actually dealing with a new task ready to run.

Figure 32:
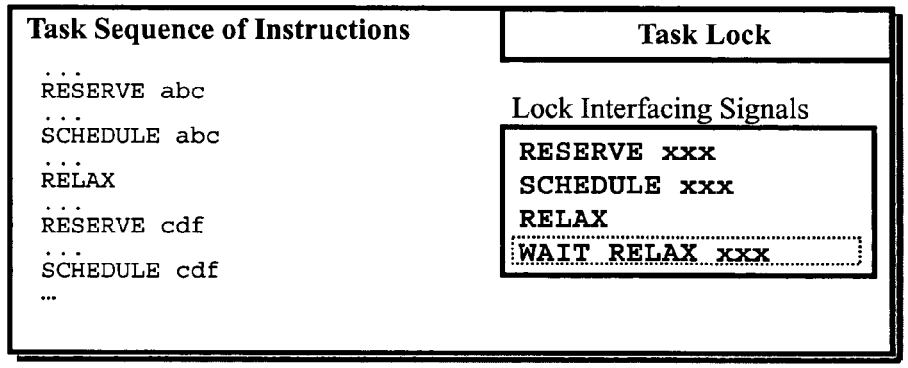
FIG. 32 shows assembly instruction model of a task call in present invention

FIG. 32 shows the view of the present invention from the standpoint of assembly level instructions running on a particular processor. Such single task always has to be associated with some lock and the pair of them constitutes what was called in the previous sections of description the "stress-flow atom." Such task has to release that associated lock somewhere inside the task's sequence of instructions. This is shown as the "RELAX" signal. A task has to be able to initiate new tasks (which are also pairs of lock+sequence of instructions). This requires two signals—"RESERVE" a new task's lock and "SCHEDULE" that task. The functioning of the "RESERVE" signal means reserving the lock if it is available or suspending the current task until the lock becomes available and reserved. The entire mechanism is an essential part of the lock mechanism and cannot reside anywhere else, no matter how the lock mechanism is implemented on particular platform. Therefore, from the standpoint of the current task—the "RESERVE" instruction is a one step command that always succeeds—even if that results in some delay. Command "SCHEDULE" a task gets executed after "RESERVE" instructions for this and possibly some other related new tasks have already been executed/reserved. These three signals or instructions are all that is required as outside interface regardless of specifics of target hardware. They can be implemented through many electronic or software means, but the idea is that this simple interface is all that should be needed for inter-process communication and synchronization.

The lock constructs utilized by current invention have several variations; all of them however use the same above described three-step interface mechanism, resulting in slightly different actions performed by the locks being used. Out of all possible uses, several cases have been identified where certain variation of such scheme can make sense from the standpoint of full possible optimization and ease of use in specific cases. They are not completely necessary for proper functioning of the invention, but will be described in order to explain the issues better.

First such case involves using a specific lock for just small "stressed" portion work only with no relaxed part, in which case it is more efficient to run said small stressed portion from within calling task, rather than schedule it as a separate task. This exception can still be seen as following the generic interface model, because the lock construct will process the RESERVE signal exactly as before, while translating the SCHEDULE signal/command to result in subroutine call or procedure in-lining within the current task.

Second such case happens in case the called task returns a value as explained in previous sections of description. In such a case, the calling task may need to be suspended to prevent a situation where it would try to use the return value before it is available. The three step interface operating on lock built to handle this situation can still do the trick in every case. RESERVE command works as before. RELAX does not release the lock but internally marks it as "Ready for Release" while SCHEDULE schedules the new task as before but also suspends the caller until the lock releases it through the "Ready for Release" internal command generated by the modified RELAX signal. When this happens, the caller gets restored and can now safely access the return value. This scheme works fine and is perfectly optimal except for situations where two or more new tasks of the present invention (stress-flow atoms) are called from the same expression. Suppose get_a and get_b are both stress flow atoms returning integer values. Expression get_a( )+get_b( ) will be translated like this:

```
RESERVE ( get_a, get_b );    // As always in such a case, all
                             // needed locks reserved or none at all
SCHEDULE get_a;              // Suspended until RELAX get_a
SCHEDULE get_b;              // Suspended until RELAX get_b
< add get_a and get_b return values >
```

This code works fine—but it isn't completely optimal since SCHEDULE get_a will suspend the calling task until the return value is available, which means SCHEDULE get_b will not be executed till then—which could result in completely unnecessary delays in some cases. For these reasons, for the sake of optimization, the interface can be expanded to include one more instruction for cases where the called task returns a value—shown as WAIT RELAX command on FIG.

32. In such a case, SCHEDULE works as it did with no-return value tasks (stress-flow atoms) while the WAIT RELAX suspends the calling task until RELAX instruction restores it, which allows running both get_a and get_b in parallel. The compilation of such a case will now look like this:

```
RESERVE ( get_a, get_b );   // As always in such a case, all
                            // needed locks reserved or none at all
SCHEDULE get_a;
SCHEDULE get_b;
WAIT RELAX get_a;           // Suspended until RELAX get_a
WAIT RELAX get_b;           // Suspended until RELAX get_b
< add get_a and get_b return values >
```

As shown above, even though this forth interface command isn't absolutely necessary, including it makes a good sense from standpoint of optimal performance of the present invention.

This generic and simple low-level architecture means that the user software running to be run on different platforms is the same, and the only things that are specific are the user invisible internals of lock construct and task receiving and sending interfaces. This also means that different processing platforms could be connected together as one system performing the same large job without user having to write custom software for each of them.

Figure 32A:
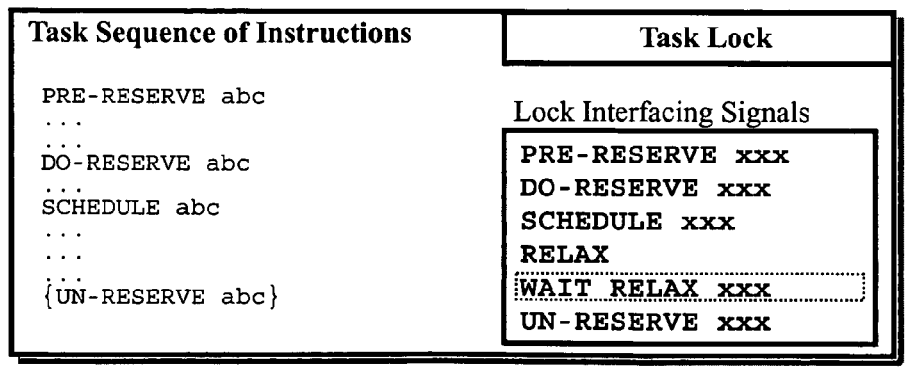
FIG. 32A shows assembly instruction model of an "ordered" task call

Implementing the "ordered" stress-flow atoms requires only slight modification to the same scheme and, in practice, can be accomplished with the same lock constructs and without any modifications to the Task Sending and Task Receiving interfaces. The lock interfacing signals/commands and sequence of their usage is shown on FIG. 32A. At the beginning of the whole sequence of instructions, the PRE-RESERVE a task command has to be issued. The best way is for the compiler to insert such commands automatically for every "ordered" stress atom called out of a task. The PRE-RESERVE command simply establishes a place in line/queue of the lock for the task called further down in the sequence of instructions. If the lock has enough tasks lined up for the PRE-RESERVED place in the queue not to make it to the front of the queue before the DO-RESERVE command is issued, the DO-RESERVE simply changes the PRE-RESERVED place in queue into regular reserved place and suspends the caller just as if the RESERVE command was called instead of the PRE-RESERVE and DO-RESERVE pair. If the PRE-RESERVED place makes it to the front of the queue, the lock will be waiting until the corresponding DO-RESERVE command is issued, not allowing any tasks RESERVED or PRE-RESERVED later within the lock to execute. The SCHEDULE instruction and optional WAIT RELAX instruction work exactly the same way as with regular (non-ordered) calls. The remaining UN-RESERVE command is inserted automatically by the compiler at the end of the sequence of instructions or earlier to deal with the situation a task was PRE-RESERVED but never called due to its calling sequence being bypassed by some conditional statement. Simplest way to implement this is by always inserting the UN-RESERVE commands for all ordered calls and have them remove PRE-RESERVED places that have not been utilized yet. Another way, demanding a little more sophistication from the compiler, can insert UN-RESERVE instructions as a result of conditional statements bypassing PRE-RESERVED "ordered" call.

Details of all important variations of the lock constructs of present invention will now be discussed. In actual implementation it was possible to include many different lock functionalities as options of the same universal construct, but, it is easier to explain the different logic functionalities as separate constructs.

Figure 33:
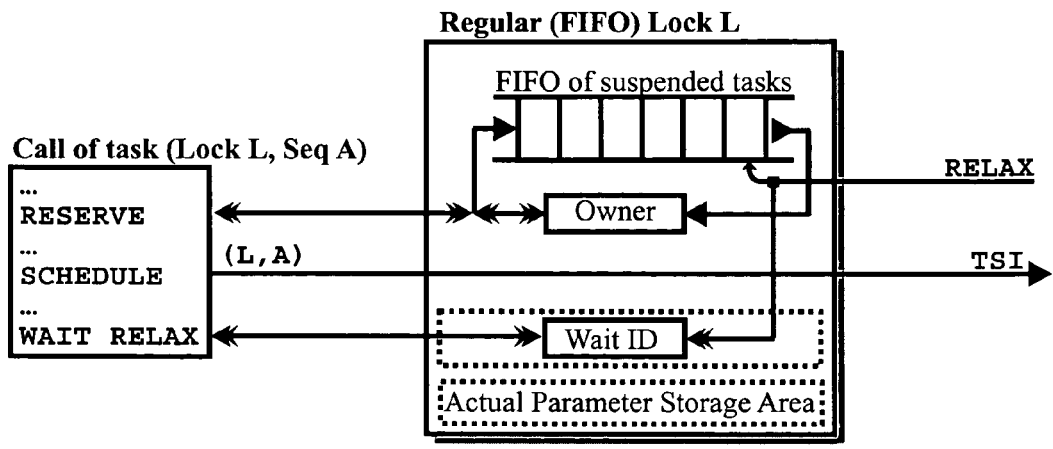
FIG. 33 shows diagram of single entry point FIFO lock

FIG. 33 shows single entry point FIFO lock. This is by far the most commonly used lock. It contains means to indicate if the lock is already reserved (has an owner), the FIFO and optionally built in or associated actual parameter storage area. The states this lock can be in are following: A. No owner and empty FIFO, B. An owner and empty FIFO, C. An owner and non-empty FIFO. In a practical implementation the FIFO is simply the queue of suspended tasks waiting for this lock and the owner a binary (True/False) flag and/or owner ID indicating if the owner already exists in case the FIFO is empty. If FIFO is non-empty there has to be a current owner. RESERVE command sent to this lock can either reserve the lock right-away if the lock had no owner at this moment, or it can result in placing the command sending task at the end of the FIFO and suspending it. RELAX command sent by current owner pops a suspended task from the front of the FIFO making it the owner or clears the ownership flag when the FIFO was empty. The SCHEDULE command simply sends the new task defined as pair ("Lock L", "Sequence to Execute A") to the Task Sending Interface (TSI).

Adding the WAIT RELAX command interface to this lock is very simple. All that this requires is "Wait ID" storage for ID of a single suspended task. WAIT RELAX command issued while the lock remained in its "non-relaxed" state would simply suspend the caller and store its ID. A RELAX command restores a task identified by a non-empty "Wait ID."

Implementation of the "ordered" commands with regular FIFO lock shown on FIG. 33 requires placing a PRE-RESERVE element in the FIFO or, if FIFO is empty, taking ownership of the lock until DO-RESERVE is called and then subsequent RELAX. Normally, it is the suspended tasks that are placed in the FIFO, but with the PRE-RESERVE command, there is no suspended task to be placed there. Such construction of the FIFO lock therefore requires allocating some special structure/variable to be linked into the FIFO. The most natural location for it is the caller task stack. Such structure can therefore be allocated as part of the PRE-RESERVE command functionality, which later inserts this variable into the FIFO. This method has many advantages. There is no need to search for the PRE-RESERVE place in FIFO to issue the DO-RESERVE or UN-RESERVE commands because the FIFO element itself is directly accessible by the caller task on its stack. Also, with a compiler already supporting object-oriented mechanisms, the PRE-RESERVE and UN-RESERVE commands can be easily implemented as parts of the constructor and destructor of said structure allocated on the stack.

Figure 33A:
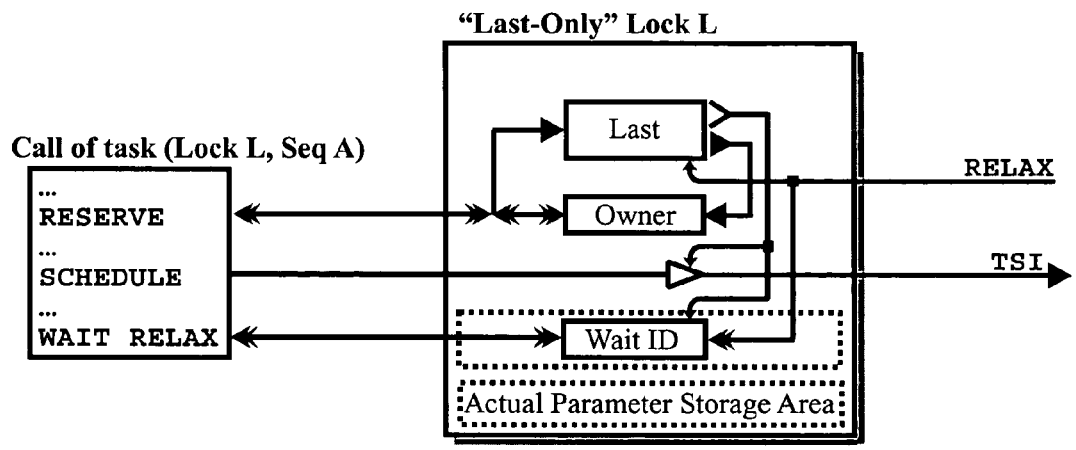
FIG. 33A shows diagram of single entry point "last-only" lock

FIG. 33A shows single entry point "Last Only" lock. This lock is less commonly needed, but useful for some applications such as previously discussed electrical circuit emulation. The underlying idea is that when more one task tries to access the lock, only the most recent request past current owner is processed. This can be done one of two ways. The FIFO from FIG. 33 can be replaced with a single storage spot for one suspended task. When RESERVE command arrives, the previously stored task is "pushed out," meaning: restored and made believe as if it actually executed its calling sequence. This involves setting the lock in the special state in which the SCHEDULE and optional WAIT RELAX commands from the pushed out task are ignored. Doing it exactly this way in situation where the lock stores the actual parameters would require being able to tell the "pushed out" task to not store the parameters or giving it a different area to store the parameters to in order to prevent corruption of parameters of currently running task. Another way of implementing "Last Only" scheme is keeping the FIFO as in FIG. 33 and storing incoming tasks as before, but having modified logic behind RESERVE command. In such a case RESERVE command would simply pop the previous element and push a new one.

Ordered commands are implemented on this lock in similar fashion as with the regular FIFO lock. In spite of the fact that there might be no FIFO here there still is a need to allocate the ordered element structure on the caller's stack since the lock's single slot now has to point to this structure. The FIFO solution will obviously need it as well.

Figure 33B:
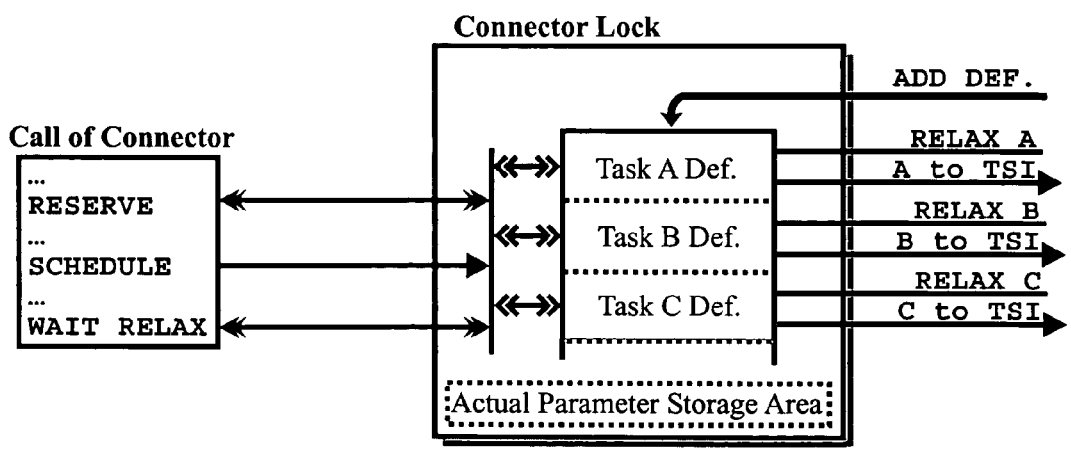
FIG. 33B shows diagram of the connector lock construct

FIG. 33B shows the diagram of the connector lock construct. Even though the connector construct is a container for references to other locks, it has the same interface as a single lock and could even be implemented in hardware same way as other type locks in computer architectures geared toward preset invention. As previously explained, the idea behind the connector construct is to be able to build a configurable list of stress-flow atoms (or independent tasks) to run. Internally, this can be a linked-list or an array containing references to separate stress flow atoms. Each such reference must always include the lock reference and identification of sequence of instructions to run. A connector construct could be static with list of tasks built at compilation time or dynamic where the tasks are added and removed as needed. Apart from interface to dynamically add tasks to the list (optionally also remove), the interface of the connector lock to the user is same as interface of other type locks.

FIG. 33B shows a connector lock with three task definitions stored in it. The RESERVE command sent to the connector lock will attempt to reserve all locks of all tasks on the list together. If this is not possible, it will reserve none. One practical way to implement this construct is to loop through the list of tasks reserving their locks and let the loop be suspended by the first unavailable lock after first releasing all the successfully reserved other locks, if any. Once the suspending lock becomes available, it will restore the connector lock's loop—which will attempt to reserve all locks again. From the standpoint of the connector construct's caller, this is still one RESERVE command.

Once the RESERVE command gets processed, the caller will proceed to the SCHEDULE command. Processing SCHEDULE command by the connector involves looping through the list and sending all tasks from the list to the Task Sending Interface.

Return value processing and corresponding WAIT RELAX command are rarely needed with connector constructs since trying to return a single value from many targets does not make much sense. The scheme can still be implemented by assuming that the returned value will be the random last value returned by one task from the list. In such case WAIT RELAX would stall the caller until all tasks in the list are sent RELAX command, thus stalling the caller until all tasks from the list send their RELAX commands.

The usefulness of the connector mechanism further shows advantages of passing parameters through lock structure rather than through stack. If the parameters are to be passed through stack(s), the caller has to allocate a new stack and store parameters on it. The connector in turn has to allocate a new stack for each task on the list and copy parameters to each of them. If parameters are to be passed through space allocated in the lock or with it, there is no need to allocate any stack, and a simple extension of the lock architecture can eliminate the need for copying the parameters in many cases by allowing a lock to receive a pointer to another lock storing the parameters rather than hosting parameters itself. Therefore, the connector lock or the first task on the list can be used to store the parameters and the other locks would be given a pointer to it.

To allow "ordered" calls, the connector mechanism can implement mechanisms for PRE-RESERVE commands in a way described with regular FIFO lock. This requires creating a number of PRE-RESERVE data structures on the caller stack or on in a specially allocated memory block. Both methods work fine, the second one is less efficient but easier to implement without writing special compiler code. PRE-RESERVE issued to the connector lock therefore loops through the tasks on the connector's list, allocates the needed data structure for each of them and issues the PRE-RESERVE command to each of them. The other "ordered" command implementations likewise run similar loops.

Figure 33C:
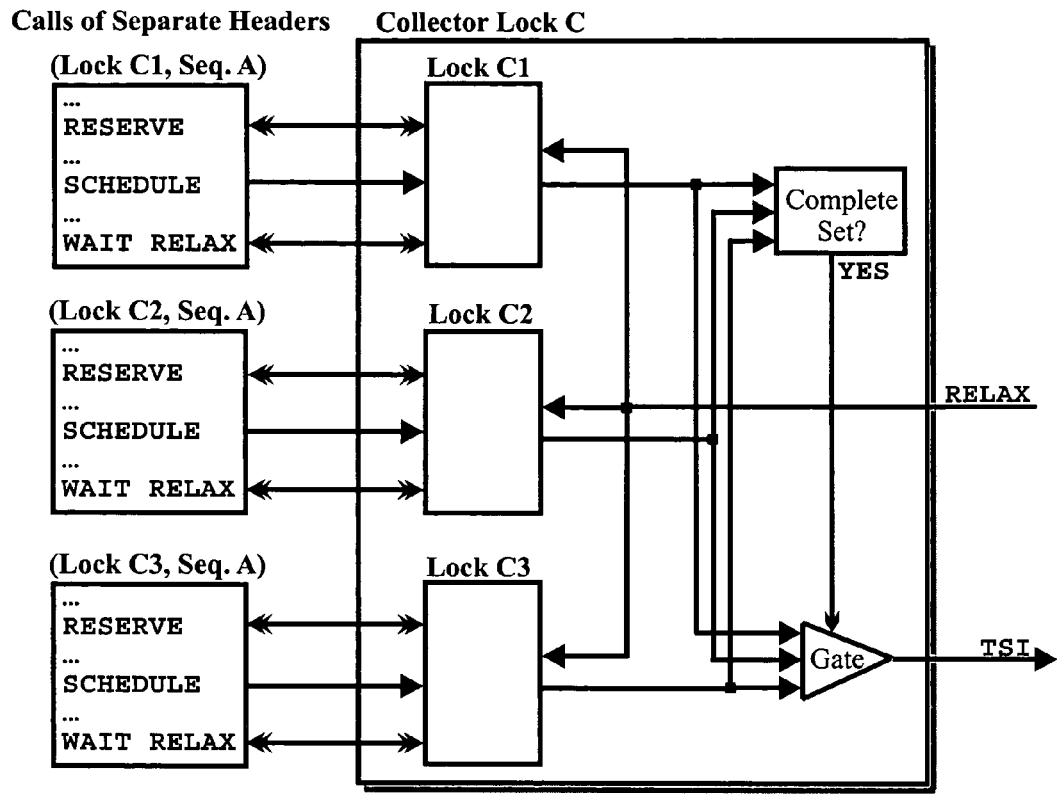
FIG. 33C shows diagram of the collector lock construct

FIG. 33C shows the diagram of one way of implementing the collector lock construct with three inputs. The idea behind the collector construct is to be able to merge two or more different independently running paths into one. A collector stress flow atom has one body and several headers where all of them have to be called before the sequence of instructions of the stress-flow atom/task gets executed. The collector lock is the internal way to implement such mechanism.

In order for this construct to work correctly in the normal situation of calls to separate headers coming at random moments, with possibly some paths generating many calls ahead of the others, it has to sort the incoming calls by header to which they correspond and by order in which they came. There are several ways to accomplish that. One way may involve indexing incoming calls (RESERVE requests) with the header number and inserting them inside the FIFO next to other calls from the same set. Another might involve building a special two-dimensional FIFO. FIG. 33C shows the method that was found to be superior, because it can be easily implemented out of existing constructs and because it totally eliminates any need for looping in order to insert new elements to the FIFO. FIG. 33C thus shows implementation of three header collector construct C. Locks C1, C2, and C3 are the standard, most common one input FIFO locks shown on FIG. 33. To the outside, it appears like three separate locks with standard previously discussed interface, to the associated sequence of instructions A it appears as a single lock. To make a call to first header, a calling task simply calls (Lock C1, Sequence of Instructions A) pair the same way it would call any other lock and sequence pair. To make a call to the second header, a calling task calls pair (Lock C2, Sequence A), and so on. This way the Task Sending and Task Receiving Interfaces always deal with generic pair of lock ID and sequence of instructions ID as task definitions while accomplishing variety of different functionalities. This not only greatly simplifies the whole system design, but also makes possible implementation of much of it in hardware.

Step by step, the tasks calling separate headers deal with the sub-locks of the collector exactly as if they were separate locks. RESERVE command either reserves the lock right away or it suspends the caller until it can reserve it. Once the lock is reserved, the caller writes the actual parameters and proceeds to the SCHEDULE command. If the lock-storage method of passing parameters is used, it is only natural that each sub-lock provides its own storage—since each header has different parameters and often of different layout and type. The SCHEDULE command sent to a specific sub-lock passes through it but does not go to the TSI—it gets processed through the common collector lock parts (circuitry). This common circuitry counts or otherwise remembers which sub-locks processed their SCHEDULE commands. If a newly received SCHEDULE commands is the last one, completing the whole set, it goes through thus sending the (Lock C, Sequence A) pair to the TSI. If it is not the last one, it only updates the state of the collector lock properly and otherwise gets ignored. If any of the calling tasks process their WAIT RELAX commands they get stalled until scheduled sequence A processes its RELAX command. Collector lock distributes the RELAX command it receives to all its sub-locks, releasing them simultaneously.

All "ordered" call functionality is accomplished by the collector lock's individual sub-locks. No additional circuits or functionality has to be added to the common parts of the collector lock for the "ordered" calls to work.

A variation of the collector construct can use the "last-only" locks from FIG. 33A instead of FIFO locks from FIG. 33, thus creating "last-only" collector lock.

Figure 33D:
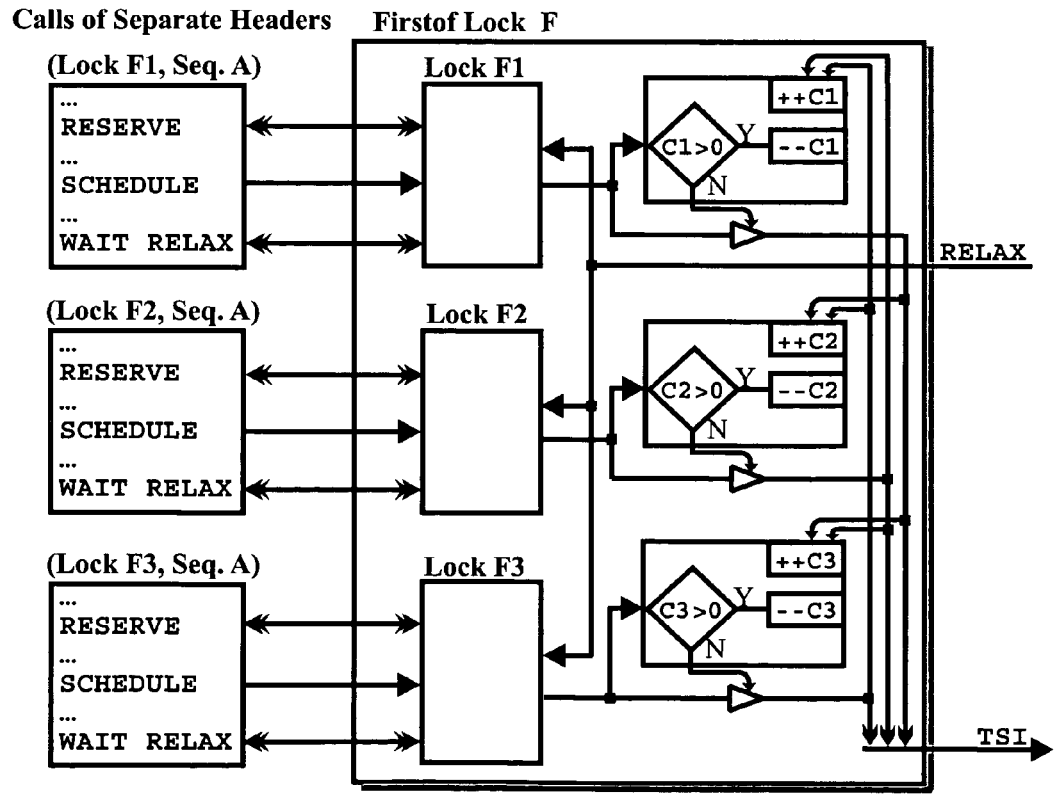
FIG. 33D shows diagram of the "firstof" lock construct

FIG. 33D shows the diagram of one way of implementing the "firstof" lock construct with three inputs. The idea behind the "firstof" construct is to be able to merge two or more different independently running paths into one but in a different way than previously discussed regular "collector" lock. A "firstof" stress flow atom has one body and several headers where only one of them has to be called before the sequence of instructions of the stress-flow atom/task gets executed. The calls to the other headers within a set that already had one call go through are ignored. The "firstof" lock is the internal way to implement such mechanism.

In order for this construct to work correctly in the normal situation of calls to separate headers coming at random moments with possibly some paths generating many calls ahead of the others, it has to remember which headers (lock inputs) are falling behind and by how many steps, so a proper number of calls that did not make it as first can be ignored. FIG. 33D shows a method to implement three input "firstof" lock using regular one-input FIFO locks as sub-components connected to the special common circuitry in a way similar to previously discussed collector lock. The output of each sub-lock goes to special counter circuitry which counts how many calls a specific input/header has fallen behind. The sub-locks work exactly the same way as described with the previous collector lock. When a sub-lock outputs a task and its corresponding counter is zero, this means that the given call made it as first—it is allowed to pass to the TSI but before it does, it increments the counters of all the other sub-locks. When a sub-lock outputs a task and its corresponding counter is greater than zero, it is ignored (it does not get passed into the TSI), it only decrements its corresponding counter as to record the fact that a task to be ignored has been ignored.

All "ordered" call functionality is accomplished by the "firstof" lock's individual sub-locks. No additional circuits or functionality has to be added to the common parts of the "firstof" lock for the "ordered" calls to work.

Figure 33E:
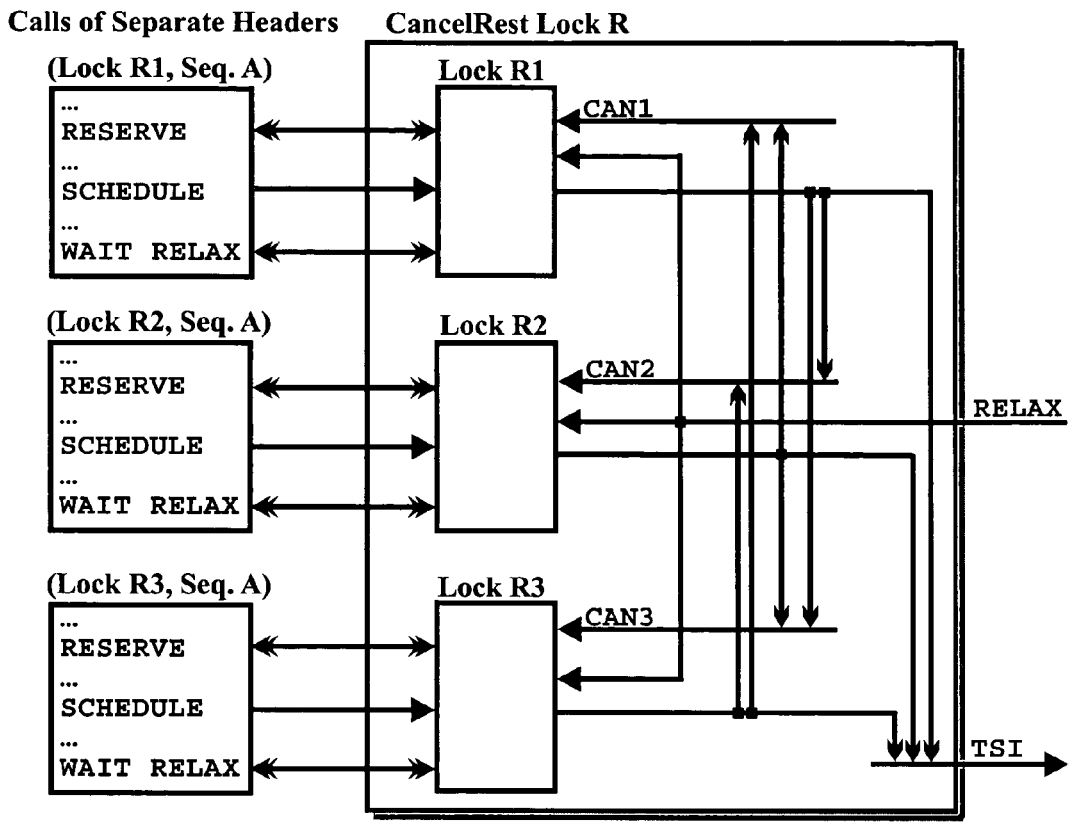
FIG. 33E shows diagram of the "cancelrest" lock construct

FIG. 33E shows the diagram of one way of implementing the "cancelrest" lock construct with three inputs. Functioning of this lock is very similar to the "firstof" lock. The only difference is that "cancelrest" cancels/kills the tasks that did not make it first instead of ignoring them. Such a feature is very useful in implementing redundant calculations and many other applications where the late paths may not come through at all. Safe termination of the unneeded tasks and corresponding releasing of unneeded resources also improves system performance. The "cancelrest" uses FIFO locks as sub-components just like the previously discussed locks, but needs a new "CANCEL" internal signal for canceling an incoming task. The functioning of this signal with FIFO locks is as follows: When an "occupied" lock receives this signal, the owner of the lock is terminated and the lock given equivalent of "RELAX" command. When the lock is unoccupied (which also means its FIFO is empty), a counter similar the one discussed with "firstof" is incremented. A lock reservation request that arrives when the counter is greater than zero results in terminating the task making the request. This is true of both RESERVE and "ordered" call PRE-RESERVE command. Please note that in almost every practical programming application of this scheme the counter gets used very rarely, meaning that the CANCEL command almost always finds an occupied lock. This is especially true of the "ordered" calls where the PRE-RESERVE commands are issued at the very beginning of the process that will result calling the "cancelrest" lock. Killing incoming tasks from within the lock is easy because through its core functionality, the lock already retrieves and operates on task handles or system level task access means in order to suspend and restore the task. Killing a task cannot however involve just stopping to execute it for good. It is necessary that a task gets to execute its destructor sequences, which are placed by the compiler at the end of each sequence of instructions by every object-oriented compiler. Killing a task therefore involves suspending it and then resuming it at the beginning of its destructor sequence. This way all necessary resource reference counters are properly updated, no longer needed memory released, and persistent stack(s) status properly updated in order for it to be released when last reference is destroyed. This scheme is much easier to implement than some mechanisms within prior-art compilers such as "try/throw/catch" compiler exception construct which create and process the destructor sequences in similar way.

Creating a "cancelrest" lock out of above described modified FIFO locks is straightforward as shown on FIG. 33E. The CANCEL inputs are marked CAN1, CAN2, and CAN3. An output signal from one sub-lock issues CANCEL requests to all other sub-locks and then is routed to the TSI. For example, when Lock R2 sends a task to its output, this causes sending CANCEL commands to locks R1 and R3, and then the task outputted by R2 is sent to the Task Sending Interface (TSI).

The Task Receiving Interfaces (TRI) and Task Sending Interfaces (TSI) are the remaining components of processing nodes of present invention to be described. One of the key benefits the architecture of present invention is the fact that TRIs and TSIs are the only components that vary in organization in diametrically different applications of the present invention. The key varying element of different application is how much separated different processing nodes are or how they physically communicate with one another. The other components of the architecture of present invention—namely the processors executing sequences of instructions and locks used to initiate other tasks need not be aware of the interconnection details. In different applications, they may pass identifications of locks and of sequences of instructions to execute in application specific format, but the key issue is that only TRIs and TSIs actually process that information, allowing almost complete portability of software developed in the spirit of present invention.

To explain the idea of TRIs and TSIs better, the examples of implementing present invention with three different type of node interconnections will be discussed.

Figure 34:
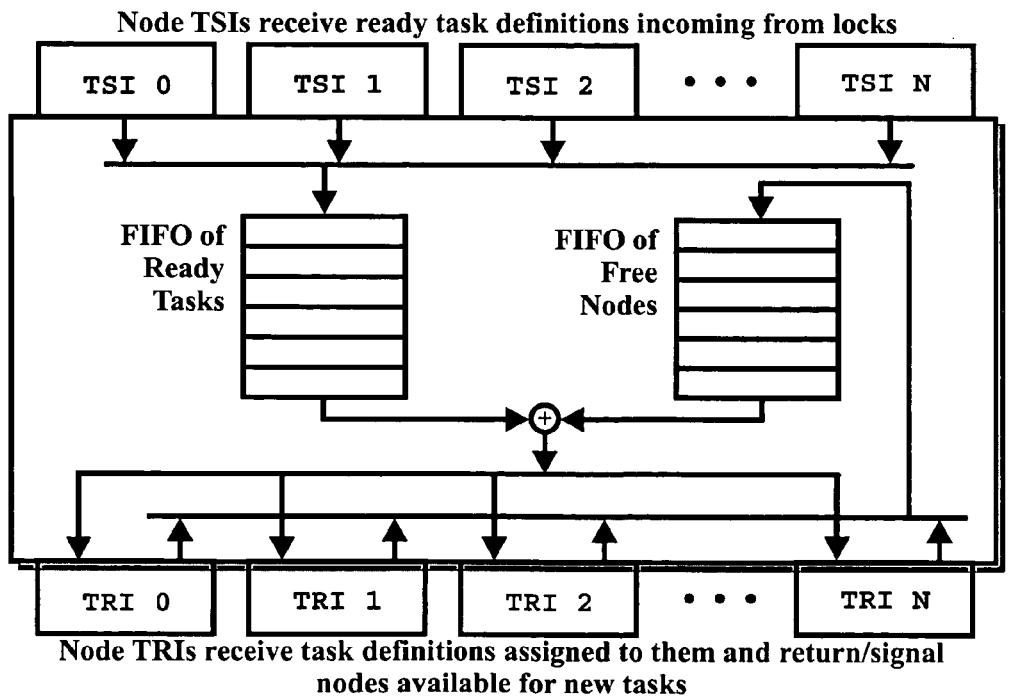
FIG. 34 shows implementation of present invention on common shared memory systems

FIG. 34 shows implementation of present invention on systems with common shared memory. This includes "Symmetrical Multi-Processing" systems with single memory accessed by many processors through shared bus as well as systems with processor-memory interconnecting crossbars or similar such circuits, the key characteristics of such a system being the fact that all memory can be accessed by different processors equally well, translating to no need to group preferred tasks for different processing nodes. Organization of TRIs and TSIs in this situation reflects the physical characteristics of the system and its inherent "centralization." The parameter location information is either non-existent or empty here. TRIs and TSIs are here not separate components but simply different fronts for the same common centralized component as shown on FIG. 34. This centralized component consists of two FIFO queues: FIFO of Ready Tasks and FIFO of Free Nodes (Processors). Ready tasks incoming to separate TSIs are all placed in the same FIFO of Ready Tasks (tasks ready to be executed). The top (oldest) task in this FIFO is matched with any node/processor that becomes available (i.e. is placed in the FIFO of Free Nodes). Such matched pair becomes the specific node TRI's incoming task that begins to execute. When a task ends, the processor is returned to the TRI, which places it back in the FIFO of Free Nodes. Such functionality means that when one of these FIFOs is non-empty, the other one is empty (it may have only one element for a very brief moment).

Figure 34A:
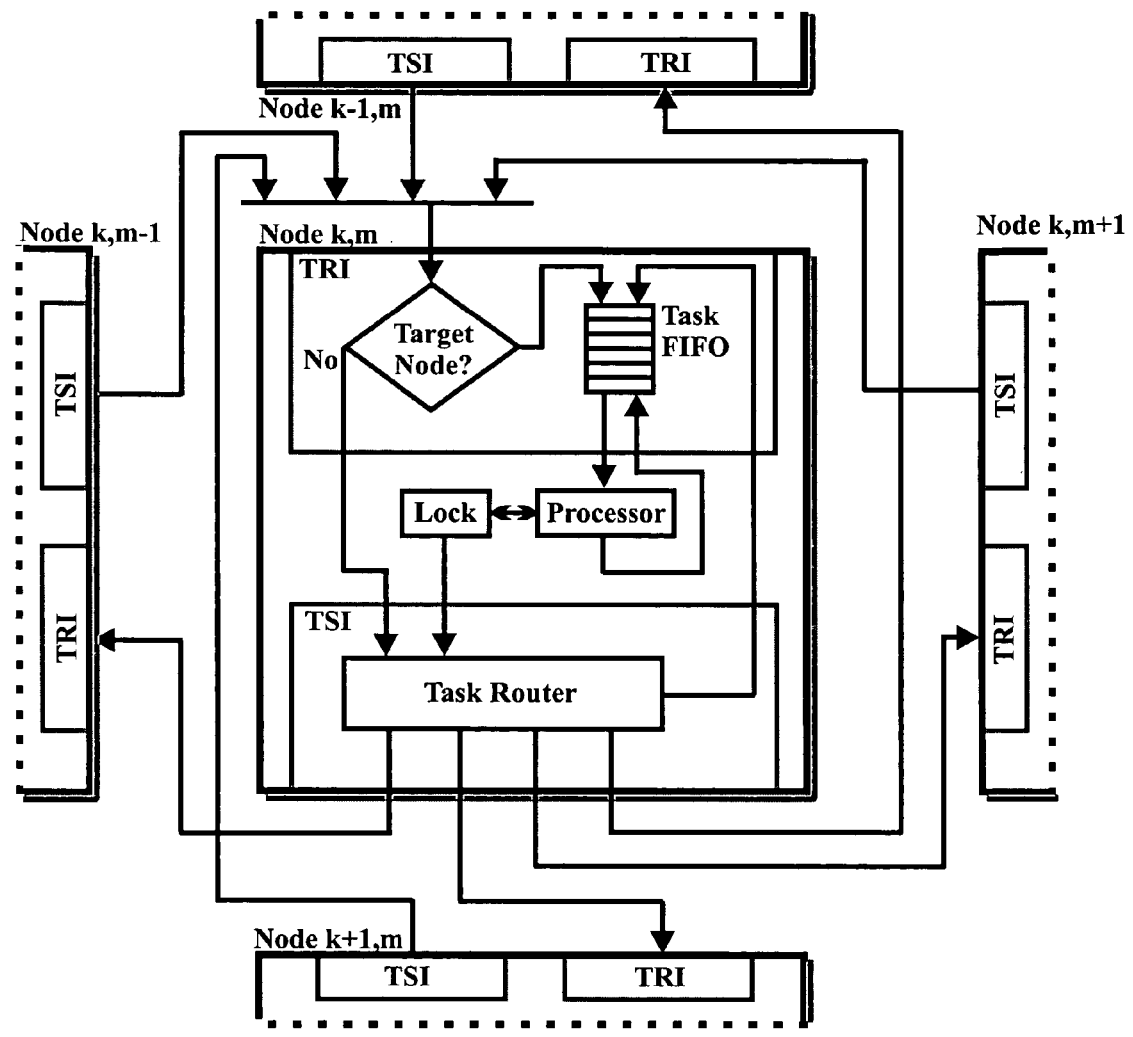
FIG. 34A shows implementation of present invention on distributed memory, processor-mesh type systems

TRIs and TSIs implemented with distributed, decentralized architectures, are likewise decentralized. They become separate components of every node, becoming the interface connecting nodes together. Consider distributed memory, multiprocessor, two-dimensional mesh architecture previously discussed and shown on FIG. 30A. The key characteristic determining details of implementation of TRIs and TSIs here is the fact that each node is only directly connected to its neighbors, has its own memory, and can access memory of other nodes but with overhead penalty substantially increasing with number of node hops required by a specific memory access. Organization of TRIs and TSIs in such a situation is shown on FIG. 34A. The drawing shows architecture of two-dimensional mesh system with each node having only connections to four of its neighbors. The same exact concepts do apply to any mesh architectures, including more dimensional ones and one that has more connections, diagonal ones, for example.

A node's TRI is its communication input. It has one input that can receive task definitions from all four of its neighbors. When a node receives a task it checks if it is intended preferred destination using previously discussed "location" information and current node load information. If this node is not the preferred destination, the task is simply passed on to the node's TSI, and routed further down the mesh from there. If this node is the task's preferred destination, the task is placed in the TRI's FIFO. The processor and a lock on this drawing are greatly simplified here, shown only to explain connections of TRI and TSI. Full architecture of these parts was shown on FIGS. 31 and 31A. When the processor becomes available, it takes a task from the TRI's FIFO and executes it. If it needs to initiate a new task, it communicates with a lock, which in turn can eventually send a new task definition to a node's TSI. A more sophisticated organization of TRI will allow it to check/react to the neighbors' load situation and take waiting tasks out of its FIFO and send them away if load situation changed enough to justify doing so—for example a neighbor ending all his tasks while there are several tasks waiting in FIFO here.

The TSI is a node's communication output. It has an output connecting it with TRIs of all of its immediate neighbors. The TSI looks at "location" information of all tasks sent to it, compares it against node load information and routes the task to one of its neighbors or to the task FIFO of its own node.

Figure 34B:
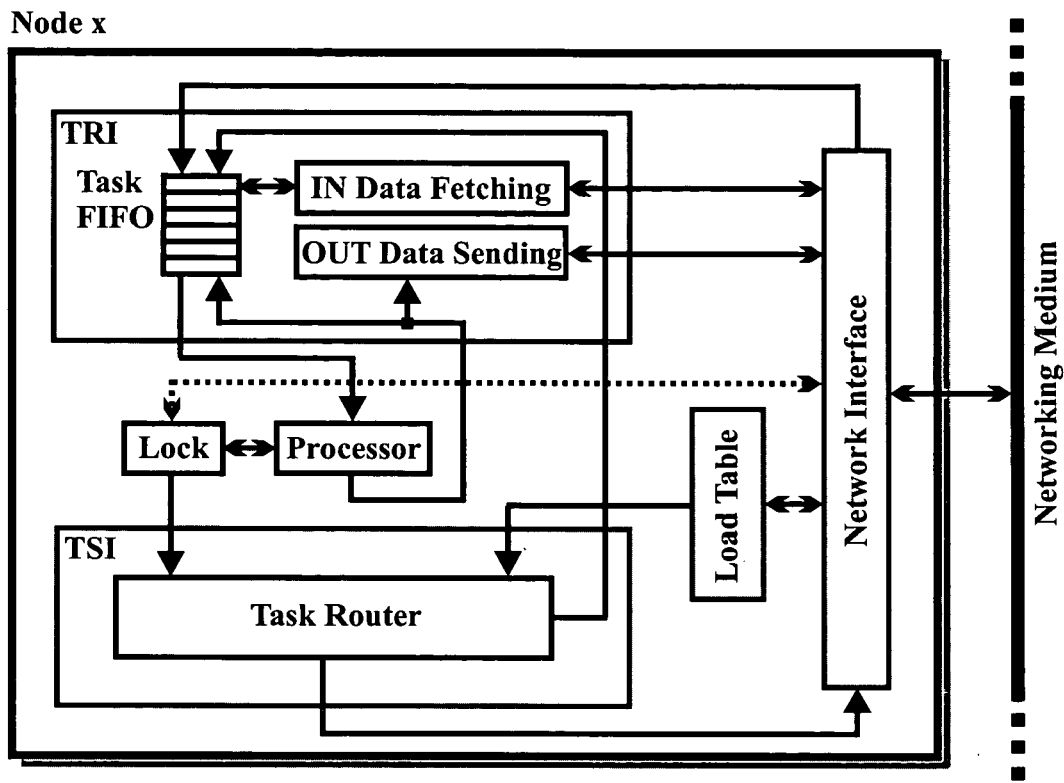
FIG. 34B shows implementation of present invention on virtual parallel platforms

FIG. 34B shows implementation of the TSI and TRI concepts on "virtual parallel platforms." The idea behind virtual parallel platforms is to use "commodity" type computers connected through network or similar such means. The characteristics influencing the design of TSI and TRI in this situation include the fact that each such system has its own local memory and can only access the memory of the other nodes through the network medium, placing substantial penalty on it. The nodes, however, are all connected with all other nodes equally well, meaning, there is no penalty associated with choice of node other than its current load (in most practical cases, but not all). As before, the processor and a lock on this drawing are greatly simplified here, shown only to explain connections of TRI and TSI. Full architecture of these parts was shown on FIGS. 31 and 31A. An important part of this implementation is a "Load Table" containing frequently updated information about current processing load of all nodes. This information is critical for routing and re-routing tasks.

Ready task definitions arrive to a node through networking medium and network interface that implements proper protocol allowing sending the stress-flow task definitions over it. A task received by a node is placed in TRI's Task FIFO. Due to peculiar characteristics of this platform, this FIFO will generally hold much more tasks at any given moment that other implementations. This has to do with the data transfer overhead. While the tasks wait in this FIFO, the "IN Data Fetching" interface copies needed data into the current node using the network interface. When the processor becomes available, it takes a task from the TRI's FIFO and executes it. If it needs to initiate a new task, it communicates with a lock, which in turn can eventually send a new task definition to a node's TSI. When the processor finishes the task, the TRI "OUT Data Sending" block copies result data to the proper location when this is necessary. A more sophisticated organization of TRI will allow it to check/react to other nodes' load situation and take waiting tasks out of its FIFO and send them away if load situation changed enough to justify doing so—for example another node ending all his tasks while there are several tasks waiting in FIFO here.

The connection between the lock and the Network Interface needs special attention here. As always, the lock needs some storage area generated at the scope where it was created or with it. This means that the lock storage in some cases here might result being located at another node. Being a critical mechanism regulating access, it has to always be accessed in its original location. This instituted no problem whatsoever in previous platforms because the operations needed are always very short and the previous platforms had access to all memory, even if at some penalty if the location was remote. Here, like anything else remote, the lock storage access needs to go through network interface. Short, special purpose network messages have to be implemented for just this task. This isn't as bad as it sounds. The operations needed are short, requiring sending one message and in some cases waiting for one response. When waiting for the response, the node/processor can process other waiting tasks. In particular, when implementing the critical RESERVE command mechanism, we simply send proper command to the Network Interface and suspend the caller assuming that the command failed until we get a response back that says that it didn't. Regardless if the lock was free or not, the operation here will be the same thanks to stress-atom concept features. In all cases, all complexity of lock interactions needs to be performed as part of the lock interfacing task and node, while lock storage is just a few bytes to access. This is why lock was drawn as device between running task and the TSI.

The "location" information here is specially configured to allow efficient node assignment based on amount of data that will have to copied from node to node. The TSI looks at "location" information of all tasks sent to it, processes it together with current "Load Table" information and routes the task to one of the nodes or to the task FIFO of its own node. In virtual parallel implementations, due to the data copying overhead, directing the task to the same node is more often preferred than in other implementations. Once an outside target node is selected, the task definition is sent to the "Network Interface" where complete stress-flow task definition network message is assembled and sent. Please note that exact demarcation lines between TRI, TSI, the "Load Table" and the "Network Interface" are unimportant "academic" details of the implementation. The only demarcation lines of importance are those between the code running on the processor and what it accesses. These demarcation lines remained unchanged allowing universal portability of code written in the spirit of present invention.

Application in Operating Systems

Constant demand of increase in performance of computer systems and approaching physical limits of single-processor systems combined with lack of accepted, universal parallel programming methods had a very negative effect on architectures of computer systems. Simplicity and universality have been sacrificed in order to increase performance in executing of common tasks. To achieve some parallelism, big effort was made to move time-consuming operations into firmware of dedicated purpose processors and thus take load off the main processor. Such solution is very messy, with gains non-proportional to costs involved, which best demonstrates the urging need for universal parallelism in mainstream computing. The issue can be best described by discussing evolution of video hardware. To provide faster display rendering capabilities, especially with 3D graphics, ever increasing processing power was needed. Doing 3D rendering on main processor quickly became impossible and forced the need for extra processors doing it. This way, all present day video cards got equipped with dedicated high speed processors for rendering. This only solved the problem partially, because the video card obviously cannot produce the graphics on its own. It still has to get 3D mesh and textures, and their updates from the main processor. Without fast means of communications and storing some of this info inside the video card hardware the performance gains obtained by extra processor would be quickly erased. This forced costly and complex caching of data on both ends, dedicated energy consuming high-speed busses to send the data between main processor and the graphics processors, etc. This solution obviously works but universal purpose parallelism could accomplish these goals in far simpler, less expensive fashion.

Figure 35:
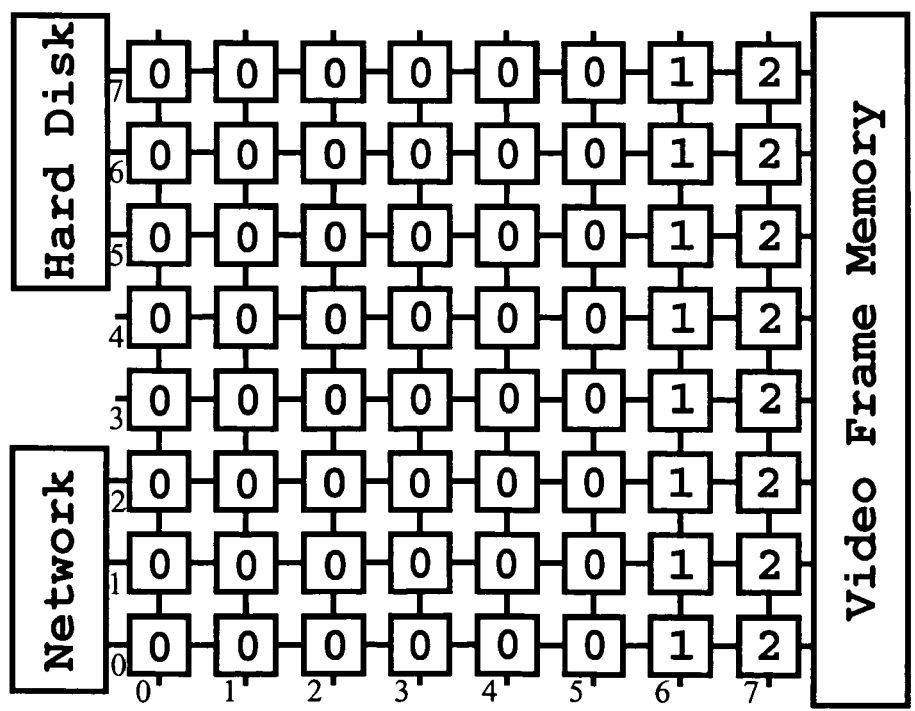
FIG. 35 shows mesh parallel architecture connected to video and other hardware

Consider mesh of processors from FIG. 30 having one of its edges directly connected to video frame memory as shown on FIG. 35. Mesh is used as an example here, all interconnected processor architectures (2, 3, and more-dimensional) can use described methods. From electronic standpoint, such architecture is quite simple. The problem was lack of good method of programming such architecture. Present invention fills that void. Mesh processors can now work on producing graphics in any number that is necessary. Graphic processing software now runs on the mesh like any other stress flow atoms. No firmware or dedicated high speed busses are needed. If graphics job is complex, the graphics related stress flow atoms get assigned deeper and deeper away from the video frame memory. Node assignment procedures result in the situation where stress-flow atoms doing final filling of raster memory and Z-buffering are closest to it, those that do higher level 3D mesh, special effect, or animation work, are further away from it. The mesh processors load configures itself to most efficiently perform current task. The solution is decentralized, which allows redundancy and better use of resources. Damage in part of the mesh can be bypassed. The whole architecture is very simple and both cost and energy efficient. There is no need to have dedicated resources for worst case graphics load scenario. All hardware is universal—if it is not needed for graphics at the moment, it can be doing something else.

Similar thing might be done with other hardware, a hard disk for example, shown connected to the left edge of the processors' mesh on FIG. 35. Due to desire to off-load the main processor, substantial processing power has been placed inside hard-disk firmware. They were equipped with large memory for caching data read from and to be written to hard disks together with algorithms for optimizing accesses, pre-guessing operations, etc. A hard disk connected to mesh of processors utilizing the present invention does not need to have any of that—due to processing power available for utilization at the mesh, the hard disk can be rudimentary, low-level function hardware again with all the sophistication provided by software running on the mesh, since greater processing power can be assigned if needed to hard-disk data routines without facing bottlenecks of a single hard-disk hardware interface.

Such distributed solution for hardware specific processes not only increases performance, but has a huge number of other advantages: it offers redundancy, eliminates need for ever changing custom busses and interfaces as bottlenecks that constantly need changing and upgrading, and makes entire universal-purpose computer really universal—as in based entirely software rather than a lot of fixed firmware that cannot be changed or even troubleshooted by the user. The redundancy aspect of computing is something that has seen a lot of effort lately. Sophisticated controllers have been produced which, for example, allow for redundant hard-disk capabilities which makes it possible to bypass one fallen hard-drive. Such redundancy is obviously very limited—if the main processor or the redundant hard-drives controller fails, the whole system is still completely grounded. Present invention does not have such problem—a mesh of processors utilizing present invention can bypass faulty mesh elements, while processing power of the mesh allows on utilizing any redundant hardware scheme running as mesh software and without need of dedicated purpose hardware or firmware. Such universality can greatly increase performance and reliability of computer system as performance can be improved by simply increasing the size of the mesh or other interconnected architecture. New functionality can be added by simply changing the mesh software to, for example, include encryption/decryption, or user ownership and permission schemes as a low level function of hard-disk algorithms. Similar advantages could be accomplished by implementing the network hardware, drivers, and interfaces in the same fashion.

A computer system designed from scratch and based on the present invention would totally change and simplify design of an operating system if this term would still make sense in such new architecture. All the software, including what used to be operating system, could be distributed without need for any centralized supervisor. The whole process would look like this—programs as some logical constructs performing specific new job would be a collection of stress flow atoms calling one another and some outside stress-flow atoms. Outside stress-flow atoms are identified by some expanded name plus digital signature/identifier of its maker. Starting with entry point, the stress flow atoms attempt to initialize themselves as recommended by the 'location' function described in previous paragraphs. For hardware drivers or specific hardware related code, the location will always point to nodes neighboring the hardware. Previously run stress flow atoms code is cached at each node as memory allows, if the code is already there, it is reused, if not, various repositories of stress flow atoms are contacted for a copy. The list of repositories should be provided as context—static information stored when entry point stress flow atom was executed. First repositories would be local hard-drives, the last ones could be the internet servers of the desired stress flow atom's creator. A specific node searching for a stress flow atom copy would not even need any complex software for contacting various repositories. All it needs to know—if you need a copy from repository xxx, ask for it a node in direction of a given 'location' structure representing the repository. The contacted node would either provide a copy or ask for it a node closer still to the repository, until the repository itself was reached. For performance sake, if its memory allowed, a node would cache not only the stress flow atoms that it actually run, but also those that were copied through it. This way, relatively unused nodes (through which the repository access path will most likely travel toward the repository) will serve as natural program cache saving the trouble of traversing the mesh and re-reading the code from the repository. Such repository search function running on the consecutive nodes would naturally also be a stress flow atom that would either pass the call onto the closer node or call repository (such as disk) reading routines if it was close enough in the mesh to the given repository hardware connection.

In this way, a truly decentralized, distributed-processing, redundancy supporting, self-expanding, self-updating universal computer system could be built. It is true that such features are today known already with some present operating systems. The critical difference, however, is that these features are currently only provided as expensive custom extensions to existing systems that by their originating nature were built mostly as single-threaded, single-processor code. Such additions are sort of pretty dresses that make underlying code function as if it was not written as single-threaded, non-distributed code which pretty much all programming tools still produce. The situation is totally different with the present invention were multi-tasking, multi-processing, decentralization, distributed processing, distribution of resources, redundancy, etc were designed to by underlying fundamentals of all software design that could eventually allow revolutionary improvement in software design methodology and performance. As far as operating system is concerned—there would be no centralized resource managing software, but rather collection of independent drivers managing their hardware.

The extra advantage is that this would not have to be done all at once. The methodology of the present invention could gradually be introduced with great benefit into the existing computer systems through providing emulation of stress-flow hardware coexisting with conventional code, which has already been described and implemented.

I claim:

1. Parallel programming method, script or visual, for performing parallel computations on plurality of processors of multi-processor computing hardware by means of plurality of program subroutines, creation of each of said subroutines comprising steps of:

(a) indicating an exclusive zone, said exclusive zone being subset of instructions at the beginning of each said subroutine that only a single task can be executing at a given moment with the remaining part of same said subroutine being allowed to be executed by plurality of tasks, each said task being an instance of said subroutine running at the same time;

(b) relying on a lock including a lock variable or data structure, automatically generated by the a compiler or manually assigned to one said subroutine or plurality of them, managing execution of said exclusive zone indicated in step (a) by allowing only one task to execute instructions within said exclusive zone at the same given moment while temporarily suspending and queuing or otherwise constraining other tasks attempting execution of said exclusive zone of any subroutine assigned to the same lock;

whereby complex computing jobs are broken down into plurality of above described subroutines executing in parallel and synchronized through limited access to above described exclusive zone of each subroutine indicated in step (a);

whereby synchronization with outside routines as well as safe access to contested or volatile resources is controlled locally by placing part of code of each subroutine within the exclusive zone indicated through above step (a) of said subroutine while unconstrained parallelism is achieved with instructions placed beyond said exclusive zone;

whereby every call to the same said subroutine that defines any instructions past the exclusive zone of step (a) results in creating a new independent task running in parallel, once the initial constraint of having to pass through indicated in step (a) exclusive zone of said subroutine is overcome;

whereby plurality of above described calls to same said subroutine, but with different parameters related to different items of data, is the intended means by which a complex computing job consisting of plurality of such items of data to be processed ends up being executed in parallel on all currently available processors, eliminating necessity to explicitly partition said plurality of items of data into chunks fed to different processors of said multi-processor hardware;

whereby use of parallel processing resources can be directed from the lowest level of hierarchical design of digital computer's code thus allowing to make parallelism an inherent and natural part of any small component of digital computer's program as opposed to parallelism being an exception, a feature added at the top of non-parallel aware classical programming methods.

2. Method of calling program subroutines of claim 1, comprising the steps of:

(a) attempting reservation of lock of step (b) of claim 1 wherein said lock is either reserved for exclusive use or the current task attempting said calling suspended and placed in first-in-first-out queue, to be removed from said queue and restored to running state by act of said lock becoming available to be reserved;

(b) scheduling all of claim 1 subroutine code to run as a newly created separate task or alternatively executing instructions from within the exclusive zone of part (a) of claim 1 subroutine and then scheduling the remainder, if not empty, to run as a newly created separate task;

whereby the lock of step (b) gets released and becomes available upon completing the last instruction of the exclusive zone of step (a) of claim 1 subroutine being called;

whereby the claim 1 subroutine being called is thus being able to safely access, copy, or change data within the caller's domain or another volatile data location without the caller being able to change it and without another instance of said claim 1 subroutine being called being able to change it at the same time;

whereby one application of above specified method is one or more claim 1 subroutines running simultaneously and performing some lengthy computations outside their exclusive step (a) zone and then calling a single claim 1 subroutine to report results to a single destination accessed from within said claim 1 subroutine being called, thus allowing combining of plurality of results of parallel computations on many different items of data and eliminating necessity for explicit means of combining such plurality of results.

3. Method of claim 1 wherein claim 1 subroutine further comprises method of managing its program stack comprising steps of:
   (a) keeping track of local declarations of any variables or data collections that end up being allocated on said program stack and references of which or pointers to which are passed as parameters to claim 1 subroutines subsequently being called out of said claim 1 subroutine running with said program stack;
   (b) keeping track of validity cycle of said above step (a) pointers and references and not releasing for destruction or reuse said program stack as long as any of said pointers or references remain valid, even after said claim 1 subroutine has performed its last instruction and no longer runs as one of the parallel running tasks;
   whereby known methods used for managing dynamic memory objects and references to them can be applied to managing said program stack thus allowing these steps to be performed automatically without the writer of said claim 1 subroutine having to do it explicitly;
   whereby said method of managing program stack of claim 1 subroutines eliminates need for the programmer to design and manage permanent storage for intermediate results of complex parallel computation with said intermediate results needed to be stored only by claim 1 subroutine that produced them right where they were produced, never copied to a different location, never requiring buffers for storing large number of them, automatically maintained until they are processed downstream, and automatically destroyed the very moment they are no longer needed thus providing the most efficient theoretically possible memory management scheme for parallel computations.

4. Method of claim 1 wherein exclusive zone indicated in step (a) of program subroutine of claim 1 returns a value and lock mechanism of step (b) includes means for keeping the lock reserved after execution of said exclusive zone finishes and until said return value is copied or otherwise utilized by the caller after which event the lock is released;
   whereby another call to the same subroutine cannot reserve the lock until the returned value is copied or otherwise utilized by the caller.

5. Method of claim 1 wherein the lock of step (b) of claim 1 is created as an invisible to the user variable or data structure automatically allocated at exactly the same Object-Oriented Programming scope as definition of the subroutine of claim 1, specifically comprising the steps of:
   (a) claim 1 subroutine defined at global scope being automatically allocated said lock as variable or data structure of global scope, therefore in global data memory;
   (b) claim 1 subroutine defined at member scope of some data structure being automatically allocated said lock as variable or data structure of member scope, therefore as member variable of said data structure defining said member claim 1 subroutine;
   (c) claim 1 subroutine defined at static scope of some data structure being automatically allocated said lock as variable or data structure of static scope, therefore in global data memory but accessible only through said data structure defining said member claim 1 subroutine;
   (d) claim 1 subroutine defined at local scope being automatically allocated said lock as variable or data structure of local scope, therefore on program stack associated with task defining said claim 1 subroutine;
   whereby Object-Oriented Programming hierarchy of claim 1 subroutines results in same hierarchy being replicated for synchronization and parallel execution of said claim 1 subroutines.

6. Method of claim 1 wherein the subroutine of claim 1 is not created as a separate named set of instructions but as a named entry point to a portion of instructions inside another existing subroutine;
   whereby subroutine containing such named entry point uses lock of step (b) of claim 1 to suspend its execution at said entry point until an outside call is made to that entry point;
   whereby one application of this method is a single subroutine calling plurality of other claim 1 subroutines and then collecting all the results back within its body, thus allowing said single subroutine to enclose complete parallel processing process that performs data partitioning, initializes parallel computing, and recombines results while presenting itself and be usable by outside code the same way a classical subroutine would.

7. Method of claim 1 wherein the method of indicating separation of exclusive zone of claim 1 subroutine indicated in step (a) from the rest of claim 1 subroutine code is accomplished by reusing existing keyword return, or similar keyword or method that caused return to caller in prior art, by redefining it to mean the end of said exclusive zone;
   whereby treating all code past said keyword, recognized as erroneous unreachable code in prior art, as code being allowed to be executed by plurality of simultaneously running tasks, each of them being an instance of said claim 1 subroutine.

8. Method of claim 1 wherein internal translation method into sequence of machine instructions of the exclusive zone of claim 1 subroutine indicated in step (a) and the rest of the claim 1 subroutine code results in placing both said parts as single entry-point sequence of instructions, executing as a separate task from one calling it with marking associated lock produced by step (b) as released or ready for release at the place of separation between said exclusive zone and the rest of claim 1 subroutine code;
   whereby this method of internal translation is one of two functionally interchangeable methods, choice of which is dictated by performance optimization issues dependant on architecture of target multi-processor hardware, parameters being passed to claim 1 subroutine being called, and data being exchanged between claim 1 subroutine being called and caller's environment.

9. Method of claim 1 wherein internal translation method of the exclusive zone indicated in step (a) and the rest of claim 1 subroutine code results in two separate entry-point sequences, with said exclusive zone being called directly within tasks calling said claim 1 subroutine and the remainder of claim 1 subroutine, if any, being scheduled to run as a separate task;
   whereby this method of internal translation is one of two functionally interchangeable methods, choice of which is dictated by performance optimization issues dependant on architecture of target multi-processor hardware, parameters being passed to claim 1 subroutine being called, and data being exchanged between claim 1 subroutine being called and caller's environment.

10. Method of claim 1 wherein single expression containing calls to plurality of subroutines of claim 1 is translated in such way that first attempts to reserve locks of step (b) of all said subroutines called out of said expression, reserving all locks or none at all, and only on successful reservation of all said locks proceeds with executing of any instructions of said expression including scheduling said plurality of subroutines to run as separate tasks;

whereby said expression serves as deadlock-proof method for plurality of tasks for reserving and using two or more contested resources at the same time.

11. Method of claim 1 wherein a list of pointers or other references to program subroutines of claim 1 presents itself and is usable in the same manner a single program subroutine of claim 1 is, where a call to said list of pointers or other references attempts to reserve locks of step (b) of all said list elements, reserving all locks or none at all, and only on successful reservation of all said locks proceeding with scheduling of every said list element for execution.

12. Method of claim 1 wherein subroutine of claim 1 has plurality of entry points in form of separately named headers with separate parameter lists or a number of indexed entry points or any combination of said named and said indexed entry points, where complete set of entry points has to be called or scheduled by running tasks before the body of such subroutine can be scheduled to execute.

13. Method of claim 1 wherein subroutine of claim 1 has plurality of entry points in form of separately named headers with separate parameter lists or a number of identical indexed entry points or any combination of said named and said indexed entry points, where a single of said entry points being called by some running tasks results in body of such subroutine being scheduled to execute.

14. Method of claim 1 wherein claim 1 subroutine or its step (b) lock is equipped with area to store current values of arguments of calls to said subroutines as opposed to using program stack for that purpose;

whereby overall performance is greatly improved by not needing to allocate stack until claim 1 subroutine has all the needed data to start running;

whereby parameter-less calls requesting repeating of the recent call operation of said claim 1 subroutine with previous values can be made or parameters to calls to claim 1 subroutines can be supplied in form of unary expressions dependant on recently passed values of said parameters.

15. Method of claim 1 wherein claim 1 subroutine definition or calling means are provided allowing requesting that lock of step (b) of called subroutine is sent an initial reservation request as part of automatically generated prolog of subroutine calling it, placed before entire user written code of said calling subroutine and requesting a place in line in preparation of actual lock reservation call being made later within the body of said calling subroutine;

whereby said initial reservation serves as means to perform actual reservations of said lock being serviced in order said initial reservations were placed and not in order actual reservations were attempted;

whereby said initial reservation makes sure that order of splitting and merging of plurality of parallel processing by means of claim 1 subroutines into different data paths traveling toward the same target downstream is preserved without need of tagging items of data or insertion sorting them at target.

16. Method of claim 15 wherein compilation of subroutine of claim 15 issuing initial reservation requests automatically generates additional code requesting cancellation of said initial reservation in case said initial reservation is not utilized for reasons of call to claim 1 subroutine corresponding to said initial reservation being bypassed by some conditional statement.

17. Method of claim 1 wherein claim 1 subroutine definition or calling means are provided allowing that a newer task attempting to call said subroutine discards from queue previously suspended and awaiting task;

whereby a connection feeding data by means of claim 1 subroutine calls can be declared as being concerned only with the most recent data, thus requesting that only most recent data is processed and that excessive data arriving faster than could be processed is to be discarded.

18. Method of claim 1 wherein plurality of claim 1 subroutines can be defined to be called as a group thus indicating that a single expression not calling all members of such group is to be automatically expanded with calls to the missing members of said group, using as call parameters values passed to previous call to said missing member;

whereby parallel processing subsystem that needs to start as a complete group of otherwise independent elements being called together can have such need fulfilled.

19. Method of claim 1 wherein claim 1 subroutine further comprises last call parameters storage area as part of claim 1 lock of step (b) structure or in memory location associated with said lock of step (b);

whereby said call 1 subroutine can be called repeatedly without supplying new parameters with the effect of reusing parameters stored in above described storage area;

whereby such last parameter storage capability can be used to group several inputs to parallel processing paths together to assure that all members of the group are always called together, with previous parameters being reused if new parameters are missing, in order to assure that pieces of the same calculation performed in parallel can be merged downstream into a single item of information without need to tag and sort results.

20. Method of claim 1 wherein pointer to claim 1 step (b) lock associated with currently executing or being called subroutine of claim 1 is stored in reserved or created for that purpose processor register;

whereby performance of all claim 1 subroutines is improved and all claim 1 methods can be implemented by means of single processor instructions.

21. Method of claim 1 utilized in distributed memory computing platform further comprising method to calculate approximate data-amount-weighted processing node location of distributed data needed for a specific claim 1 subroutine comprising steps of:

(a) generating a default data node location information for each data type used by claim 1 subroutine, said information containing platform specific information of where data is allocated together with size of allocated data;

(b) allowing programmer to replace the default claim 21 step (a) information with an application specific expression consisting of variable references, constants, and arithmetic operators;

(c) compiling claim 21 step (b) provided expression in such way that operators are translated into calls to platform specific simple functions to combine two or more data-size-weighted data node location values of claim 21 step (a);

(d) calculating computing-platform specific data-amount weighted mean location for data needed by newly generated instance of claim 1 subroutine;

whereby claim 21 step (d) provided approximate mean data location compared against current computing nodes' load information is used as indicator of best computing node for a new instance of claim 1 subroutine;

whereby step (b) provided expression becomes platform independent method to direct computing node assignment and load balancing in plurality of different computing platforms according to application specific needs.

22. Method of claim 1 wherein claim 1 subroutines are means to build equivalence of computer operating system and all its device drivers as a collection of claim 1 subroutines executing and performing their functions locally on separate processors and not as a centralized process;

whereby the need to gain exclusive access to locks (b) of claim 1 constitutes means to manage resources and all access to them;

whereby claim 1 subroutines are scheduling new tasks, allow accessing contested hardware and data safely, and are providing all necessary synchronization locally thus eliminating need for centralized operating system.

23. A computing machine comprising:

(a) plurality of computing nodes with processors, physical or software emulated, executing sequences of instructions;

(b) plurality of lock devices managing exclusive access, implemented in software or in electronics circuitry, one of them assigned to every sequence of instructions to be executed as a separate task;

(c) interface means to receive from other computing nodes identification of sequence of instructions to execute together with identification of aforementioned lock construct assigned to said sequence of instructions, together comprising definition of new task to execute;

(d) interface means to send to other computing nodes identification of sequence of instructions to execute together with identification of aforementioned lock construct assigned to said sequence of instructions, together comprising definition of new task to execute;

whereby said lock constructs devices (b) serve as interface between tasks and as means to regulate parallelism by requirement of having to reserve said lock before new task can be sent through above listed sending interface (d) and by need to be released inside sequence of instructions of said new task;

whereby computing machine comprising elements (a), (b), (c), and (d) is used to compute complex jobs by breaking them down into a large number of tasks executing in parallel on multiple processors (a), sent by interface (d), received by interface (c), and regulated by need to reserve the lock (b) of each such new task to be run;

whereby locks using said interface together with sequences of instructions associated with said locks become means to control safe access to shared resources as well as means to safely initialize and manage tasks running in parallel, all done locally therefore without need to use an operating system or other centralized supervisory facilities for that purpose.

24. Machine of claim 23 wherein processors of nodes (a) and locks (b) communicate through interface comprising following signals, connections, or commands from said processors to said locks:

(a) release lock of the current task issued exactly once by each task;

(b) reserve lock of a new task;

(c) schedule a new task issued always after above reserve command (b) from within the same sequence of instructions or commands with or without any other instructions or commands issued in between.

25. Machine of claim 24 further comprising an additional signal, connection, or command for initial reservation of a lock, in order to secure place in line for later actual reservation, together with means to service actual reservations in the order of initial reservations;

whereby actual reservation arriving ahead of order in line established by initial reservations will result in temporary suspension of the reservation requestor until earlier initial reservations are serviced;

whereby multiple firings of parallel computations on plurality of data performed by exactly same sequences of instructions working with the same lock downstream can be kept in order by means of issuing initial reservation request before lengthy asynchronous processing that ends with reporting the results, part of said reporting of results being request for said actual reservation of said lock;

whereby multiple firings of parallel computations through the same exact data paths can be kept in order at targets downstream without need for tagging of items of data or sorting of the results arriving at said targets.

26. Machine of claim 23 further comprising a first-in-first-out task queue associated with construct (b) of claim 23;

whereby a running task attempting to reserve already reserved lock is suspended and placed in said first-in-first-out queue from which it will be removed and restored to running state through act of obtaining reservation of said lock after it has been released by previous task using it.

27. Machine of claim 23 further comprising place to store reference or pointer to a single parallel task, said place associated with lock construct (b) of claim 23;

whereby a running task attempting to reserve already reserved lock is suspended and stored in said means to store reference from which it will be removed and restored to running state through act of obtaining reservation of said lock after it has been released by previous task using it;

whereby another task attempting reservation of already reserved lock will release previously suspended and stored task as if it was run and then be itself suspended and stored;

whereby such a device can serve the function of passing on into further processing only the most recent data while discarding frequently arriving data that cannot be processed fast enough by the rest of the machine of claim 23.

28. Machine of claim 23 further comprising pool of stacks or plurality of such pools of stacks, constructed such way that a stack of such a pool is assigned to each new task as program stack and is not released or reused by a different task as long as any pointers or other references to data allocated on said stack are kept intact, even after task to which said stack has been assigned has completed its sequence of instructions and no longer exists;

whereby tasks running in parallel and disappearing can allocate data on their program stack that can be safely passed to parallel tasks downstream without need of costly and cumbersome manually programmed allocation and de-allocation of dynamically allocated memory.

29. Machine of claim 23 further comprising hardware, firmware, or software device, usable by interfaces (c) and (d) of claim 23 as a task to run, making possible creation of a list of tasks where a single reserve and schedule set of signals, connections, or commands to said device will spread said pair of signals, connections, or commands to the complete said list of tasks;

whereby reservation signal, connection, or command sent to said list of pointers or other references attempts to reserve locks of step (b) of all said list elements, reserving all locks or none at all, and only on successful reservation of all said locks proceeding with schedule signal, connection, or command for every said list element for execution.

30. Machine of claim 23 further comprising variant of lock software or hardware device, usable by interfaces (c) and (d) of claim 23 as a plurality of tasks, containing plurality of signal, connection, or command entry points corresponding to the same sequence of instructions wherein said sequence of instructions is scheduled to run as a separate task only after complete said set of entry points has been given reserve and schedule signals, connections, or commands.

31. Machine of claim 23 further comprising variant of lock software or hardware device, usable by interfaces (c) and (d) of claim 23 as a plurality of tasks, containing set of plurality of signal, connection, or command entry points corresponding to the same sequence of instructions wherein said sequence of instructions is scheduled to run after single entry point of said set of entry points has been given reserve and schedule signal, connection, or command.

32. Machine of claim 23 further comprising locks (b) being equipped with storage area for actual call parameters passed to new tasks using specific lock (b) of claim 23;
  whereby parameter-less calls can be made that will result in calling new tasks with the same set of parameters as immediately before.

33. Machine of claim 23 wherein processors of nodes (a) are equipped with special purpose registers to store address or other reference of currently used lock (b) of claim 23;
  whereby regular data move or data change instructions performed on these registers result in sending lock commands to said locks;
  whereby all necessary operations on said locks can be implemented as single processor instructions.

34. Machine of claim 23 further comprising means to calculate and to send to claim 23 interface (d) identification of ideal selection of node or nodes to run the new task on;
  whereby said interface uses this information together with information about current load of candidate nodes to select the best node to assign said new task to.

35. Machine of claim 23 further comprising a peripheral device, with little or no firmware, directly connected to sub-group of nodes (a) of claim 23;
  whereby device driver computing and all significant processing associated with said peripheral device is performed on said nodes (a) close to said peripheral device;
  whereby multi-processor computing machine of claim 23 can implement all peripheral devices by means of processing performed on subset of processors of said multi-processor computing machine without need to provide custom processing hardware or centralized operating system to achieve said peripheral device functionality.

36. Machine of claim 23 further comprising caching means for storing inside each node (a) of claim 23 recently run and recently transferred sequences of instructions;
  whereby new tasks running the same sequences of instructions can reuse said stored sequences of instructions rather than request and load them from the source;
  whereby no centralized operating system is needed to efficiently distribute sequences of instructions to run.

* * * * *